US012669468B2

(12) United States Patent
Anazawa et al.

(10) Patent No.: US 12,669,468 B2
(45) Date of Patent: Jun. 30, 2026

(54) CAPILLARY-ARRAY-ELECTROPHORESIS DEVICE

(71) Applicant: HITACHI HIGH-TECH CORPORATION, Tokyo (JP)

(72) Inventors: Takashi Anazawa, Tokyo (JP); Ryoji Inaba, Tokyo (JP); Shuhei Yamamoto, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 365 days.

(21) Appl. No.: 18/267,133

(22) PCT Filed: Dec. 18, 2020

(86) PCT No.: PCT/JP2020/047357

§ 371 (c)(1),
(2) Date: Jun. 14, 2023

(87) PCT Pub. No.: WO2022/130605

PCT Pub. Date: Jun. 23, 2022

(65) Prior Publication Data

US 2024/0044836 A1     Feb. 8, 2024

(51) Int. Cl.
*G01N 27/447* (2006.01)

(52) U.S. Cl.
CPC .............................. *G01N 27/44721* (2013.01)

(58) Field of Classification Search
CPC ....... G01N 27/44717; G01N 27/44721; G01N 21/64; G01N 21/645
See application file for complete search history.

(56) References Cited

U.S. PATENT DOCUMENTS

| | | | | |
|---|---|---|---|---|
| 5,790,727 A | * | 8/1998 | Dhadwal | .................. G02B 6/26 385/115 |
| 5,938,908 A | * | 8/1999 | Anazawa | ......... G01N 27/44721 204/603 |

(Continued)

FOREIGN PATENT DOCUMENTS

| | | |
|---|---|---|
| JP | 3654290 B2 | 6/2005 |
| JP | 2006-125901 A | 5/2006 |

(Continued)

OTHER PUBLICATIONS

Chinese Office Action received in corresponding Chinese Application No. 202080107176.0 dated Mar. 7, 2025.

(Continued)

*Primary Examiner* — Thanh Luu
(74) *Attorney, Agent, or Firm* — MATTINGLY & MALUR, PC

(57) ABSTRACT

When laser-irradiation portions of N capillaries with capillary numbers n=1, 2, . . . , and N are arranged on a same plane, a laser-irradiation intensity of each capillary is denoted by L(n), and an output intensity of each capillary by a computer when a light emitting substance having an equal concentration exists inside each capillary is denoted by H(n), an absolute value of an average value of a second derivative of H(n) becomes smaller than an absolute value of an average value of a second derivative of L(n) for any refractive index $n_3$ of a separation medium in a range of $1.33 \leq n_3 \leq 1.41$ by digital correction by the computer, which changes according to the refractive index $n_3$ (see FIG. 11).

14 Claims, 29 Drawing Sheets

(56)             References Cited

U.S. PATENT DOCUMENTS

| 7,018,519 | B1 * | 3/2006 | Siebert ............ | G01N 27/44782 |
| | | | | 204/603 |
| 2003/0226756 | A1 | 12/2003 | Inaba et al. | |
| 2005/0211558 | A1 * | 9/2005 | Sonehara ........ | G01N 27/44721 |
| | | | | 204/603 |

FOREIGN PATENT DOCUMENTS

| JP | 5039156 | B2 | 10/2012 |
| JP | 2014-194362 | A | 10/2014 |
| JP | 6113549 | B2 | 4/2017 |

OTHER PUBLICATIONS

Andriy Tsupryk, et al., Novel design of multicapillary arrays for high-throughput DNA sequencing, Electrophoresis 2006, 27, p. 2869-2879.

International Search Report of PCT/JP2020/047357 dated Mar. 16, 2021.

* cited by examiner

FIG. 8

CAPILLARY NUMBER n = 1, 2, ···, N

CORRECTION REFERENCE: $n_3 = 1.41$, $\Delta Z = 0$ μm

CORRECTION REFERENCE: $n_3$=1.33, $\Delta Z$=0 μm

CORRECTION REFERENCE: $n_3=1.41$, $\Delta Z=6$ μm

CORRECTION REFERENCE: $n_3=1.33$, $\Delta Z=6$ μm

CORRECTION REFERENCE: $n_3$=1.41, $\Delta Z$=0 μm

CORRECTION REFERENCE: ΔZ=0 μm (a)

(b)

(c)

CORRECTION REFERENCE: ΔZ=0 μm $n_3 = 1.41$ (a)

(b)

(c)

(d)

$n_3 = 1.41$ $n_3 = 1.33$ $n_3 = 1.33$ $n_3 = 1.41$ (a)

(b)

(c)

$n_3 = 1.41$ (a)

(b)

n₃=1.33

(a)

(b)

(c)

$n_3=1.33$ (a)

(b)

CAPILLARY-ARRAY-ELECTROPHORESIS DEVICE

TECHNICAL FIELD

The present disclosure relates to a capillary-array-electrophoresis device.

BACKGROUND ART

A capillary-array-electrophoresis device is widely used in which a plurality of capillaries made of quartz glass is filled with an electrophoretic separation medium such as an electrolyte solution, an electrolyte solution containing a polymer gel, or a polymer and in which electrophoresis analysis is performed in parallel. Compared with the conventional capillary-electrophoresis devices using one capillary, the capillary-array-electrophoresis device can not only improve the analysis throughput but also reduce the analysis cost per sample. The most widely used capillary-array-electrophoresis devices are the 3500 series genetic analyzer and the 3730 series genetic analyzer sold by Thermo Fisher Scientific. The 3500 series genetic analyzer can perform parallel electrophoresis analysis of 8 or 24 capillaries. The 3730 series genetic analyzer can perform parallel electrophoresis analysis of 48 or 96 capillaries. In any case, the laser-irradiation portions of the plurality of capillaries (portions irradiated with the laser in the capillary array) are arranged on the same plane. A polyimide coating of each capillary around the laser-irradiation portion is removed. The same plane is referred to as an array plane. An array of a plurality of capillaries is referred to as a capillary array. When the capillary array is composed of N capillaries, the N capillaries are numbered from 1 to N in order from the capillary at the end of the capillary array. By introducing the laser beam from the side of the array plane during electrophoresis, the plurality of capillaries are simultaneously irradiated. Laser-induced fluorescence emitted from each of the capillaries is spectrally dispersed and simultaneously detected. A method in which the laser beam is incident from the side of the array plane to simultaneously irradiate a plurality of capillaries is called a multiple laser-beam-focusing technique, and is described in detail in PTL 1. In the multiple laser-beam-focusing technique, each capillary acts as a convex lens, and the laser beam is repeatedly focused along the array plane, thereby enabling simultaneous irradiation of the plurality of capillaries. As a result, DNA sequencing or DNA fragment analysis of the same number of samples as the number of capillaries can be performed in parallel. As described in PTL 1, in laser-irradiation portions of a plurality of capillaries, when an outer radius of the capillary is R (an outer diameter is 2R), an inner radius of the capillary is r (an inner diameter is 2r), a refractive index of a material of the capillary is $n_2$, a refractive index of an external medium of the capillary is $n_1$, a refractive index of an internal medium (separation medium) of the capillary is $n_3$, a distance between an incident position of a laser beam and an array plane is x ($\leq$r), and x=r/2, a refraction angle when the laser beam transmits through one capillary is represented by Expression (1).

[Math. 1]

$$\Delta\theta = 2 \cdot \left\{ -\sin^{-1}\left(\frac{r}{2 \cdot R}\right) + \sin^{-1}\left(\frac{r \cdot n_1}{2 \cdot R \cdot n_2}\right) - \sin^{-1}\left(\frac{n_1}{2 \cdot n_2}\right) + \sin^{-1}\left(\frac{n_1}{2 \cdot n_3}\right) \right\} \tag{1}$$

Each capillary acts as a concave lens when $\Delta\theta>0$ is satisfied and acts a convex lens when $\Delta\theta<0$ is satisfied. Under the condition of $\Delta\theta<0$, the multiple laser-beam focusing functions, and thus it becomes possible to perform the simultaneous irradiation of a plurality of capillaries with the laser beam. On the other hand, under the condition of $\Delta\theta>0$, the multiple laser-beam focusing does not function, and the laser beam diverges from the array plane, so that it becomes impossible to perform the simultaneous irradiation of the plurality of capillaries with the laser beam. In general, the material of the capillary is quartz glass, and is fixed at $n_2$=1.46. From Expression (1), it can be seen that it is more preferable as $n_1$ is smaller and $n_3$ is larger in order to enhance the convex lens action (weaken the concave lens action) of each capillary. Conversely, the larger $n_1$ and the smaller $n_3$, the stronger the concave lens action of each capillary.

Even when the multiple laser-beam focusing functions, due to reflection losses of the laser beam at the interfaces between the medium outside the capillaries and the capillary and due to reflection losses of the laser beam at the interfaces between the medium inside the capillaries and the capillary, the intensity of the laser beam attenuates as the laser beam travels in the capillary array, and intensity of fluorescence obtained from the capillaries also attenuates accordingly. If the fluorescence intensity is greatly different between the capillaries, a plurality of samples cannot be analyzed under equivalent conditions, which is disadvantageous (in the embodiment described later, the fluorescence intensity is used as a representative of the signal intensity, but signal intensity other than the fluorescence intensity, for example, scattering intensity or absorbance may be used). Therefore, in the 3500 series genetic analyzer and the 3730 series genetic analyzer, a laser beam emitted from one laser-light source is divided into two beams. The two laser beams are made incident from both sides of the array plane, so that the multiple laser-beam focusing functions for each beam. In this way, the sum of the intensity of the laser beam incident from one side of the array planes and the intensity of the laser beam incident from the other side of the array planes is made uniform. A configuration in which the laser beam is incident only from one side of the array plane is referred to as one-side irradiation. A configuration in which the laser beams are incident from both sides of the array plane is referred to as both-side irradiation. It is common in both the one-side irradiation and the both-side irradiation whether the multiple laser-beam focusing functions or does not function. When the capillary array includes N capillaries, in the case of one-side irradiation, the N capillaries are numbered from 1 to N, from the capillary at the end on which the laser beam is incident, to the capillary at the opposite end from which the laser beam is emitted. In the case of both-side irradiation, the N capillaries are numbered from 1 to N, from the capillary at one end, to the capillary at the opposite end.

In DNA sequence or DNA fragment analysis performed by the 3500 series genetic analyzer and the 3730 series genetic analyzer, a polymer solution containing urea as a denaturant at a high concentration is used as a separation medium in order to electrophoretically separate DNA fragments contained in a sample in a single-stranded state. In fact, each of POP-4, POP-6, and POP-7, which are separation media sold for the 3500 series genetic analyzer and the 3730 series genetic analyzer, contains 8 M urea. While the refractive index of water is 1.33, the refractive index of the above polymer solution containing 8 M urea has increased to $n_3$=1.41. This enhances the convex lens action of each capillary, which is an advantageous condition for multiple laser-beam focusing.

With the configuration based on PTL 1, in the 3500 series genetic analyzer, laser-irradiation portions of a plurality of capillaries having an outer diameter $2R=323$ μm and an inner diameter $2r=50$ μm are disposed in the air. That is, $n_1=1.00$. Since $\Delta\theta=-1.3°$ from the above Expression (1), it can be seen that each capillary has a convex lens action. Therefore, the multiple laser-beam focusing functions to enable simultaneous irradiation of 8 or 24 capillaries with a laser beam. However, in this configuration, since the reflection losses of the laser beam at the interfaces between the air outside the capillaries and the capillaries (made of quartz glass) are large, the number of capillaries that can be simultaneously irradiated is about 24.

On the other hand, with the configuration disclosed in PTL 2, the number of capillaries that can be simultaneously irradiated is increased in the 3730 series genetic analyzer. In the 3730 series genetic analyzer, laser-irradiation portions of a plurality of capillaries having an outer diameter $2R=126$ μm and an inner diameter $2r=50$ μm are disposed in a fluorine solution having a refractive index $n_1=1.29$. Since $\Delta\theta=-0.69°$ from the above Expression (1), it can be seen that each capillary has a convex lens action and the multiple laser-beam focusing functions. Further, since the reflection losses of the laser beam at the interfaces between the fluorine solution outside the capillaries and the capillaries (made of quartz glass) are reduced, the number of capillaries that can be simultaneously irradiated increases. Therefore, it is possible to perform simultaneous irradiation of 48 or 96 capillaries with laser beams.

The configuration described in NPL 1 further increases the number of capillaries that can be simultaneously irradiated. In this configuration, laser-irradiation portions of a plurality of capillaries having an outer diameter $2R=126$ μm and an inner diameter $2r=50$ μm are disposed in a matching solution having a refractive index $n_1=1.46$. Among the plurality of capillaries, odd-numbered capillaries from one end are used for analysis (hereinafter, analysis capillaries), and even-numbered capillaries are used as rod lenses (hereinafter, lens capillaries). That is, the analysis capillaries and the lens capillaries are alternately arranged. A refractive index of a medium (separation medium) inside the analysis capillaries is set to $n_3=1.41$. A refractive index of a medium inside the lens capillaries is set to $n_4=1.53$. The capillaries are made of quartz glass and has $n_2=1.46$. In addition, since reflection losses of a laser beam at the interfaces between the matching solution outside the capillaries and the capillaries (made of quartz glass) becomes zero, the number of capillaries that can be simultaneously irradiated further increases. Further, NPL 1 describes a definition of a maximum number of capillaries that can be simultaneously irradiated with a laser beam from P. 2874 to P. 2875. When an incident intensity of the laser beam is 100% by one-side irradiation, the maximum number of capillaries that can be simultaneously irradiated is the number obtained by doubling the number of capillaries where the intensity of the laser beam irradiating the capillaries is 50% or more. This is because the irradiation intensity of each capillary is expected to be uniform when irradiating the capillary array having such a number of capillaries on both sides. According to this definition, the maximum number of capillaries in the configuration of PTL 2 is 150, and the maximum number of capillaries in the configuration of NPL 1 is 550.

CITATION LIST

Patent Literature

PTL 1: JP 3654290 B2
PTL 2: JP 5039156 B2
PTL 3: JP 6113549 B2

4

Non-Patent Literature

NPL 1: Electrophoresis 2006, 27, 2869-2879

SUMMARY OF INVENTION

Technical Problem

In all of the above known techniques, the separation medium contains a high concentration of urea, and the refractive index is $n_3=1.41$. On the other hand, in a capillary-electrophoresis device using one capillary, the separation medium does not necessarily contain a high concentration of urea, and various types of separation media are used. For example, a separation medium for electrophoretically separating DNA fragments in a double-stranded state does not contain urea and has a refractive index of $n_3=1.33$, which is the same as that of water. That is, in general, a refractive index of a separation medium used in capillary electrophoresis can have various values of $1.33 \leq n_3 \leq 1.41$. In recent years, in order to increase throughput or reduce cost of electrophoresis analysis using such various types of separation media, it is required to use such various types of separation media in a capillary-array-electrophoresis device.

However, in any of the configurations of the above-described known techniques, when $n_3=1.33$, the convex lens action of each capillary is lost, the concave lens action becomes strong, and the multiple laser-beam focusing does not function. That is, it becomes impossible to perform parallel electrophoresis analysis using a plurality of capillaries. Specifically, it is as follows.

In the 3500 series genetic analyzer based on PTL 1, when $n_3=1.33$, since $\Delta\theta=+1.3°$ is obtained from Expression (1), it can be seen that each capillary has a concave lens action. Therefore, the multiple laser-beam focusing does not function, and thus it is not possible to perform simultaneous irradiation of 8 or 24 capillaries with a laser beam.

In the 3730 series genetic analyzer based on PTL 2, when $n_3=1.33$, since $\Delta\theta=+2.9°$ is obtained from Expression (1), it can be seen that each capillary has a concave lens action. Therefore, the multiple laser-beam focusing does not function, and thus it is not possible to perform simultaneous irradiation of 48 or 96 capillaries with a laser beam.

In the configuration based on NPL 1, when $n_3=1.33$, the refraction angle of one analysis capillary is $\Delta\theta A=+6.6°$, while the refraction angle of one lens capillary is $\Delta\theta B=-3.0°$ according to Expression (1). Under these conditions, since $\Delta\theta A+\Delta\theta B=+3.6°$ is obtained, one set of one analysis capillary and one lens capillary exhibits a concave lens action, and the multiple laser-beam focusing does not function. On P. 2875 of NPL 1, there is a description that the configuration of NPL 1 is advantageous even in the case of $n_3=1.33$. However, according to the definition of the maximum number of capillaries in NPL 1 described above, the maximum number of capillaries in the case of $n_3=1.33$ is only about 8 from FIG. 11 of NPL 1. Therefore, in the case of $n_3=1.33$, the configuration of NPL 1 does not function.

On the other hand, PTL 3 discloses a correction method for equalizing apparent fluorescence intensity (hereinafter, corrected fluorescence intensity) of each capillary obtained by multiplying fluorescence intensity (thereafter, measured fluorescence intensity) of each capillary by a correction coefficient of each capillary recorded in advance on a computer in a capillary-array-electrophoresis device. Capillary number n of N capillaries of a N-capillary array is defined as n=1, 2, . . . , and N in order from the end of the N-capillary array. Measured fluorescence intensity of the capillary with capillary number n is defined as I(n). I(n) at the time of calibration is defined as $I_0(n)$. The capillary number of the capillary with the maximum measured fluorescence is defined as m. Based on the above definitions, the correction coefficient k(n) for the capillary with capillary number n is expressed by Expression (2).

[Math. 2]

$$k(n)=I_0(m)/I_0(n) \qquad (2)$$

The corrected fluorescence intensity J(n) of the capillary with capillary number n is obtained by Expression (3).

[Math. 3]

$$J(n)=k(n) \times I(n) \qquad (3)$$

Here, the calibration means a step of analyzing a standard sample having a constant concentration in all capillaries before analyzing actual samples. The measured fluorescence intensity of each capillary that analyzes the standard sample varies from capillary to capillary. However, the measured fluorescence intensity is converted by the above correction method into the corrected fluorescence intensity, which is uniform in each capillary. The correction coefficient k(n) in Expression (2) is set such that the corrected fluorescence intensity of each capillary that analyzes the standard sample is equal to the maximum measured fluorescence intensity. However, this correction method is based on the premise that k(n) is stable. For example, it is necessary that the acquired k(n) does not greatly change when repeating the calibration a plurality of times.

In view of such a situation, the present disclosure proposes a technique that enables electrophoresis analysis even using various separation media having any refractive index in the range of $1.33 \leq n_3 \leq 1.41$ in a capillary-array-electrophoresis device (of course, it is also possible to use a separation medium having a refractive index outside the range of $1.33 \leq n_3 \leq 1.41$).

Solution to Problem

In order to solve the above problems, the present disclosure proposes, for example, a capillary-array-electrophoresis device including: a laser-light source configured to emit a laser beam; a capillary array configured such that laser-irradiation portions of N capillaries collectively irradiated with the laser beam are substantially arranged on a same array plane, where N is an integer of 2 or more; an optical system that collectively measures light emissions from the N capillaries; and a computer that performs predetermined processing on the light intensities measured by the optical system and outputs the processed light intensities. At least an analysis mode of a capillary electrophoresis using a separation medium having a refractive index $n_3 < 1.36$ is provided, $|A| > |B|$ is satisfied. Here, around the laser-irradiation portions, an outer radius of the N capillaries is R, an inner radius of the N capillaries is r, a refractive index of an external medium of the N capillaries is $n_1$, a refractive index of a material of the N capillaries is $n_2$, and a refractive index of an internal medium of the N capillaries is $n_3$. The N capillaries are numbered from 1 to N in order from the capillary at one end of the capillary array. The laser-irradiation light intensity of the capillary with capillary number n is defined as L(n). An average value of a second derivative of L(n) in the range of $1 \leq n \leq N$ is defined as A (indicating a degree of convexity of a curve representing a relationship between n and L(n)). When a light emitting substance of equal concentration exists inside the N capillaries at the laser-irradiation portions, the processed light intensity of the capillary with capillary number n output by the computer is defined as H(n). An average value of a second derivative of H(n) in the range of $1 \leq n \leq N$ is defined as B (indicating a degree of convexity of a curve representing a relationship between n and H(n)).

Other features of the present disclosure will be clear from the description and the accompanying drawings of this specification. In addition, embodiments of the present disclosure are achieved and realized by elements, combinations of various elements, the following detailed description, and the attached claims.

It is necessary to understand that the description of this specification is given only as a typical example, and does not limit the scope of claims or applications of the present disclosure.

Advantageous Effects of Invention

According to the technology of the present disclosure, in a capillary-array-electrophoresis device, it is possible to perform electrophoresis analysis using various separation media having an arbitrary refractive index in a range of $1.33 \leq n_3 \leq 1.41$. In particular, it becomes possible to perform capillary-electrophoresis analysis using a separation medium having a low refractive index that is the same as or close to the refractive index 1.33 of water. This makes it possible to greatly expand the application range of the capillary-array-electrophoresis device capable of improving the analysis throughput and reducing the analysis cost per sample.

BRIEF DESCRIPTION OF DRAWINGS

FIG. 8 is a diagram for explaining the definition of an array-plane error $\Delta Z$ of the capillary array.

DESCRIPTION OF EMBODIMENTS

Figure 1:
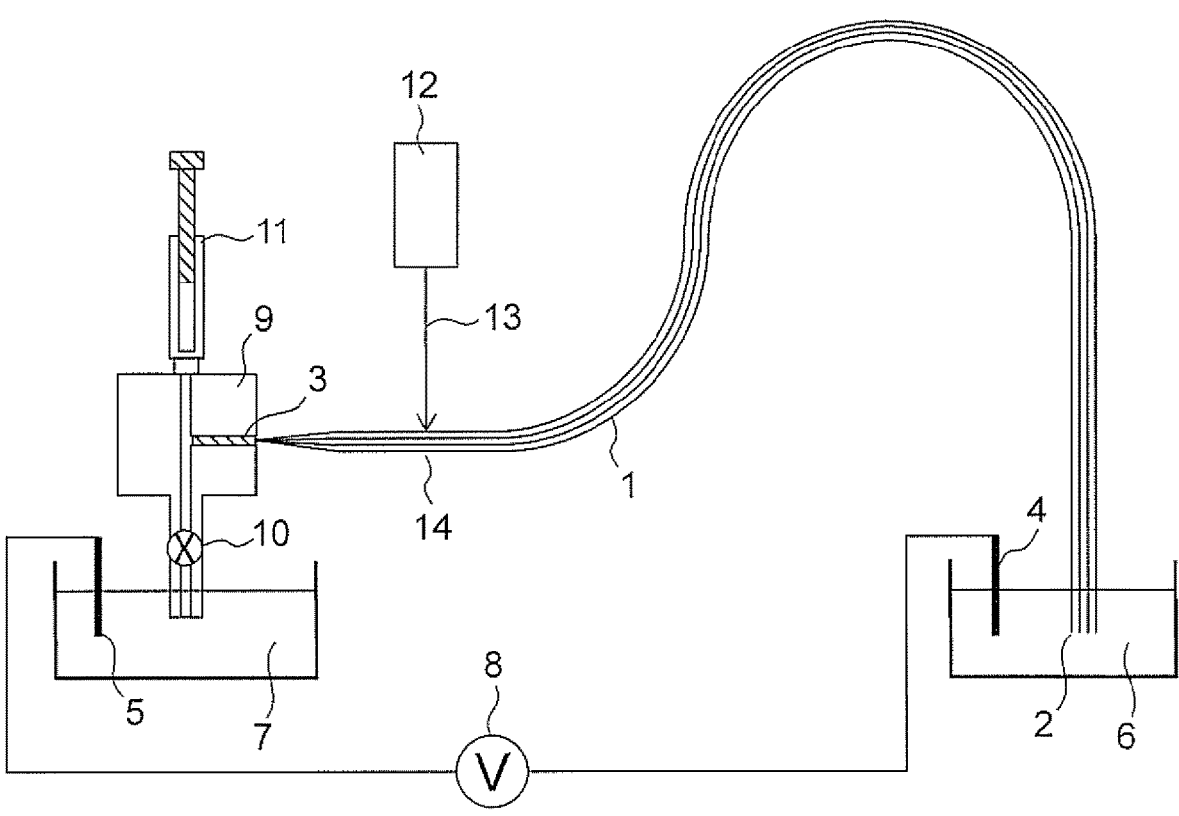
FIG. 1 is a diagram illustrating a configuration example of a capillary-array-electrophoresis device.

The technology of the present disclosure relates to a capillary-array-electrophoresis device that simultaneously analyzes a plurality of samples by simultaneously irradiating a plurality of capillaries with a laser beam and simultaneously detecting the emitted fluorescence from each of the capillaries during electrophoresis using the plurality of capillaries.

(A) Summary of the Technology of the Present Disclosure

The present disclosure mainly proposes a technique that makes it possible to use a separation medium having a low refractive index equivalent to the refractive index 1.33 of water or having a refractive index of less than 1.36. When such a separation medium having a low refractive index is used, multiple laser-beam focusing does not function even if the technology disclosed in any known example (PTLs 1 to 3 and NPL) is used, and thus it is difficult to perform simultaneous irradiation of a plurality of capillaries with a laser beam.

The present disclosure also proposes a technique for enabling capillary-electrophoresis analysis using not only a separation medium having a low refractive index as described above but also a separation medium having a high refractive index, typically a separation medium having a refractive index of 1.36 or more, and 1.42 or less. The maximum number of capillaries that can be simultaneously irradiated is preferably larger, and may be 8 or more, or 24 or more depending on the situation. Among irradiation intensities and fluorescence intensities of the plurality of capillaries in the same capillary array, the lowest irradiation intensity and fluorescence intensity are preferably larger. A fluorescence intensity expected when an entire intensity of a laser beam emitted from a laser-light source irradiates the inside of one capillary is set to 1. It is empirically known that practical sensitivity can be obtained when the minimum value MIN (Minimum) of the fluorescence intensity satisfies MIN≥0.2. In addition, the smaller the variation in the irradiation intensity and the fluorescence intensity between the plurality of capillaries in the same capillary array is, the better. It has been empirically found that different samples can be analyzed under equivalent conditions if the coefficient of variation CV of the irradiation intensity and the fluorescence intensity is CV≤15%, desirably CV≤10%.

For each capillary in the capillary array, when setting the capillary outer diameter to 2R=126 μm, the capillary inner diameter to 2r=50 μm, the capillary outside to air and $n_1$=1.00, the capillary material to quartz glass and $n_2$=1.46, and the capillary inside to a separation medium and $n_3$=1.33, $\Delta\theta$=−3.2° is obtained from Expression (1), and thus it has been found that each capillary exhibits a convex lens action and the multiple laser-beam focusing functions. In the 3500 series genetic analyzer based on PTL 1, the difference from the above case of $n_3$=1.33 is that the outer diameter 2R of each capillary is reduced from 323 μm to 126 μm. As a result, the concave lens action of each capillary is converted into the convex lens action. As a result of further studies, it has been found that $\Delta\theta$<0 is obtained and a convex lens acts when setting the outer diameter 2R of each capillary to 220 μm or less. Generalizing the convex lens condition without limiting the capillary inner diameter to 2r=50 μm, Δθ<0 is obtained when R/r≤4.4. A low refractive index separation medium of $n_3$=1.33 is not examined in PTL 1. That is, this is a condition found for the first time by the technology of the present disclosure.

In a case where the capillary outer diameter is 2R=126 μm and the capillary inner diameter is 2r=50 μm, when the separation medium inside the capillary has a low refractive index of $n_3$=1.34 and 1.35, Δθ=−3.5° and −3.8° are obtained from Expression (1), and it has been found that each capillary exhibits a convex lens action and the multiple laser-beam focusing functions. As a result of further studies, it has been found that Δθ<0 is obtained and thus a convex lens acts when the outer diameter 2R of the capillary is 240 μm or less, and 264 μm or less, respectively. In general, when R/r≤4.8 and 5.3, respectively, Δθ<0 is obtained and thus it has been found that a convex lens acts. Such a low refractive index separation medium is not examined in PTL 1. That is, these conditions were found for the first time by the technology of the present disclosure.

As a result of performing an experiment under the above conditions having the convex lens action, the multiple laser-beam focusing functions and it is possible to realize simultaneous irradiation of a plurality of capillaries with a laser beam, and thus MIN≥0.2 and CV≤15% are satisfied, which are practical performances. However, it has become clear that CV≤10% is not satisfied. The coefficient of variation of fluorescence intensities of the capillaries is suppressed to be lower in the case of both-side irradiation than in the case of one-side irradiation. But, CV≤10% is not satisfied, and even CV≤15% is not satisfied in some cases. Therefore, in order to reduce the CV, a known correction method represented by PTL 3 has been applied. However, it has been found that, due to the influence of random variation in the fluorescence intensities of the capillaries in the capillary array, there is a case where uniformization of the fluorescence intensities of the capillaries does not function, or conversely, the degree of variation in the fluorescence intensities of the capillaries increases in some cases.

Fluorescence-intensity distribution graphically represents a change in fluorescence intensity in a capillary array, that is, a relationship between capillary number and fluorescence intensity of capillary with that capillary number. In the case of both-side irradiation, the fluorescence-intensity distribution fluctuates up and down with respect to the capillary number, but as a whole it has a downward convex shape centered near the center of the capillary array (in the vicinity of the capillary with capillary number N/2 or N/2+1 when the capillary array includes N capillaries and N is an even number, alternatively, in the vicinity of the capillary with capillary number (N+1)/2 when the capillary array includes N capillaries and N is an odd number) (see FIGS. 9 and 10). In general, the coefficient of variation CV increases as the degree of ups and downs described above increases and as the degree of downward convexity described above increases. However, in the fluorescence-intensity distribution, since the above ups&downs and downward convexity are observed to be mixed with each other, they cannot be distinguished from each other. Therefore, it is difficult to derive the degree of each. On the other hand, by examination using ray-trace simulations, it has been found that the degree of the ups&downs increases as an array-plane error ΔZ of the capillary array increases, whereas the degree of the downward convexity increases as $n_3$ decreases. Here, in the present specification, an array-plane error ΔZ is defined as follows. First, it is assumed that Z axis is set in a direction perpendicular to an array plane and that the array plane is located at Z=0 μm. In addition, it is assumed that the median value of Z coordinates of the central axes of the plurality of capillaries in laser-irradiation portions is set to zero. An absolute value of the Z coordinate of the central axis of the capillary farthest from the array plane is defined as ΔZ. Therefore, the Z coordinates of the central axes of the capillaries are dispersed within a range of ±ΔZ. It has been found that the above-mentioned case where CV≤15% is not satisfied occurs when ΔZ is large. Of course, the degree of the ups&downs is increased not only by the array-plane error ΔZ of the capillary array but also by various other experimental errors.

In view of the above complicated situation, the present disclosure proposes a technique for most efficiently reducing the CV by correcting the fluorescence intensity of each capillary to reduce or eliminate the degree of the downward convexity while allowing the ups&downs in the fluorescence-intensity distribution. The reason why the ups&downs is allowed is it is difficult to obtain ΔZ for each capillary array and the specific shape of the ups&downs randomly changes due to various factors even if ΔZ is known. This is the same reason as the reason why the above-described known correction method (PTL 3) does not function. In addition, since it has been clarified by the present disclosure that the degree of the downward convexity in the fluorescence-intensity distribution changes depending on $n_3$, the present disclosure also proposes a technique for dynamically changing correction coefficients depending on $n_3$. Such a correction method is not disclosed in the known correction methods including PTL 3. Hereinafter, each embodiment of the present disclosure will be described in detail. Note that, although each embodiment will be separately described below, the techniques described in the embodiments are not exclusive and can be combined with each other as appropriate.

(B) First Embodiment

Configuration Example of Capillary-Array-Electrophoresis Device

FIG. 1 is a diagram illustrating a configuration example of a capillary-array-electrophoresis device. By this capillary-array-electrophoresis device double-stranded DNA fragment analysis is performed in addition to DNA sequencing and single-stranded DNA fragment analysis. DNA sequencing and single-stranded DNA fragment analysis are also performed by the conventional capillary-array-electrophoresis devices. In this embodiment, using 24 capillaries (however, only four capillaries are illustrated in FIG. 1), DNA sequencing of different samples is first performed in each capillary, and then double-stranded DNA fragment analysis of different samples is performed in each capillary. Samples for DNA sequencing include single-stranded DNA fragments of various base lengths labeled with four kinds of fluorophores corresponding to four kinds of bases at the ends of each DNA fragment. An electrophoretic separation medium filled in each capillary when DNA sequencing is performed is a polymer solution containing 8 M urea as a denaturant. Its refractive index is $n_3$=1.41. On the other hand, samples for double-stranded DNA fragment analysis include double-stranded DNA fragments of various base lengths labeled with two kinds of fluorophores. The double-stranded DNA fragments labeled with one fluorophore are PCR products. The double-stranded DNA fragments labeled with the other fluorophore is size markers. An electrophoretic separation medium filled in each capillary when double-stranded DNA fragment analysis is performed is a polymer solution containing no urea as a denaturant. Its refractive index is $n_3=1.33$. One analysis session is performed by the following steps (i) to (vi).

(i) First, sample-injection ends 2 of the 24 capillaries 1 are immersed in a cathode-side-buffer solution 6. The sample-elution ends 3 of the 24 capillaries 1 are connected to the anode-side-buffer solution 7 via the polymer solution in a polymer block 9. Here, the 24-sample-elution ends 3 are bundled into one to facilitate connection with the polymer block 9.

(ii) Next, a valve 10 of the polymer block 9 is closed to pressurize the internal polymer solution by pushing down a piston of a syringe 11 connected to the polymer block 9. Then, the polymer solution is filled into each capillary 1 from the sample-elution end 3 toward the sample-injection end 2.

(iii) Subsequently, the valve 10 is opened to electrokinetically inject a different sample into each capillary 1 from the sample-injection end 2. Then, a high voltage is applied between a cathode 4 and an anode 5 by a power supply 8 to start capillary electrophoresis. The DNA fragments labeled with the plurality of kinds of fluorophores are electrophoresed from the sample-injection end 2 to the sample-elution end 3 in each capillary.

(iv) In parallel, a position of each capillary 1 at a certain electrophoresis distance from the sample-injection end 2 is defined as a laser-irradiation portion 14. The laser-irradiation portions 14 of the 24 capillaries 1 is collectively irradiated with a laser beam 13 emitted from a laser-light source 12 by the multiple laser-beam-focusing technique. Here, a coating of each capillary 1 in the vicinity of the laser-irradiation portion 14 is removed in advance. Each of the capillaries 1 in the vicinity of the laser-irradiation portion 14 is arranged on an array plane The laser beam 13 is focused and then incident on the laser-irradiation portions 14 along the array plane from the side of the array plane. In FIG. 1, for the sake of simplicity, it is depicted that one-side irradiation of the laser beam 13 is performed, but actually, both-side irradiation is performed by dividing the laser beam 13 into two.

(v) Then, the DNA fragments labeled with the plurality of kinds of fluorophores are electrophoresed inside each capillary 1. When passing through the laser-irradiation portion 14, the fluorophore labeling each DNA fragment is excited by irradiation with the laser beam 13 and emits fluorescence. That is, the plurality of kinds of fluorophores emit fluorescence from 24-light-emission points (24-laser-irradiation portions). Each fluorescence intensity changes from moment to moment with electrophoresis.

(vi) Finally, each sample injected into each capillary is analyzed by detecting multiple colors of fluorescence emitted from each light-emission point and by analyzing the obtained time-series data of each of the multiple-color-fluorescence intensity.

The above steps (i) to (vi) are common to the both cases of performing DNA sequencing and double-stranded DNA fragment analysis, but the polymer solution and the buffer solution are appropriately changed. Further, an analysis session including steps (i) to (vi) can be repeated a plurality of times. For example, a number of different samples can be analyzed by analyzing samples 1 to 24 in a first analysis session, analyzing samples 25 to 48 in a second analysis session, and so on. In the above, DNA sequencing may be repeated using the same polymer solution and buffer solution, or the analysis may be switched to double-stranded DNA fragment analysis in the middle. Any application can be selected in any analysis session.

Configuration Example of Optical System for Fluorescence Detection

Figure 2:
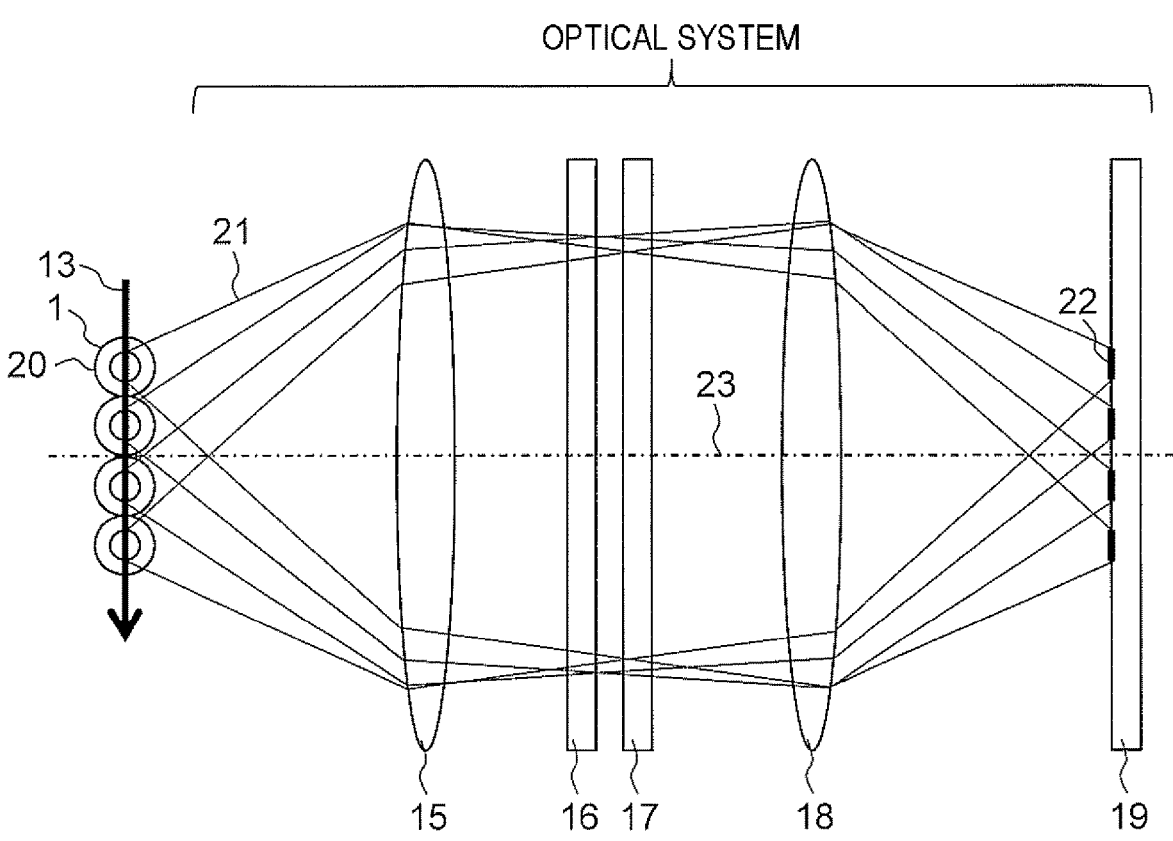
FIG. 2 is a diagram illustrating a configuration example of an optical system of the capillary-array-electrophoresis device.

FIG. 2 is a diagram illustrating a cross section of a configuration example of an optical system that performs fluorescence detection in the capillary-array-electrophoresis device. The present optical system is located on the back side of the laser-irradiation portions 14 in FIG. 1. Similarly to FIG. 1, FIG. 2 depicts one-side irradiation of the four-capillary array, but this is actually both-side irradiation of the 24-capillary array.

The capillaries 1 arranged on the array plane are simultaneously irradiated by the laser beam 13 with the multiple laser-beam focusing technique. The laser-irradiation portions 14 of the respective capillaries 1 serve as fluorescence light-emission points 20. The fluorescence 21 emitted from each of the light-emission points 20 is collimated collectively by a condenser lens 15. The laser beam is blocked by a laser-cut filter 16. The fluorescence 21 is wavelength-dispersed in the direction of the central axis of each capillary by transmitting the fluorescence 21 through a transmission-diffraction grating 17. An image point 22 of each emission point 20 is formed on a sensor 19 by an image-forming lens 18. The sensor 19 may be an area sensor such as a CCD, a CMOS, a photodiode array, or the like as long as a plurality of image points 22 can be simultaneously measured. Each image point 22 is actually wavelength-dispersed in the depth direction in FIG. 2, but a single wavelength portion of each image point 22 is schematically illustrated in FIG. 2.

In such an optical system, as the distance from the optical axis of the optical system to the light-emission point 20 increases, the light collection efficiency of light emission from the light-emission point 20 decreases. This is because, as illustrated in FIG. 2, as the distance increases, the condensing angle of the fluorescence 21 emitted from the light-emission point 20 by the condenser lens 15 is reduced by the vignetting effect of the optical system. Therefore, even if fluorescence of equal intensity is emitted from each light-emission point 20, the fluorescence intensity of the corresponding image point 22 decreases as the distance increases. Magnitude of the vignetting effect, that is, optical-system-correction coefficients to reflect the vignetting effect is determined by the optical system, and can be obtained by calculations or experiments. Based on the vignetting effect, the fluorescence intensity at each image point 22 can be calculated by multiplying the fluorescence intensity at each light-emission point 20 by the corresponding optical-system-correction coefficient.

System Configuration Example for Data Analysis and Device Control

Figure 3:
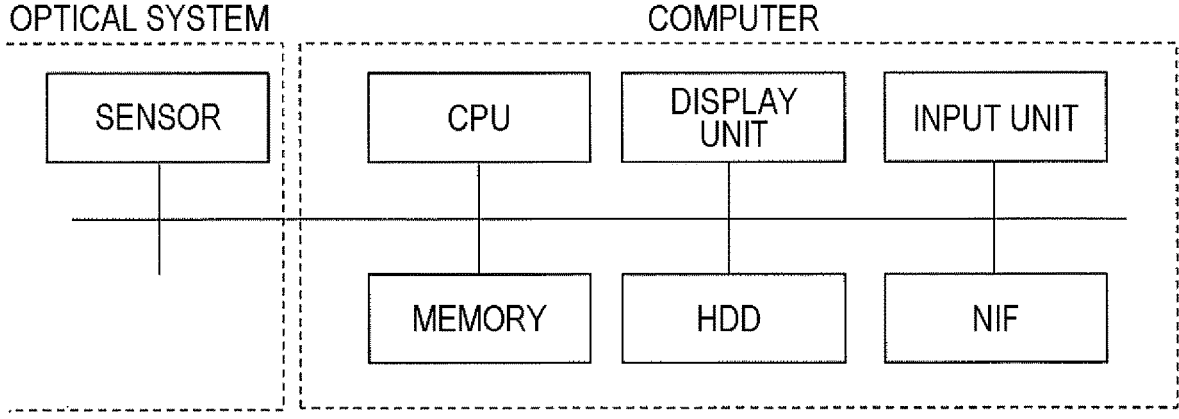
FIG. 3 is a diagram illustrating a configuration example illustrating cooperation between a sensor and a computer.

FIG. 3 shows a configuration example illustrating cooperation between the sensor and a computer. The optical system is a part of the capillary-array-electrophoresis device. The sensor is a part of the optical system. The computer is connected to the capillary-array-electrophoresis device. The computer not only performs data analysis but also controls the capillary-array-electrophoresis device. Data analysis condition setting and capillary-array-electrophoresis device control condition setting are performed through a touch panel, a keyboard, a mouse, or the like as an input unit. Time-series raw data of signals output from the sensor are sequentially stored in a memory. The analysis parameter information stored in a database in an HDD is stored in the memory. The CPU analyzes the time-series raw data stored in the memory using the analysis parameter information stored in the memory to derive time-series analysis data and to sequentially store the time-series analysis data in the memory. The CPU simultaneously displays the time-series analysis data on a monitor which is a display unit. An analysis result can be collated with information on a network through a network interface NIF.

Configuration Example of Conventional Capillary Array

Figure 4:
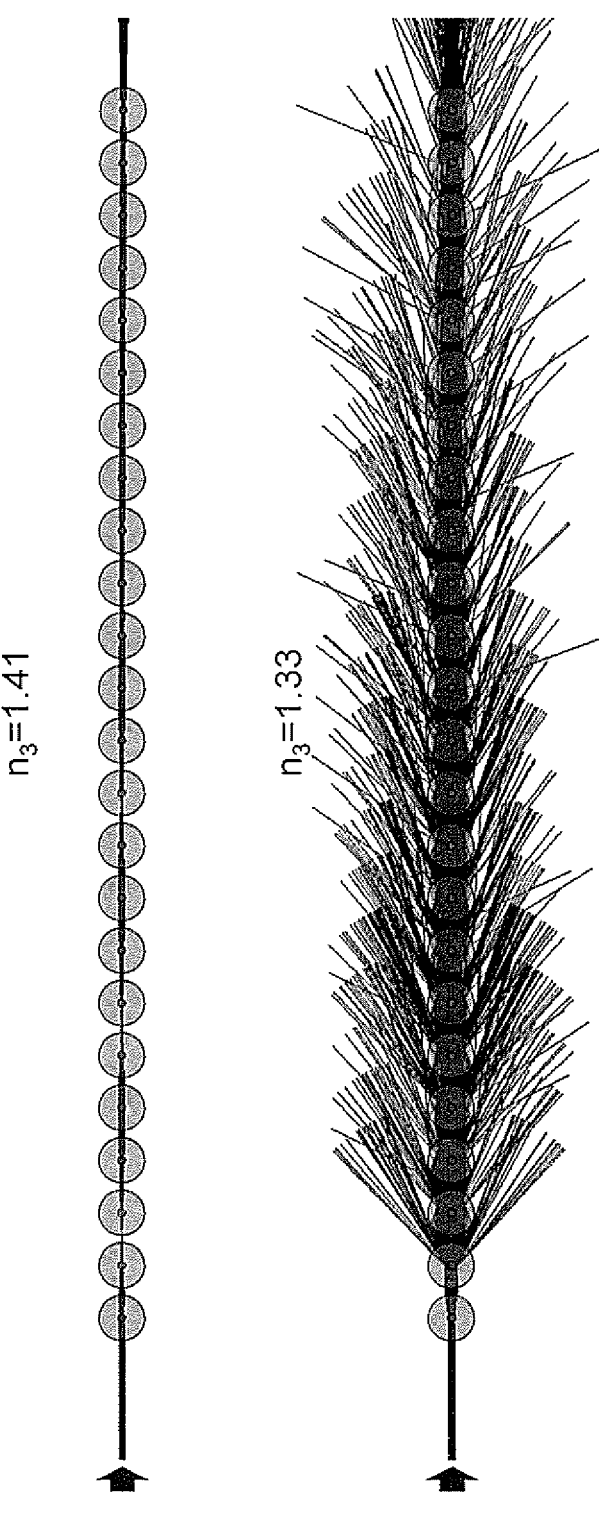
FIG. 4 is a diagram illustrating a configuration of a capillary array based on PTL 1 and laser-beam ray-tracking results.

The upper part of FIG. 4 is a cross-sectional view illustrating a configuration of a capillary array of the 3500 series genetic analyzer based on PTL 1. Laser-irradiation portions of 24 capillaries having an outer diameter 2R=323 μm and an inner diameter 2r=50 μm are arranged on the same plane (array plane) at an interval of 370 μm. An array-plane error is zero ($\Delta Z$=0 μm). A capillary outside is air and $n_1$=1.00. A capillary material is quartz glass and $n_2$=1.46. The middle part of FIG. 4 illustrates a laser-beam ray-tracing result when a laser beam having a diameter of 50 μm is incident from one side (the left side) in a case where a capillary inside is a high refractive index separation medium and $n_3$=1.41 under the above conditions. Since the multiple laser-beam focusing is obviously functioning, the insides of all 24 capillaries can be efficiently irradiated. This corresponds to $\Delta\theta$=−1.3° according to Expression (1). Each capillary therefore exhibits a convex lens action. On the other hand, the lower part of FIG. 4 illustrates a similar laser-beam ray-tracing result when the capillary inside is a low refractive index separation medium and $n_3$=1.33 under the above conditions. Since the multiple laser-beam focusing obviously does not function, the laser beam is diverged from the capillary array, and the entire capillary array cannot be efficiently irradiated. This corresponds to $\Delta\theta$=+1.3° according to Expression (1), and each capillary therefore exhibits a concave lens action.
<Relative Fluorescence-Intensity Distribution in Conventional Capillary-Array Configuration (FIG. 4)>

Figure 5:
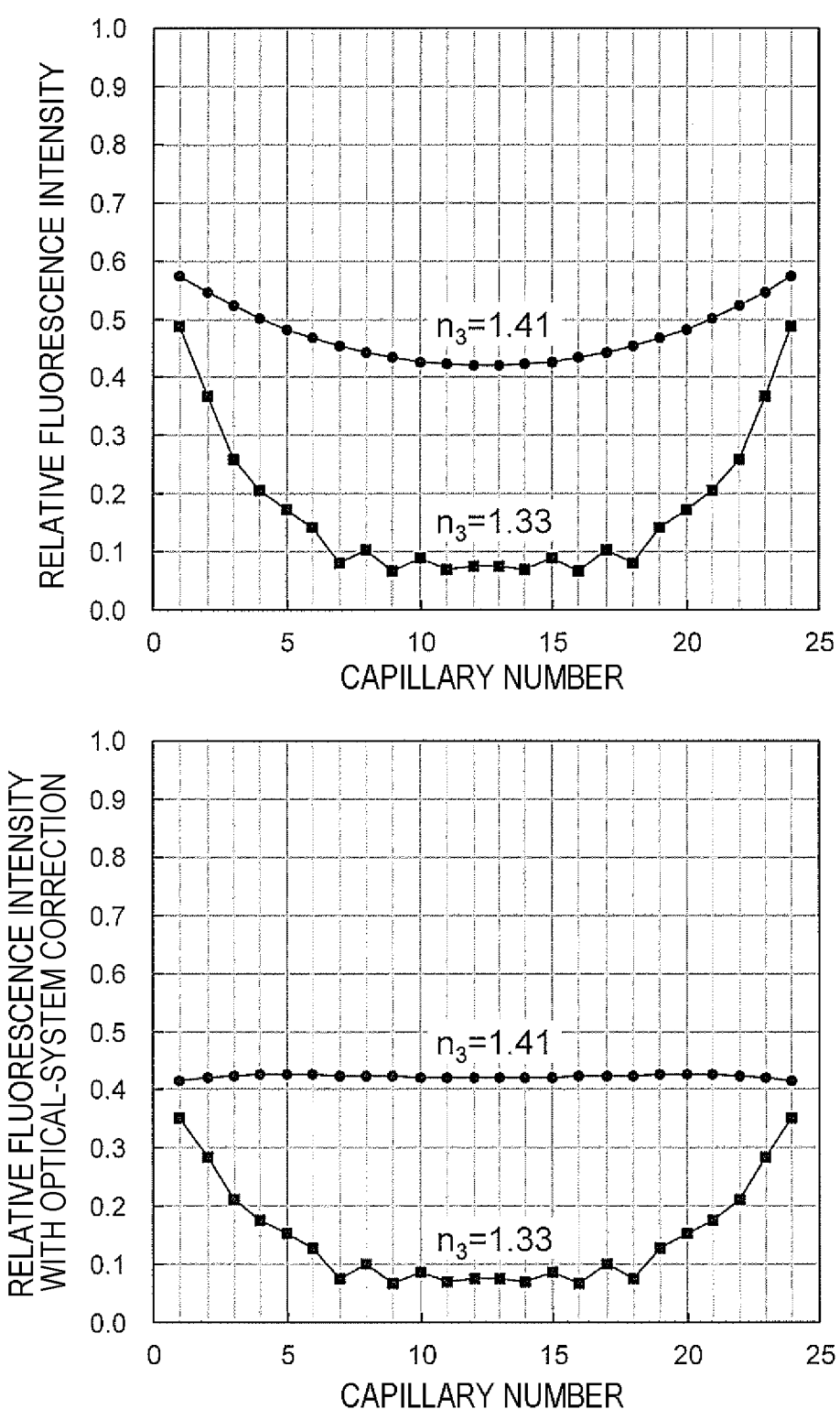
FIG. 5 is a diagram illustrating emitted fluorescence-intensity distributions and measured fluorescence-intensity distributions in the capillary array based on PTL 1.

The upper part of FIG. 5 is a diagram illustrating relative fluorescence intensity of each capillary under the both-side irradiation obtained by transforming that obtained under the one-side irradiation illustrated in the middle part and the lower part of FIG. 4. Capillary numbers are sequentially assigned in order from left to right, with the leftmost capillary being capillary number 1, in FIG. 4. The relative fluorescence intensity means a fluorescence intensity calculated from an irradiation intensity of each capillary in consideration of laser-beam reflection losses assuming that a fluorophore having a constant concentration exists in the laser-irradiation portion of each capillary. The relative fluorescence intensity expected when the entire intensity of the laser beam oscillated from a laser-light source irradiates the inside of one capillary is set to 1. In the calculation of the both-side irradiation, it is assumed that two laser beams with half of the entire intensity of the laser beam are irradiated from both sides of the capillary array. When $n_3$=1.41, the minimum value of the relative fluorescence intensity is MIN=0.42 and the coefficient of variation (=standard deviation of relative fluorescence intensity/average value of relative fluorescence intensity) is CV=11% for 24 capillaries. It is found from these results that MIN≥0.2 and CV≤15%, which are practical performances, are satisfied. However, CV≤10%, which is a more desirable condition, is not satisfied. The reason why the relative fluorescence intensity with respect to the capillary number has a downward convex distribution is that the intensity of the laser beam attenuates due to reflection losses as the laser beam travels in the capillary array although multiple laser-beam focusing is functioning. On the other hand, when setting to $n_3$=1.33, MIN=0.068 and CV=74% are obtained. It can be seen from this result that neither practical performance is satisfied.

Here, the relative fluorescence-intensity distribution of the capillary array is derived by a simpler method when the multiple laser-beam focusing is functioning and the array-plane error is zero. This method is realized for the first time in the present disclosure. In order to approximately evaluate the transmittance of the laser beam in consideration of the reflection losses, each incident angle of the laser beam incident on the interfaces between two kinds of media having different refractive indexes is assumed to be 0°. When a light passes from a medium with refractive index $n_1$ to a medium with refractive index $n_2$, reflectance and transmittance of the light at the interface between the two at an incident angle of 0° are ref={$(n_1-n_2)/(n_1+n_2)$}^2, and tra=1−ref, respectively. Thus, the transmittance T when the laser beam passes through one capillary is approximately obtained by the following Expression (4).

[Math. 4]

$$T = \left\{ 1 - \left( \frac{n_1 - n_2}{n_1 + n_2} \right)^2 \right\}^2 \cdot \left\{ 1 - \left( \frac{n_2 - n_3}{n_2 + n_3} \right)^2 \right\}^2 \tag{4}$$

Under the conditions in the 3500 series genetic analyzer based on PTL 1 illustrated in the middle part of FIG. 4, since $n_1$=1.00, $n_2$=1.46 and $n_3$=1.41 are satisfied, T=93% is calculated by Expression (4). In practice, the laser beam contains components whose incident angle is not 0° are included, and the transmittances of the components are slightly smaller than the value of Expression (4). Therefore, Expression (4) shows ideal transmittance. In the case of one-side irradiation, assuming that the laser-irradiation intensity of the capillary with capillary number n=1 is 1, the laser-irradiation intensity L(n) of the capillary with capillary number n is expressed by the following Expression (5).

[Math. 5]

$$L(n)=T^{n-1} \tag{5}$$

That is, in the 3500 series genetic analyzer, when the number of capillaries is set to N=24, since the laser-irradiation intensity attenuates to 93% every time the laser beam passes through one capillary in the capillary array, the laser-irradiation intensity of the capillary with n=24 decreases to 0.19. On the other hand, in the case of both-side irradiation, assuming that the laser-irradiation intensities of the capillaries with capillary numbers n=1 and n=N are set to 0.5 respectively, the laser-irradiation intensity L(n) of the capillary with capillary number n is expressed by the following Expression (6).

[Math. 6]

$$L(n)=0.5 \cdot (T^{n-1}+T^{N-n}) \tag{6}$$

Unlike the case of one-side irradiation, the attenuation of the intensity of the two laser beams incident from both sides of the array plane is canceled, so that the uniformity of the laser-irradiation intensity of each capillary is improved and the lowest laser-irradiation intensity is increased. However, the laser-irradiation intensity of the capillaries at both ends of the capillary array (n=1 and n=N) is the highest, and the laser-irradiation intensity of the capillary at the center of the capillary array (n=(N+1)/2 when N is odd, n=N/2 and n=N/2+1 when N is even) is the lowest. That is, as illustrated in the relative fluorescence-intensity distribution in the case of $n_3$=1.41 in the upper part of FIG. 5, a graph with horizontal axis n and vertical axis L(n) shows a downward convex distribution. Under the conditions of the 3500 series genetic analyzer described above, when the number of capillaries is set to N=24, according to Expression (6), the laser-irradiation intensity of the capillaries at both ends of the capillary array (n=1 and n=24) is 0.60, and the laser-irradiation intensity of the capillaries at the center of the capillary array (n=12 and n=13) is 0.44 (MIN=0.44). Thus, MIN≥0.2 of the practical performance is satisfied. In addition, since the coefficient of variation of the laser-irradiation intensities of the 24 capillaries is CV=11%), CV≤20% and CV≤15% of the practical performances are satisfied. The above results obtained from Expression (6) substantially coincide with MIN=0.42 and CV=11%, which are the results in the case of $n_3$=1.41 in the upper part of FIG. 5 described above. That is, when the multiple laser-beam focusing is functioning and the array-plane error is zero, the laser-irradiation intensity distribution L(n) can be obtained by the above simple method.

The lower part of FIG. 5 illustrates the optical-system-corrected relative fluorescence intensity of each capillary obtained by adding the vignetting effect of the optical system of the 3500 series genetic analyzer to the results of the upper part of FIG. 4. That is, the optical-system-corrected relative fluorescence intensity of each capillary is obtained by multiplying the relative fluorescence intensity of each capillary by the optical-system-correction coefficient of each capillary based on the vignetting effect. When $n_3$=1.41, since the downward convex distribution of the relative fluorescence intensity and the distribution of the optical-system-correction coefficient cancel each other with respect to the capillary number, the optical-system-corrected relative fluorescence intensity has a flat distribution with respect to the capillary number. As a result, the minimum value MIN=0.42 of the relative fluorescence intensity does not change, but the coefficient of variation significantly decreases to CV=0.76%. Further, MIN≥0.2 and CV≤15%, which are practical performances, and further CV≤10% are satisfied. On the other hand, when $n_3$=1.33, since MIN=0.066 and CV=61%, these practical performances do not change much, and there is no change in that the practical performances are not satisfied.

Configuration Example of Capillary Array According to Present Embodiment

Figure 6:
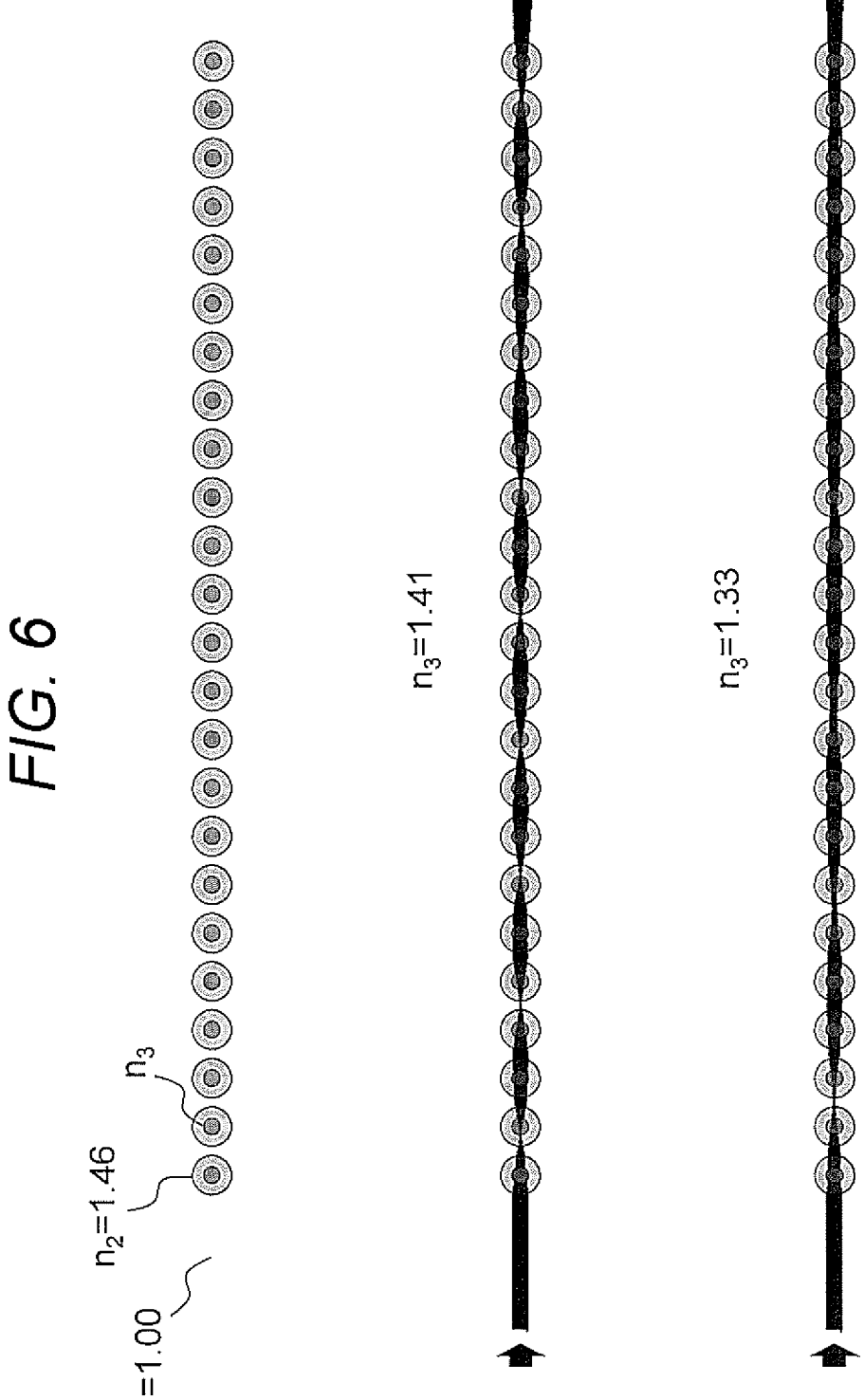
FIG. 6 is a diagram illustrating a configuration of a capillary array of the present disclosure and laser-beam ray-tracking results.

The upper part of FIG. 6 is a cross-sectional view of a configuration of a capillary array according to the present embodiment. The laser-irradiation portions of 24 capillaries having an outer diameter 2R=126 μm and an inner diameter 2r=50 μm are arranged on the same plane (array plane) at an interval of 155 μm. The array-plane error is zero (ΔZ=0 μm). A capillary outside is air and $n_1$=1.00. A capillary material is quartz glass and $n_2$=1.46. The middle part of FIG. 6 illustrates a laser-beam tracing result when a laser beam having a diameter of 50 μm is incident from one side (the left side) in a case where a capillary inside is a high refractive index separation medium having $n_3$=1.41 under the above conditions. Since the multiple laser-beam focusing is obviously functioning, the insides of all 24 capillaries can be efficiently irradiated. This corresponds to that Δθ=−5.8° according to Expression (1), and thus each capillary exhibits a convex lens action.

On the other hand, the lower part of FIG. 6 illustrates a similar laser-beam tracing result when the capillary inside is a low refractive index separation medium having $n_3$=1.33 under the above conditions. Also in this case, since the multiple laser-beam focusing clearly functions, the insides of all the 24 capillaries can be efficiently irradiated. This corresponds to that Δθ=−3.2° according to Expression (1), and thus each capillary exhibits a convex lens action. As described above, regardless of whether the capillary inside of each capillary is the high refractive index separation medium ($n_3$≥1.36) or the low refractive index separation medium ($n_3$<1.36), each capillary exhibits a convex lens action and the multiple laser-beam focusing functions. The above cannot be realized in any known example, but is realized only by the technology of the present disclosure. That is, in the capillary-array-electrophoresis device of the present embodiment, the multiple laser-beam focusing functions in both the analysis mode with $n_3$<1.36 and the analysis mode with $n_3$≥1.36. Meanwhile, in each analysis mode, it is effective to appropriately change the conditions for the electrophoresis analysis according to each purpose. It is possible to change conditions for the electrophoresis analysis such as a control temperature of each capillary, an electric field intensity during electrophoresis, an electric field intensity during sample injection, a sample-injection time, a laser-irradiation intensity, an exposure time of the sensor, and the like. For example, it is effective to change the control temperature of each capillary in each analysis mode, such as adjusting the temperature of each capillary to 30° C. in one analysis mode and adjusting the temperature of each capillary to 60° C. in another analysis mode.

Relative Fluorescence-Intensity Distribution in Capillary-Array Configuration of Present Embodiment (FIG. 6)

Figure 7:
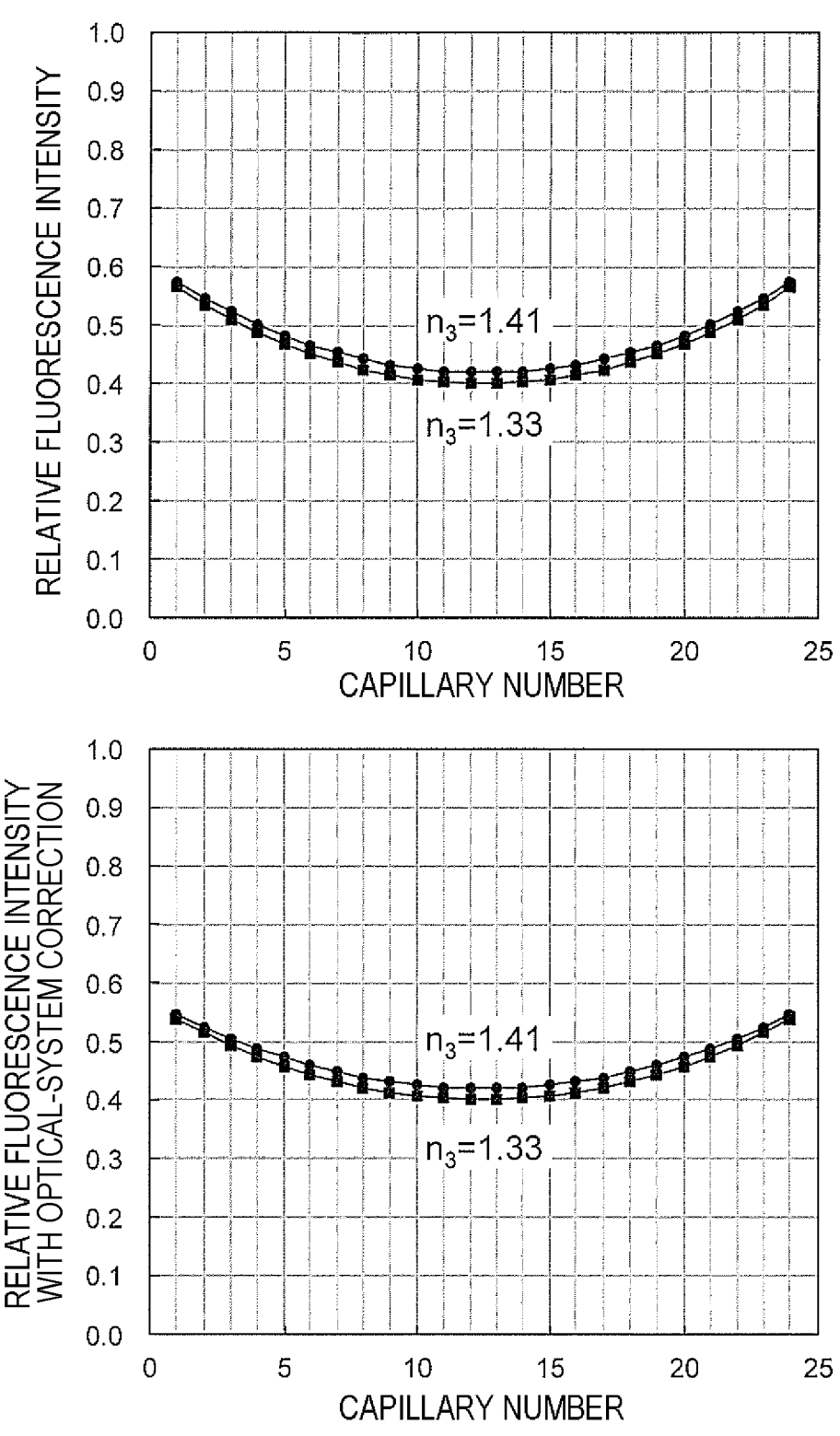
FIG. 7 is a diagram illustrating emitted fluorescence-intensity distributions and measured fluorescence-intensity distributions in the capillary array of the present disclosure.

The upper part of FIG. 7 illustrates relative fluorescence intensity of each capillary under the both-side irradiation obtained by transforming that obtained under the one-side irradiation illustrated in the middle part and the lower part of FIG. 6. When $n_3$=1.41, the minimum value of the relative fluorescence intensity is MIN=0.42 and the coefficient of variation is CV=11% for 24 capillaries. It is found that MIN≥0.2 and CV≤15%, which are practical performances, are satisfied. However, similarly to the upper part of FIG. 5, CV≤10%, which is a more desirable condition, is not satisfied. On the other hand, in the case of $n_3$=1.33, unlike the upper part of FIG. 5, since MIN=0.40 and CV=12% are obtained, it can be seen that the practical performances are satisfied. However, also in this case, CV≤10% is not satisfied.

The lower part of FIG. 7 illustrates the optical-system-corrected relative fluorescence intensity of each capillary obtained by adding the vignetting effect of the optical system of the 3500 series genetic analyzer to the results of the upper part of FIG. 7. That is, the optical-system-corrected relative fluorescence intensity of each capillary is obtained by multiplying the relative fluorescence intensity of each capillary by the optical-system-correction coefficient of each capillary based on the vignetting effect. The optical-system correction used here is the same as that used in FIG. 5. As a result of the optical-system correction, since MIN=0.42 and CV=9.0% are obtained when $n_3$=1.41, and MIN=0.40 and CV=10% are obtained when $n_3$=1.33, MIN≥0.2 and CV≤15%, which are practical performances, and further CV≤10% are satisfied.

In FIG. 7, unlike in FIG. 5, the relative fluorescence intensity does not change much with or without optical-system correction. This is because the vignetting effect of the optical system is small since an overall width of the capillary array in FIG. 6 (the interval of 155 μm×(24−1) capillaries=3.6 mm) is narrower than that in FIG. 4 (the interval of 370 μm×(24−1) capillaries=8.5 mm). That is, a distance of each of the capillaries from an optical axis in FIG. 6 is shorter than that in FIG. 4, and thus the vignetting effect of the optical system is smaller in FIG. 6 than in FIG. 4. As a result, when $n_3$=1.41 in the capillary array of the 3500 series genetic analyzer illustrated in FIG. 4, CV=11% is greatly reduced to CV=0.76% by the optical-system correction due to the vignetting effect of the optical system. On the contrary, when $n_3$=1.41 in the capillary array of the present disclosure illustrated in FIG. 6, CV=11% is reduced only to CV=9% by the optical-system correction due to the vignetting effect of the optical system. Similarly, also in the case of $n_3$=1.33 in the capillary array of the present disclosure, CV=12% is reduced to only CV=10% by the optical-system correction due to the vignetting effect of the optical system.

Nevertheless, in the configuration of the present embodiment, it has been found that each capillary exhibits a convex lens action and multiple laser-beam focusing functions when using a separation medium having an arbitrary refractive index of $n_3$≥1.33 including $n_3$=1.41. In addition, as a modification of the present configuration, when using an arbitrary capillary having R/r≤4.4, for example, when using an arbitrary capillary having an outer diameter 2R≤220 μm in case of an inner diameter of 2r=50 μm, each capillary exhibits a convex lens action under the condition of $n_3$≥1.33. Thus, it is possible to cause multiple laser-beam focusing to function.

(C) Second Embodiment

In the first embodiment, the results of examinations in the case where the capillary array has the array-plane error of zero (ΔZ=0 μm) are illustrated. However, in reality, ΔZ is never 0 μm. Therefore, in the present embodiment, relationships between the array-plane error and the multiple laser-beam-focusing performance, and between the array-plane error and the relative fluorescence intensity of each capillary will be systematically examined. These studies are made for the first time by the technology of the present disclosure.
<Definition of Array-Plane Error of Capillary Array>

Figure 8:
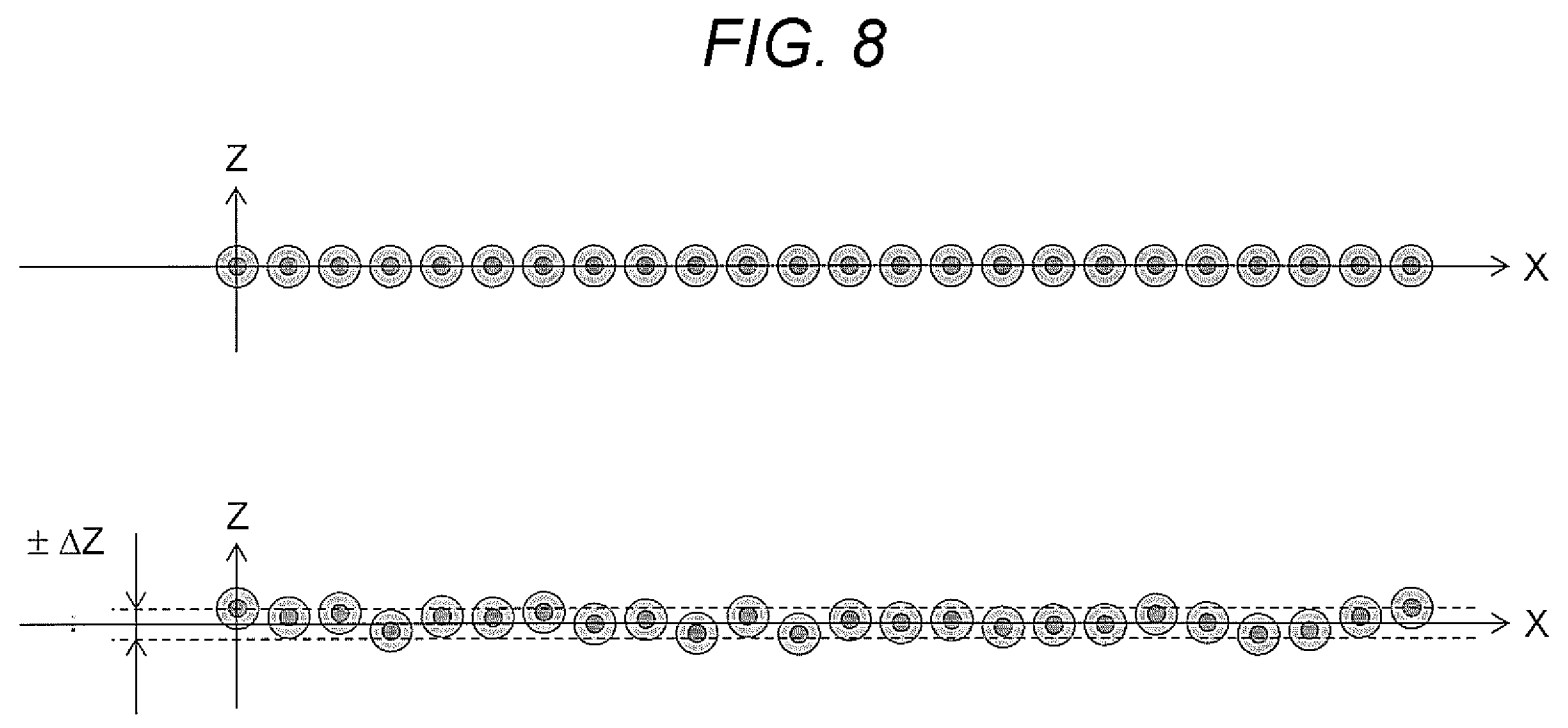

FIG. 8 is a diagram illustrating a definition of an array-plane error ΔZ. The upper part of FIG. 8 illustrates a cross-sectional view of a 24-capillary array when the array-plane error is 0 (ΔZ=0 μm). This configuration is the same as that in the upper part of FIG. 6. With the position of the central axis of the leftmost capillary (the capillary with capillary number 1) as an origin, an X axis is set along the array plane, and a Z axis is set in the direction perpendicular to the array plane. A Y axis is set along the central axis of the leftmost capillary. The central axis of each capillary is on the X-axis and the Z-coordinate is zero. In contrast, the lower part of FIG. 8 illustrates a cross-sectional view when there is an array-plane error (ΔZ≠0 μm). X-coordinates of the central axes of the capillaries are the same as those in the case of the upper part of FIG. 8, but Z-coordinates randomly vary up and down around the X-axis (Z=0 μm). Here, ΔZ is defined as a maximum value of absolute values of the Z coordinates. That is, a distance between the center axis of the capillary farthest from the X axis and the X axis is defined as ΔZ. The Z coordinates of the central axes of the capillaries are randomly dispersed within a range of ±ΔZ. ΔZ is an index quantitatively indicating a magnitude of the array-plane error.
<Relative Fluorescence Intensity in Case where Array-Plane Error of Capillary Array is Present>

Figure 9:
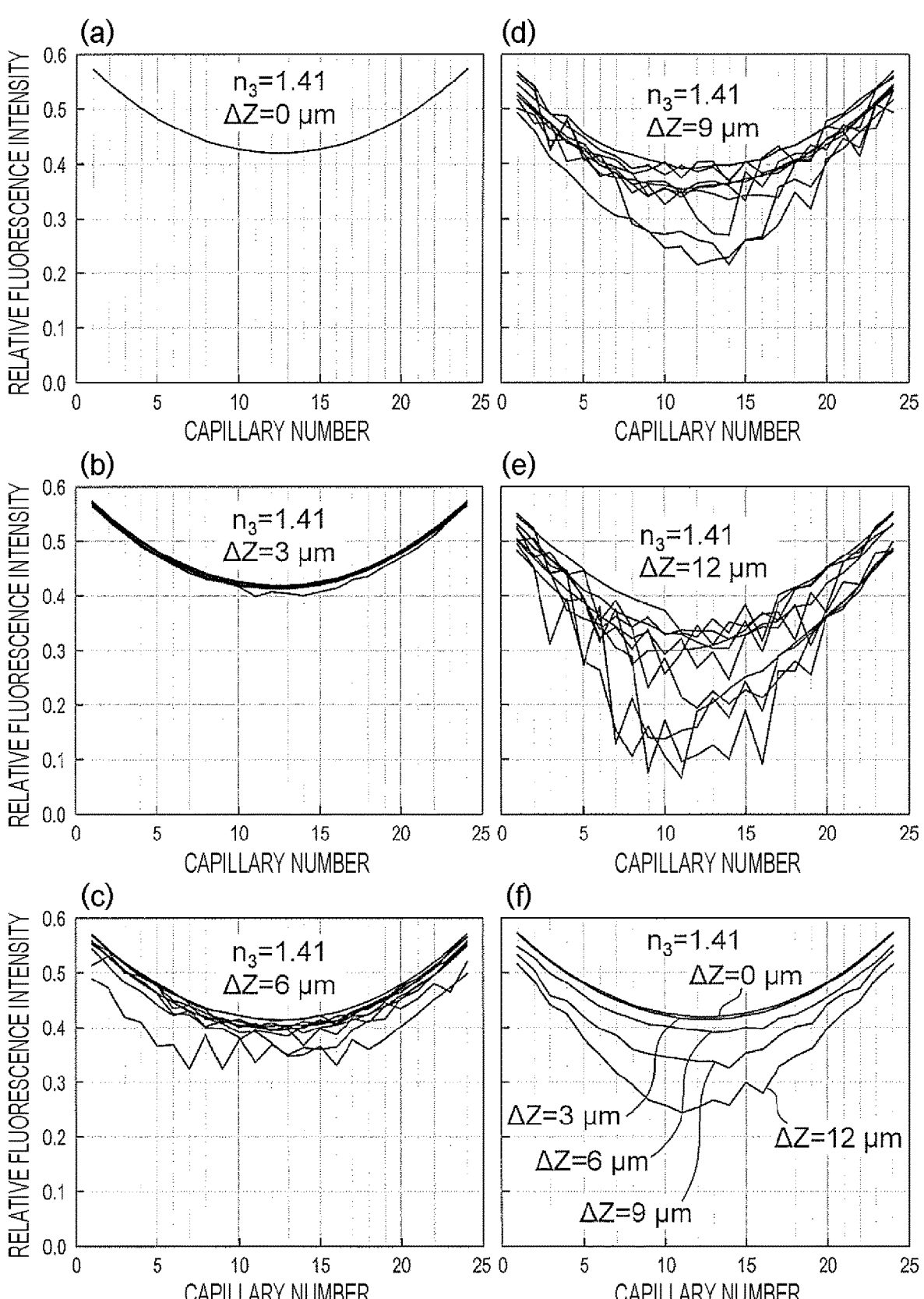
FIG. 9 is a diagram illustrating a relationship between the array-plane error $\Delta Z$ of the capillary array and the emitted fluorescence-intensity distributions ($n_3 = 1.41$).

FIG. 9 is a diagram illustrating the relative fluorescence intensity of each capillary obtained by both-side irradiation when setting to (a) ΔZ=0 μm, (b) ΔZ=3 μm, (c) ΔZ=6 μm, (d) ΔZ=9 μm, and (e) ΔZ=12 μm, based on the configuration in which $n_3$=1.41 in the 24-capillary array illustrated in the upper part of FIG. 6. For ΔZ=0 μm, the relative fluorescence intensities of the 24 capillaries in one set of capillary array are shown. Whereas, for ΔZ≠0, the relative fluorescence intensities of the 240 capillaries in ten sets of randomly-arrayed capillary arrays are overlaid. FIG. 9(*a*) (ΔZ=0 μm) illustrates the same results as the case of $n_3$=1.41 in the upper part of FIG. 7. FIG. 9(*f*) overlays the relative fluorescence intensities of the capillaries in the one set of the 24-capillary array for ΔZ=0 μm, and the averaged relative fluorescence intensities of the capillaries in the 10 sets of the 24-capillary arrays for ΔZ≠0 μm. It can be seen that as ΔZ increases, an average value and a minimum value of the relative fluorescence intensities decrease and a variation in the relative fluorescence intensity between the capillaries in each 24-capillary array increases. The minimum values of the relative fluorescence intensities for ΔZ=0 μm, 3 μm, 6 μm, 9 μm, and 12 μm are MIN=0.42, 0.40, 0.33, 0.22, and 0.066, respectively. Coefficients of variation of the relative fluorescence intensities when ΔZ=0 μm, 3 μm, 6 μm, 9 μm, and 12 μm are CV=11%, 11%, 12%, 17%, and 28%, respectively. Here, for ΔZ=0 μm, the minimum value and the coefficient of variation of the relative fluorescence intensities are obtained for the 24 capillaries in the one set of 24-capillary array. For ΔZ≠0 μm, the minimum values and the coefficients of variation of the relative fluorescence intensities are obtained for the 240 capillaries in the 10 sets of 24-capillary array. When the vignetting effect of the optical system of the 3500 series genetic analyzer is added to the above results when $n_3$=1.41, the coefficients of variation in the relative fluorescence intensities when ΔZ=0 μm, 3 μm, 6 μm, 9 μm, and 12 μm are CV=9%, 9%, 10%, 14%, and 23%, respectively. That is, it is found that, even if the vignetting effect of the optical system is taken into account, CV≤10%, which is practical performance, is not satisfied when ΔZ≥9 μm.

Figure 10:
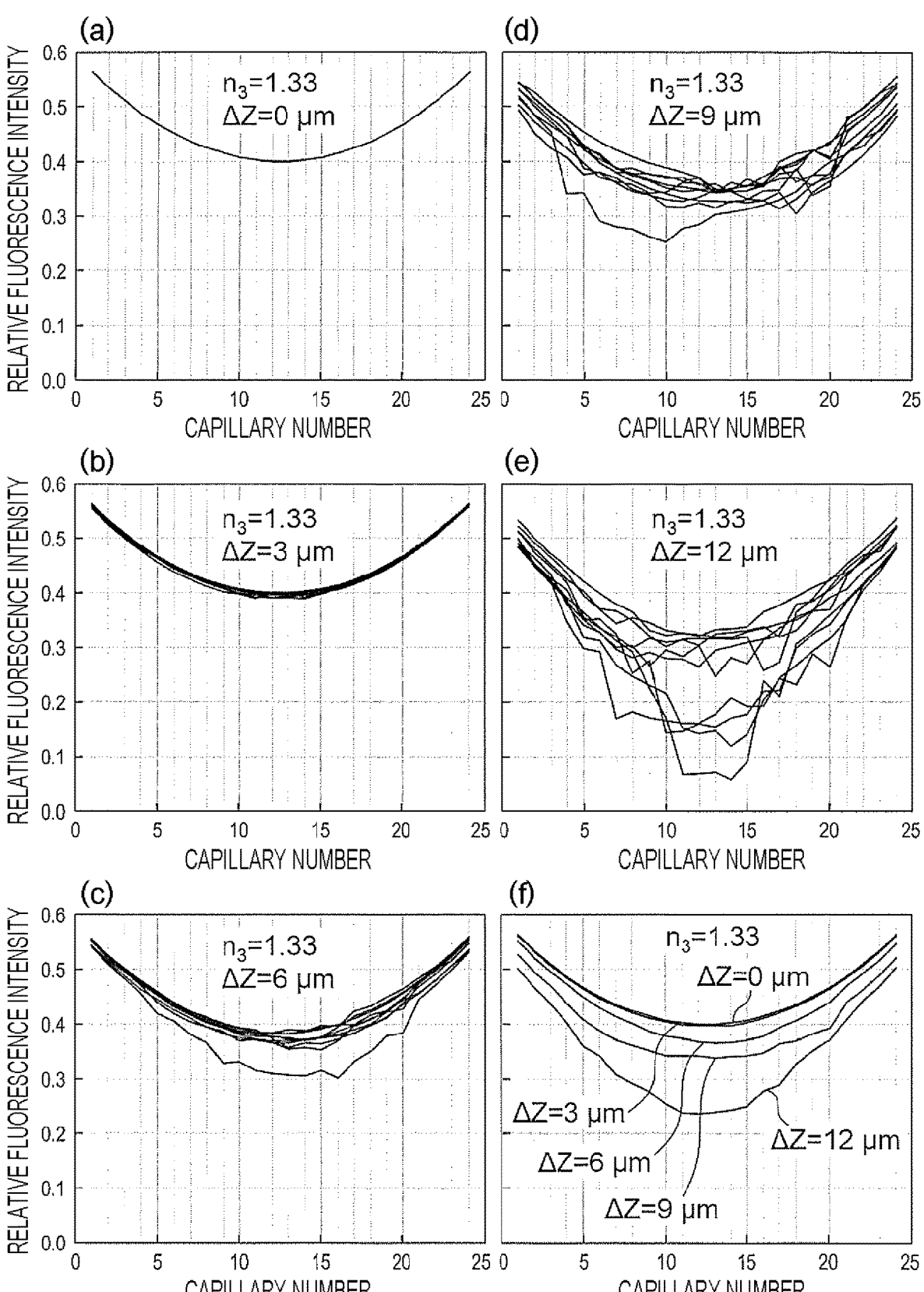
FIG. 10 is a diagram illustrating a relationship between the array-plane error $\Delta Z$ of the capillary array and the emitted fluorescence-intensity distributions ($n_3 = 1.33$).

FIG. 10 is a diagram illustrating the relative fluorescence intensity of each capillary obtained by both-side irradiation when setting to (a) ΔZ=0 μm, (b) ΔZ=3 μm, (c) ΔZ=6 μm, (d) ΔZ=9 μm, and (e) ΔZ=12 μm, based on the configuration in which $n_3$=1.33 in the 24-capillary array illustrated in the upper part of FIG. 6. For ΔZ=0 μm, the relative fluorescence intensities of the 24 capillaries in one set of capillary array are shown. Whereas, for ΔZ≠0, the relative fluorescence intensities of the 240 capillaries in ten sets of randomly-arrayed capillary arrays are overlaid. FIG. 10(*a*) (ΔZ=0 μm) illustrates the same results as the case of $n_3$=1.33 in the upper part of FIG. 7. FIG. 10(*f*) overlays the relative fluorescence intensities of the capillaries in the one set of the 24-capillary array for ΔZ=0 μm, and the averaged relative fluorescence intensities of the capillaries in the 10 sets of the 24-capillary arrays for ΔZ≠0 μm. It can be seen that, as ΔZ increases, an average value and a minimum value of the relative fluorescence intensities decrease and a variation in the relative fluorescence intensity between the capillaries in each 24-capillary array increases. The minimum values of the relative fluorescence intensities for $\Delta Z=0$ μm, 3 μm, 6 μm, 9 μm, and 12 μm are MIN=0.40, 0.39, 0.30, 0.25, and 0.058, respectively. Coefficients of variation of the relative fluorescence intensities when $\Delta Z=0$ μm, 3 μm, 6 μm, 9 μm, and 12 μm are CV=12%, 12%, 14%, 16%, and 28%, respectively. Here, for $\Delta Z=0$ μm, the minimum value and the coefficient of variation of the relative fluorescence intensities are obtained for the 24 capillaries in the one set of 24-capillary array. For $\Delta Z \neq 0$ μm, the minimum values and the coefficients of variation of the relative fluorescence intensities are obtained for the 240 capillaries in the 10 sets of 24-capillary array. When the vignetting effect of the optical system of the 3500 series genetic analyzer is added to the above results when $n_3=1.33$, the coefficients of variation in the relative fluorescence intensities when $\Delta Z=0$ μm, 3 μm, 6 μm, 9 μm, and 12 μm are CV=10%, 10%, 12%, 14%, and 24%, respectively. That is, it is found that, even if the vignetting effect of the optical system is taken into account, $CV \leq 10\%$, which is practical performance, is not satisfied when $\Delta Z \geq 6$ μm.

Each of the distributions of the relative fluorescence intensity with respect to the capillary number illustrated in FIGS. 9 and 10 has a downward convex shape. As $\Delta Z$ increases, the degree of downward convexity increases. On the other hand, as $\Delta Z$ increases, the degree of ups and downs (fluctuation) in the relative fluorescence intensity with respect to the capillary number also increases.

Similarly to the results of the first embodiment, the results of FIGS. 9 and 10 indicate that the effect of the optical-system correction based on the vignetting effect of the optical system on reducing the coefficient of variation of the relative fluorescence intensity is insufficient and that, when the array-plane error $\Delta Z$ increases, the above becomes more remarkable and thus the practical performance cannot be satisfied. Therefore, the present embodiment proposes applying a digital correction by the computer to the relative fluorescence intensity in addition to the optical-system correction based on the vignetting effect of the optical system, or instead of the optical-system correction based on the vignetting effect of the optical system, thereby reducing the coefficient of variation of the relative fluorescence intensity in consideration of the array-plane error $\Delta Z$ to enable to satisfy $CV \leq 10\%$, which is practical performance.

<Process of Obtaining Practical Output Fluorescence-Intensity Distribution for Electrophoresis Analysis>

Figure 11:
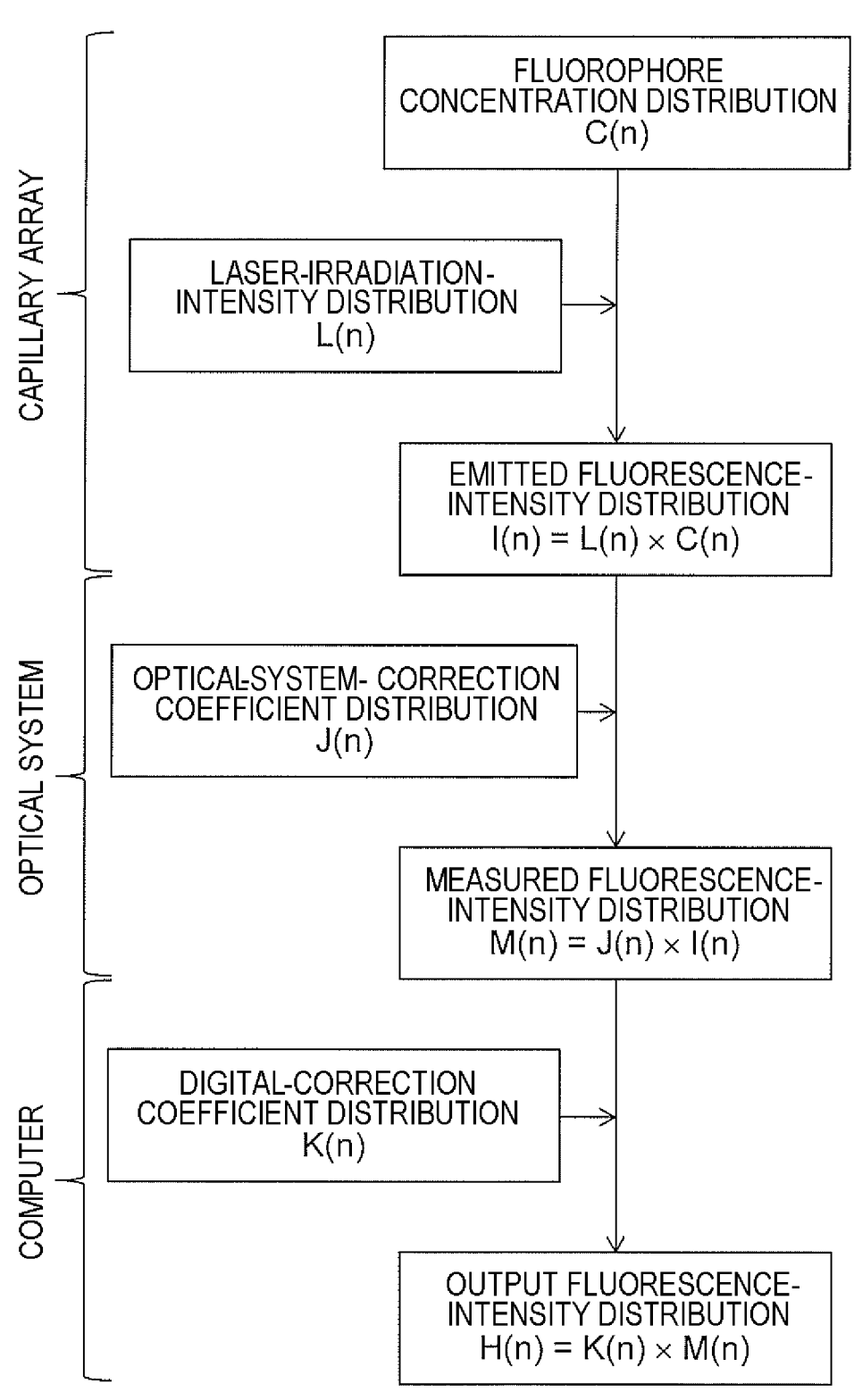
FIG. 11 is a diagram illustrating interrelationships of various fluorescence-intensity distributions in the capillary-array-electrophoresis device.

FIG. 11 is a diagram illustrating a process of obtaining a practical output fluorescence-intensity distribution for electrophoresis analysis. Specifically, FIG. 11 illustrates steps starting from a concentration of any kind of fluorophore present in a laser-irradiation portion of each capillary constituting a capillary array to a fluorescence intensity of the fluorophore from the capillary output by the computer. In FIG. 11, expressions of the fluorophore and the fluorescence are used in accordance with the present embodiment, but the present embodiment is not limited to the fluorophore and the fluorescence. Therefore, the fluorophore and the fluorescence in FIG. 11 can be replaced with a light emitting substance and a light emission, a light scattering substance and a scattering light, or a light absorbing substance and a light absorbance.

Hereinafter, FIG. 11 will be described in detail below. Note that the capillary numbers of the respective capillaries are set to n=1, 2, . . . , and N in order from the end of the capillary array including the N capillaries. All of the functions C(n), L(n), I(n), J(n), M(n), K(n), and H(n) of n shown in FIG. 11 hold at any time and for any kind of fluorophore.

These functions are also functions of time and fluorophore type (however, a function that change little with time and fluorophore type is also included), but are expressed as functions of only "n" for simplicity in FIG. 11. In addition, in these functions, not absolute values but relative values to capillary number n, that is, the distributions of these functions are meaningful. Therefore, a coefficient for deriving an absolute value from a relative value is omitted. Further, when a distribution of any function with respect to capillary number n is substantially constant or sufficiently flat, the function and the function value can be replaced with 1 regardless of capillary number n. Therefore, in the study based on FIG. 11, $CV \leq 15\%$ and $CV \leq 10\%$ are considered without considering $MIN \geq 0.2$.

(i) Emitted Fluorescence-Intensity Distribution

An emitted fluorescence-intensity distribution represents an intensity distribution of fluorescence emitted from a capillary array. A concentration of a fluorophore in a laser-irradiation portion of a capillary with capillary number n is referred to as C(n), and C(n) with respect to n is referred to as a fluorophore concentration distribution. C(n) represents the concentration of the fluorophore in the capillary with capillary number n at a certain time and is a function that changes over time. On the other hand, an irradiation intensity of a capillary with capillary number n by a laser beam is referred to as L(n). L(n) with respect to n is referred to as a laser-irradiation-intensity distribution. L(n) represents the laser-irradiation intensity of the capillary with capillary number n at a certain time. It is possible to express an intensity of fluorescence emitted from the light-emission point of the capillary with capillary number n as $I(n)=L(n) \times C(n)$. I(n) with respect to n is referred to as an emitted fluorescence-intensity distribution. Again, coefficients that are usually multiplied by the right side of the above expression are omitted. The above C(n), L(n), and I(n) indicate events inside each capillary in the capillary array.

(ii) Measured Fluorescence-Intensity Distribution

A measured fluorescence-intensity distribution is an intensity distribution of fluorescence actually detected by a sensor, that is, an intensity distribution of fluorescence emitted from the capillary array and detected by the sensor through a predetermined optical system. (in other words, an intensity distribution of fluorescence emitted from the capillary array and corrected by the optical system). The optical-system-correction coefficient of the capillary with capillary number n based on the vignetting effect of the optical system described in FIG. 2 is defined as J(n). That is, J(n) with respect to n is referred to as an optical-system-correction coefficient distribution. An optical system having any configuration physically changes the light passing through the optical system, but the optical-system-correction coefficient mathematically (as a numerical value) represents a physical phenomenon occurring in the optical system. In general, the optical-system-correction coefficient for a capillary away from the optical axis is smaller than that of a capillary close to the optical axis of the optical system. An image point of a light-emission point of a capillary with capillary number n is formed on the sensor by the optical system. A fluorescence intensity of the image point measured by the sensor is represented as $M(n)=J(n) \times I(n)$. M(n) with respect to n is referred to as a measured fluorescence-intensity distribution. J(n) and M(n) described above indicate events inside the optical system. Since the optical-system-correction coefficient is a function of the capillary number n, it is also a function of the coordinate x of the X axis illustrated in FIG. 8. As illustrated in FIG. 8, when the X coordinate of the central axis of the capillary with n=1 is set to x=0 and the arrangement interval of the capillaries is defined as p, n and x can be converted by x=(n−1)×p.

(iii) Output Fluorescence-Intensity Distribution

An output fluorescence-intensity distribution according to the present embodiment is a fluorescence-intensity distribution obtained by applying a predetermined digital-correction processing to the measured fluorescence-intensity distribution. A digital-correction coefficient of a capillary with capillary number n is defined as K(n). K(n) with respect to n is referred to as a digital-correction coefficient distribution. A fluorescence intensity of the capillary with capillary number n output by the computer based on the digital correction is represented as H(n)=K(n)×M(n). H(n) with respect to n is referred to as an output fluorescence-intensity distribution.

FIGS. 5, 7, 9, and 10 will be described again based on FIG. 11. The upper part of FIG. 5, the upper part of FIG. 7, FIG. 9, and FIG. 10 illustrate the emitted fluorescence-intensity distributions I(n)=L(n) when the fluorophore concentration distribution is constant, that is, C(n)=1. On the other hand, the lower part of FIG. 5 and the lower part of FIG. 7 illustrate the measured fluorescence-intensity distributions M(n)=J(n)×L(n) obtained by applying optical-system correction to the emitted fluorescence-intensity distributions. J(n) used here is an optical-system-correction coefficient distribution derived by an experiment for the optical system of the 3500 series genetic analyzer. Since a digital correction is not performed here and K(n)=1, it can also be said that the lower part of FIG. 5 and the lower part of FIG. 7 illustrate the output fluorescence-intensity distribution H(n)=J(n)×L(n).

Based on FIG. 11, the digital correction will be studied for reducing the coefficient of variation of the emitted fluorescence-intensity distribution I(n)=L(n) illustrated in FIGS. 9 and 10. As described above, since the optical-system correction in this configuration is sufficiently small, J(n)=1 is set in this study. When J(n)=1 cannot be regarded, K(n) derived below may be replaced with K(n)/J(n). In FIGS. 9 and 10, since C(n)=1, H(n)=K(n)×L(n). Therefore, K(n) is examined such that the output fluorescence-intensity distribution H(n) is flat. As long as the laser-irradiation intensity distribution L(n) is very stable, H(n)=1 is obtained by setting K(n)=1/L(n), so that the coefficient of variation of the relative fluorescence intensity is reduced. For example, I(n)=L(n) may be obtained in advance in a calibration experiment. The reciprocal thereof may be set as K(n) and applied to the relative fluorescence intensity obtained in the subsequent experiment. This is the same digital-correction method as in PTL 3. However, as illustrated in FIGS. 9 and 10, in practice, I(n)=L(n) is not stable at all. The variation in the relative fluorescence intensity illustrated in FIGS. 9 and 10 is mainly caused by the refractive index $n_3$ of the medium of the capillary inside and the array-plane error ΔZ of the capillary array, but is not limited thereto. It is known that variation also occurs due to a change in environmental temperature or humidity, slight deformation of the components of the device due to vibration, load, or the like, and the variation also randomly changes. One criterion is required to perform digital correction. In PTL 3, the fluorescence-intensity distribution acquired at the time of calibration is used as a reference. In FIGS. 9 and 10, a total of 92 curves of the emitted fluorescence-intensity distributions are illustrated. But, it is not clear which one of these emitted fluorescence-intensity distributions should be selected as a reference. When an inappropriate emitted fluorescence-intensity distribution is selected as a reference, the coefficient of variation of the output fluorescence-intensity distribution is increased by the digital correction, and the digital correction may have an adverse effect.

Example of Digital Correction for Fluorescence-Intensity Distribution

Based on the above, in the present embodiment, as a correction method, digital correction with the emitted fluorescence-intensity distribution when ΔZ=0 µm in FIGS. 9(*a*) and 10(*a*) as a reference, will be described. However, the digital-correction coefficient distribution is changed between the case of $n_3$=1.41 in FIG. 9 and the case of $n_3$=1.33 in FIG. 10. More generally, the digital-correction coefficient distribution is changed by the value of $n_3$. This is because it has been found that the degree of downward convexity of the emitted fluorescence-intensity distribution increases as $n_3$ decreases. On the other hand, it is accepted that, as ΔZ increases, the degree of downward convexity of the emitted fluorescence-intensity distribution increases and the degree of ups&downs of the relative fluorescence intensity with respect to the capillary number increases.

Figure 12:
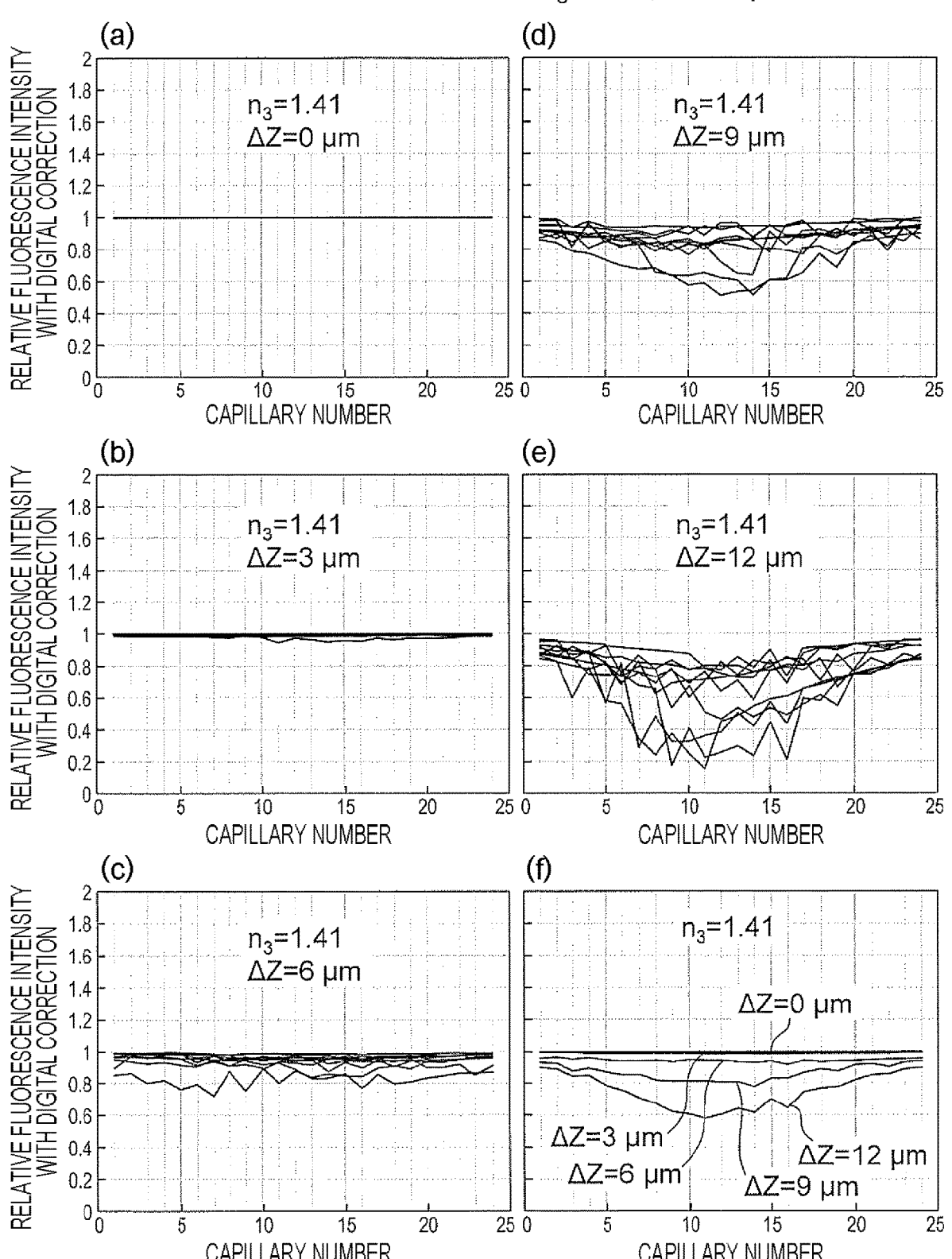
FIG. 12 is a diagram illustrating a relationship between the array-plane error $\Delta Z$ of the capillary array and the output fluorescence-intensity distributions ($n_3$=1.41, correction reference: $n_3$=1.41, $\Delta Z$=0 μm).

FIGS. 12(*a*) to 12(*f*) illustrate output fluorescence-intensity distributions H(n)=K(n)×L(n) obtained by applying digital correction to each emitted fluorescence-intensity distribution I(n)=L(n) illustrated in FIGS. 9(*a*) to 9(*f*) based on the emitted fluorescence-intensity distribution when ΔZ=0 µm illustrated in FIG. 9(*a*), in the case of $n_3$=1.41. The digital-correction coefficient distribution K(n) used here is K(n)=1/$L_0$(n) when defining as $L_0$(n) the emitted fluorescence-intensity distribution with ΔZ=0 µm in FIG. 9(*a*). Therefore, as a matter of course, the output fluorescence-intensity distribution in FIG. 12(*a*) is H(n)=1. On the other hand, although the same digital-correction coefficient distribution K(n) as described above is used, the output fluorescence-intensity distributions in FIGS. 12(*b*) to 12(*e*) are also flattened as compared with the emitted fluorescence-intensity distributions in FIGS. 9(*b*) to 9(*e*). As a result, when ΔZ=0 µm, 3 µm, 6 µm, 9 µm, and 12 µm, the coefficients of variation of the relative fluorescence intensity in FIG. 9 are CV=11%, 11%, 12%, 17%, and 28%, respectively, whereas the coefficients of variation of the digitally corrected relative fluorescence intensity in FIG. 12 are significantly reduced to CV=0%, 0.4%, 3%, 8%, and 19%, respectively. Therefore, CV≤10% of practical performance is satisfied for any capillary array when ΔZ≤9 µm by this digital correction.

Figure 13:
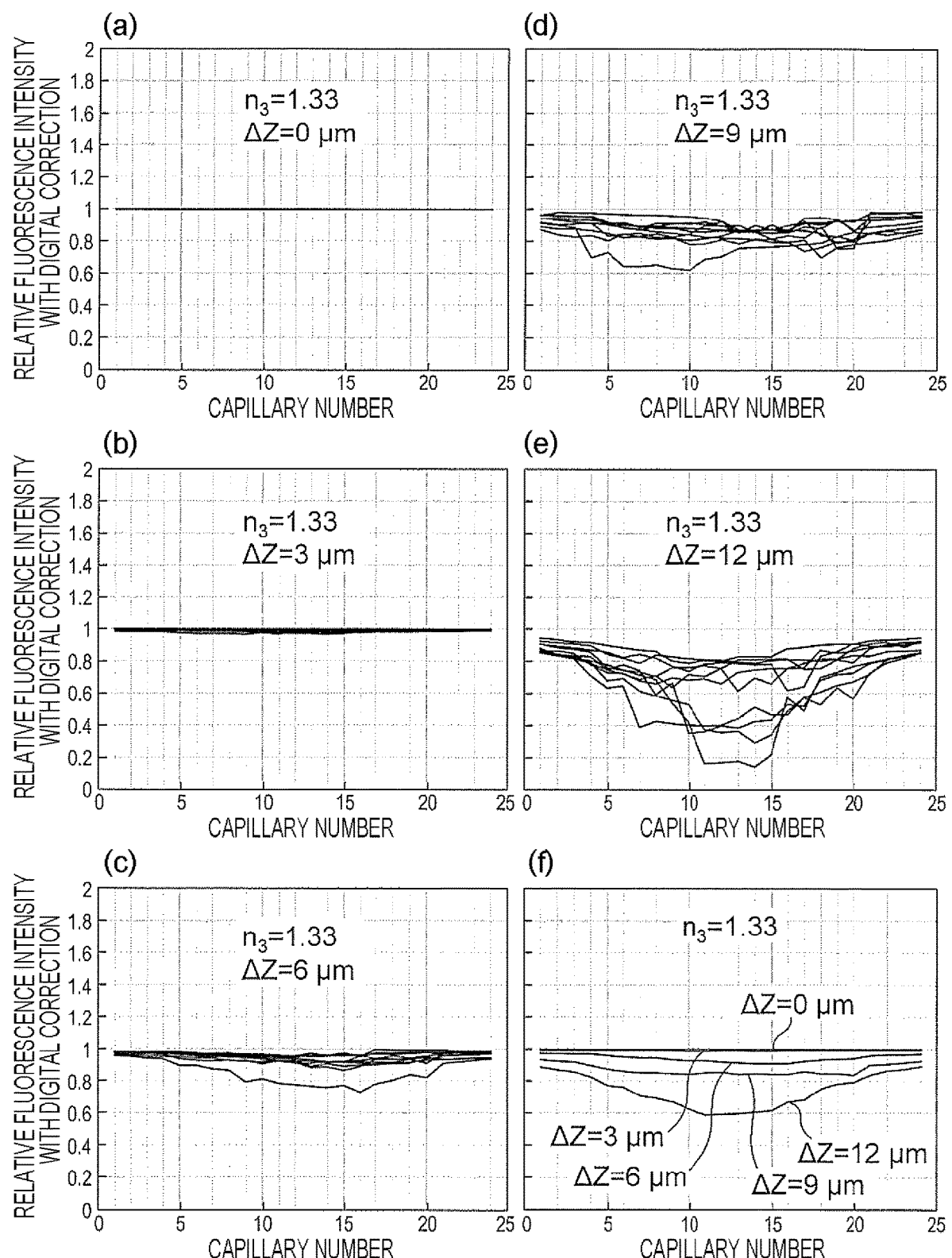
FIG. 13 is a diagram illustrating a relationship between the array-plane error $\Delta Z$ of the capillary array and the output fluorescence-intensity distributions ($n_3$=1.33, correction reference: $n_3$=1.33, $\Delta Z$=0 μm).

FIGS. 13(*a*) to 13(*f*) illustrate output fluorescence-intensity distributions H(n)=K(n)×L(n) obtained by applying digital correction to each emitted fluorescence-intensity distribution I(n)=L(n) illustrated in FIGS. 10(*a*) to 10(*f*) based on the emitted fluorescence-intensity distribution when ΔZ=0 µm illustrated in FIG. 10(*a*), in the case of $n_3$=1.33. The digital-correction coefficient distribution K(n) used here is K(n)=1/$L_0$(n) when defining as $L_0$(n) the emitted fluorescence-intensity distribution with ΔZ=0 µm in FIG. 10(*a*). It is an important feature of the technology of the present disclosure that $L_0$(n) is different from the emitted fluorescence-intensity distribution when ΔZ=0 µm in FIG. 9(*a*) described above. Therefore, as a matter of course, the output fluorescence-intensity distribution in FIG. 13(*a*) is H(n)=1. On the other hand, although the same digital-correction coefficient distribution K(n) as described above is used, the output fluorescence-intensity distributions in FIGS. 13(*b*) to 13(*e*) are also flattened as compared with the emitted fluorescence-intensity distributions in FIGS. 10(*b*) to 10(*e*). As a result, when ΔZ=0 µm, 3 µm, 6 µm, 9 µm, and 12 µm, the coefficients of variation of the relative fluorescence intensity in FIG. 10 are CV=12%, 12%, 14%, 16%, and 28%, whereas the coefficients of variation of the digitally corrected relative fluorescence intensity in FIG. 13 are significantly reduced to CV=0%, 0.5%, 3%, 6%, and 18%. Therefore, CV 10% of practical performance is satisfied for any capillary array when $\Delta Z \leq 9$ μm by this digital correction.

It is also possible to simply obtain $L_0(n)$ for the emitted fluorescence-intensity distribution when $\Delta Z=0$ μm in FIG. 9(*a*) and $L_0(n)$ for the emitted fluorescence-intensity distribution when $\Delta Z=0$ μm in FIG. 10(*a*) by using the above-described Expressions (4) and (6). Here, in the case of FIG. 9(*a*), $n_1=1.00$, $n_2=1.46$, $n_3=1.41$, and N=24 may be set. In the case of FIG. 10(*a*), $n_1=1.00$, $n_2=1.46$, $n_3=1.33$, and N=24 may be set. The digital-correction coefficient distribution $K(n)=1/L_0(n)$ obtained in this way is the first one achieved by the present disclosure.

In the present embodiment, it is assumed that the optical-system-correction coefficient distribution is $J(n)=1$. The optimum digital-correction coefficient distribution $K(n)$ is then derived so that the coefficient of variation of the output fluorescence-intensity distribution $H(n)$ is reduced. As described above, when $J(n)=1$ cannot be regarded, $K(n)$ derived above may be replaced with $K(n)/J(n)$. Therefore, by digital correction and optical-system correction, that is, by $K(n) \times J(n)$, the emitted fluorescence-intensity distribution $I(n)$ when $\Delta Z=0$ μm at desired $n_3$ may just be flattened most. To do so, it is also effective to change $J(n)$ instead of $K(n)$ depending on $n_3$.

In the above description, the configuration in which the 24-capillary arrays illustrated in the upper part of FIG. 6 and FIG. 8 are irradiated on the both sides with the laser beams has been examined. But, the same effects can be obtained in other configurations.

(D) Third Embodiment

In the second embodiment, it has been illustrated that, in order to flatten the output fluorescence-intensity distribution, it is optimal to apply digital correction based on the emitted fluorescence-intensity distribution when $\Delta Z=0$ μm at a $n_3$ to any emitted fluorescence-intensity distribution at the same $n_3$. The effects of the technology of the present disclosure are exhibited not only in the emitted fluorescence-intensity distribution when $\Delta Z=0$ μm but also in the emitted fluorescence-intensity distribution when $\Delta Z \neq 0$ μm. Therefore, in the present embodiment, as an example, digital correction based on an average emitted fluorescence-intensity distribution when $\Delta Z=6$ μm will be described. In the present embodiment, similarly to the second embodiment, a configuration in which the 24-capillary arrays illustrated in the upper part of FIG. 6 and FIG. 8 are irradiated on the both sides with the laser beams will be considered. But other configurations may be used.

Example of Digital Correction for Fluorescence-Intensity Distribution: Case of Using Average Emitted Fluorescence-Intensity Distribution with $\Delta Z=6$ μm as a Reference FIGS. 14(*a*) to 14(*f*) illustrate output fluorescence-intensity distributions $H(n)=K(n) \times L(n)$ obtained by applying digital correction to each emitted fluorescence-intensity distribution $I(n)=L(n)$ illustrated in FIGS. 9(*a*) to 9(*f*) based on the average emitted fluorescence-intensity distribution when $\Delta Z=6$ μm illustrated in FIG. 9(*f*), in the case of $n_3=1.41$. The digital-correction coefficient distribution $K(n)$ used here is $K(n)=1/L_0(n)$ when defining as $L_0(n)$ the average emitted fluorescence-intensity distribution with $\Delta Z=6$ μm in FIG.

9(*f*). Therefore, as a matter of course, the average output fluorescence-intensity distribution with $\Delta Z=6$ μm in FIG. 14(*f*) is $H(n)=1$.

Figure 14:
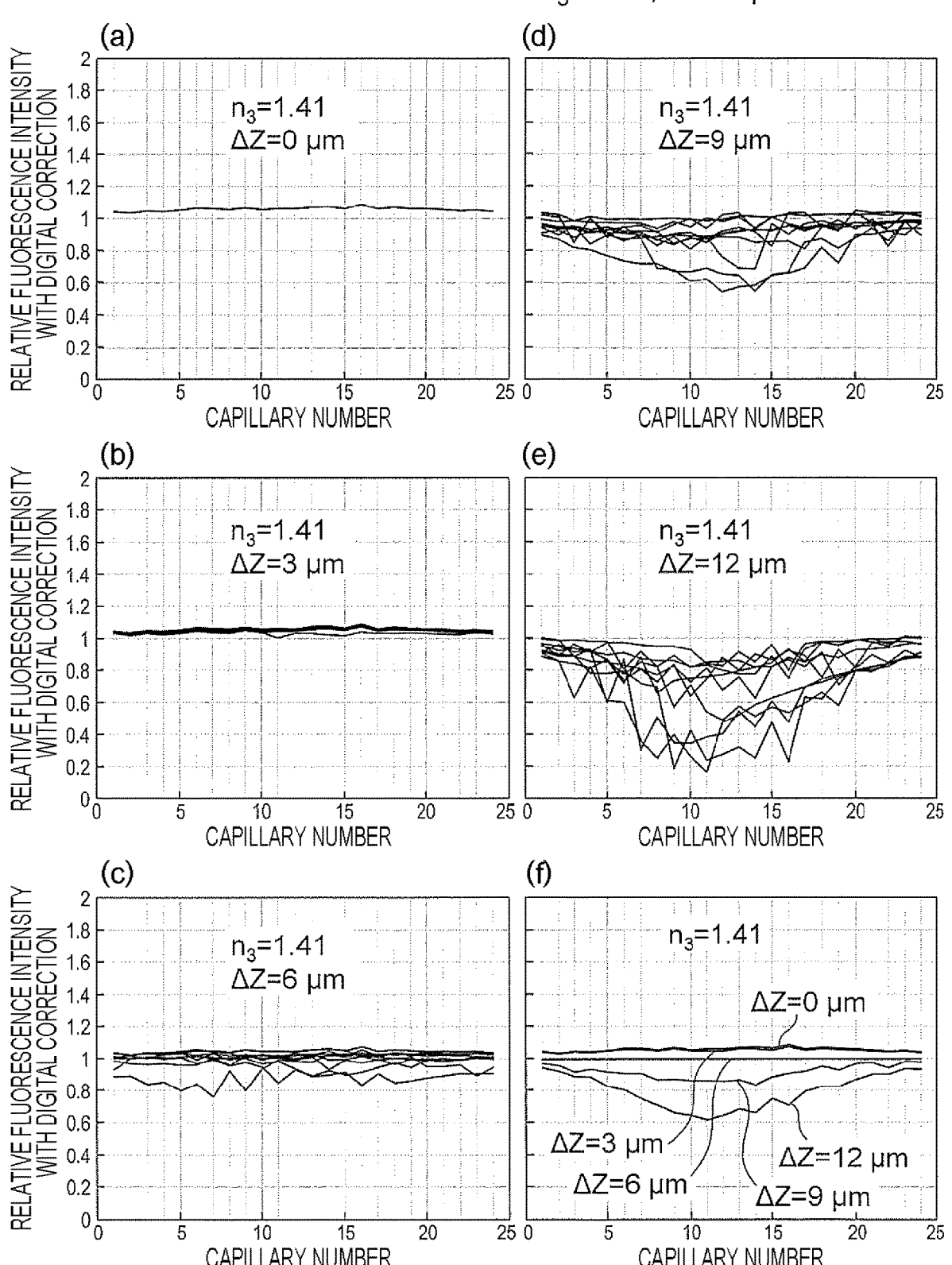
FIG. 14 is a diagram illustrating a relationship between the array-plane error $\Delta Z$ of the capillary array and the output fluorescence-intensity distributions ($n_3$=1.41, correction reference: $n_3$=1.41, $\Delta Z$=6 μm).

On the other hand, although the same digital-correction coefficient distribution $K(n)$ as described above is used, the output fluorescence-intensity distributions in FIGS. 14(*a*) to 14(*e*) are also flattened as compared with the emitted fluorescence-intensity distributions in FIGS. 9(*a*) to 9(*e*). As a result, when $\Delta Z=0$ μm, 3 μm, 6 μm, 9 μm, and 12 μm, the coefficients of variation of the relative fluorescence intensity in FIG. 9 are CV=11%, 11%, 12%, 17%, and 28%, whereas the coefficients of variation of the digitally corrected relative fluorescence intensity in FIG. 14 are significantly reduced to CV=1%, 1%, 3%, 7%, and 18%.

Therefore, CV≤10% of practical performance is satisfied for any capillary array when $\Delta Z \leq 9$ μm by this digital correction. As compared with the case of using the emitted fluorescence-intensity distribution when $\Delta Z=0$ μm as a reference in the second embodiment, the CV increases by the equivalent of $\Delta Z=0$ μm to 3 μm. From the above viewpoint of reducing the coefficient of variation of the relative fluorescence intensity, the case of using the emitted fluorescence-intensity distribution when $\Delta Z=0$ μm as a reference is more superior comprehensively. But, it is also effective to use the average emitted fluorescence-intensity distribution when $\Delta Z=6$ μm as a reference.

Figure 15:
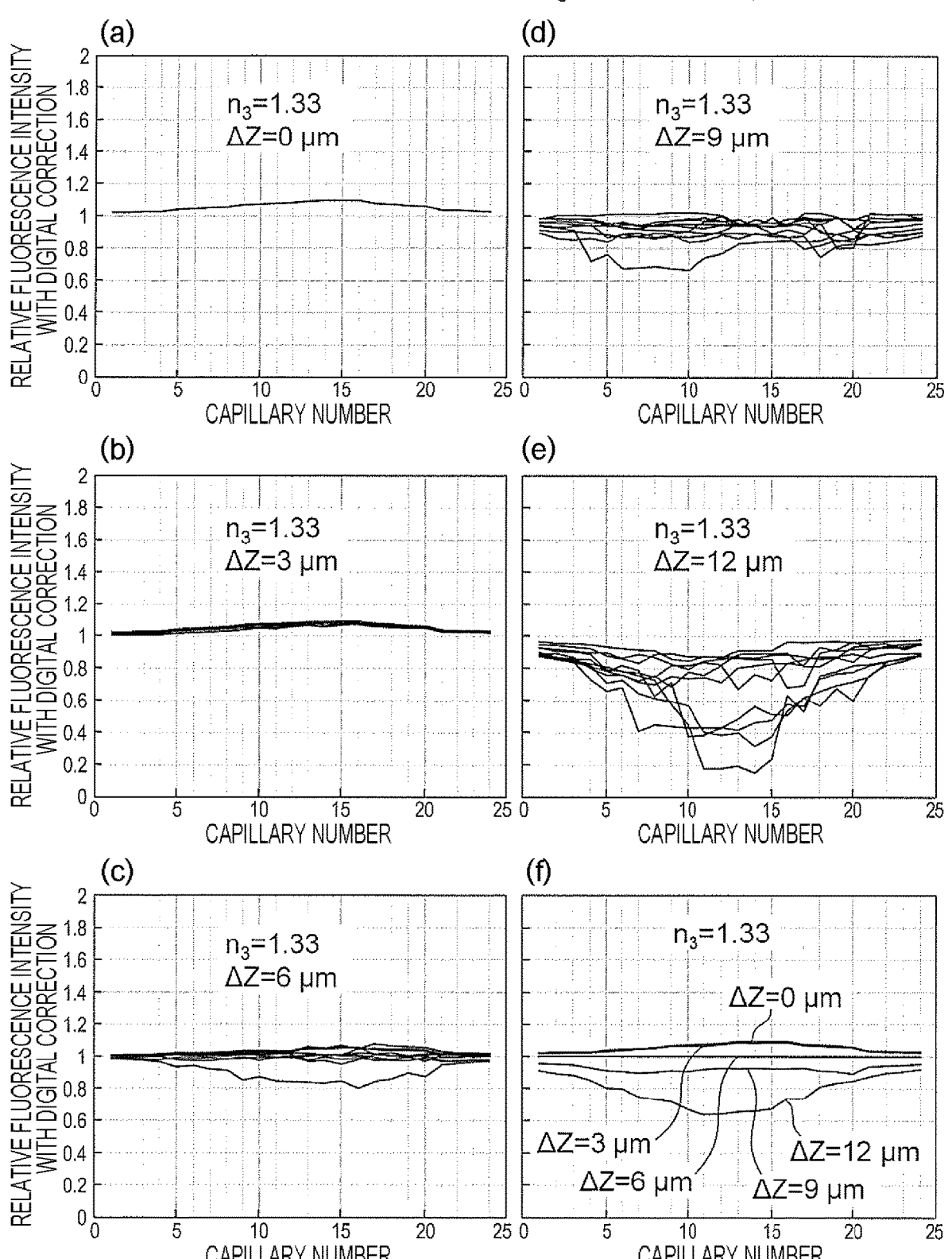
FIG. 15 is a diagram illustrating a relationship between the array-plane error $\Delta Z$ of the capillary array and the output fluorescence-intensity distributions ($n_3$=1.33, correction reference: $n_3$=1.33, $\Delta Z$=6 μm).

FIGS. 15(*a*) to 15(*f*) illustrate output fluorescence-intensity distributions $H(n)=K(n) \times L(n)$ obtained by applying digital correction to each emitted fluorescence-intensity distribution $I(n)=L(n)$ illustrated in FIGS. 10(*a*) to 10(*f*) based on the average emitted fluorescence-intensity distribution when $\Delta Z=6$ μm illustrated in FIG. 10(*f*), in the case of $n_3=1.33$. The digital-correction coefficient distribution $K(n)$ used here is $K(n)=1/L_0(n)$ when defining as $L_0(n)$ the average emitted fluorescence-intensity distribution with $\Delta Z=6$ μm in FIG. 10(*f*). Similarly to the second embodiment, this $L_0(n)$ is different from the average emitted fluorescence-intensity distribution when $\Delta Z=6$ μm in FIG. 9(*f*) described above, which is one of the important features of the technology of the present disclosure. Therefore, as a matter of course, the average output fluorescence-intensity distribution with $\Delta Z=6$ μm in FIG. 15(*f*) is $H(n)=1$.

On the other hand, although the same digital-correction coefficient distribution $K(n)$ as described above is used, the output fluorescence-intensity distributions in FIGS. 15(*a*) to 15(*e*) are also flattened as compared with the emitted fluorescence-intensity distributions in FIGS. 10(*a*) to 10(*e*). As a result, when $\Delta Z=0$ μm, 3 μm, 6 μm, 9 μm, and 12 μm, the coefficients of variation of the relative fluorescence intensity in FIG. 10 are CV=12%, 12%, 14%, 16%, and 28%, whereas the coefficients of variation of the digitally corrected relative fluorescence intensity in FIG. 15 are significantly reduced to CV=2%, 2%, 2%, 5%, and 16%.

Therefore, CV≤10% of practical performance is satisfied for any capillary array when $\Delta Z \leq 9$ μm by this digital correction. As compared with the case of using the emitted fluorescence-intensity distribution when $\Delta Z=0$ μm as a reference in the second embodiment, the CV increases by the equivalent of $\Delta Z=0$ μm to 3 μm. From the above viewpoint of reducing the coefficient of variation of the relative fluorescence intensity, the case of using the emitted fluorescence-intensity distribution when $\Delta Z=0$ μm as a reference is more superior comprehensively. But, it is also effective to use the average emitted fluorescence-intensity distribution when $\Delta Z=6$ μm as a reference.

Figure 16:
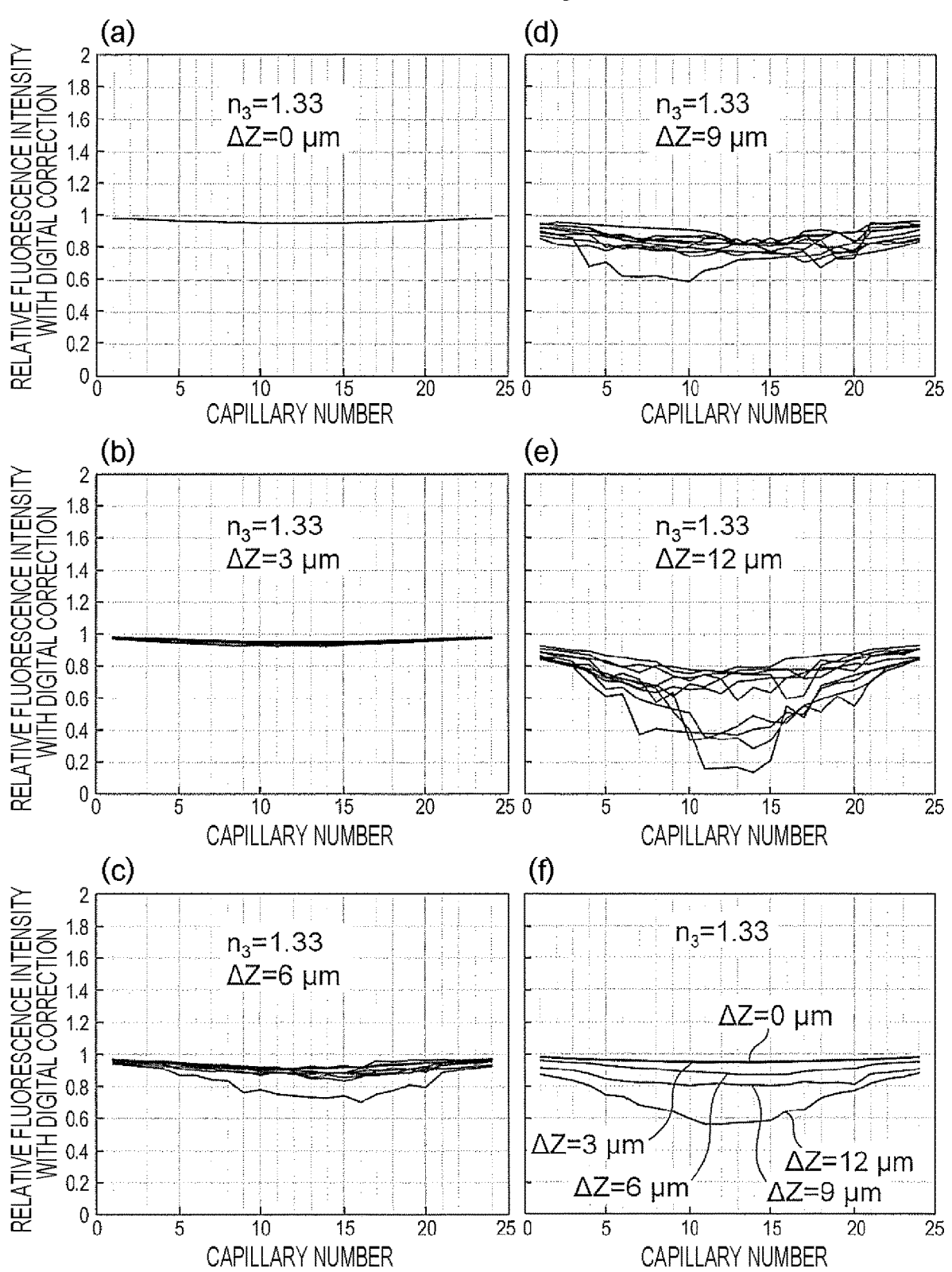
FIG. 16 is a diagram illustrating a relationship between the array-plane error $\Delta Z$ of the capillary array and the output fluorescence-intensity distributions ($n_3$=1.33, correction reference: $n_3$=1.41, $\Delta Z$=0 μm).

Example of Digital Correction for
Fluorescence-Intensity Distribution: Case of Using
Emitted Fluorescence-Intensity Distribution with
$\Delta Z=0$ µm as Reference Subsequently, digital correction based on the emitted fluorescence-intensity distribution when $\Delta Z=0$ µm at different $n_3$ is considered. FIGS. 16($a$) to 16($f$) illustrate output fluorescence-intensity distributions $H(n)=K(n)\times L(n)$ obtained by applying digital correction to each emitted fluorescence-intensity distribution $I(n)=L(n)$ illustrated in FIGS. 10($a$) to 10($f$) in the case of $n_3=1.33$ based on the emitted fluorescence-intensity distribution when $\Delta Z=0$ µm in the case of $n_3=1.41$ illustrated in FIG. 9($a$). The digital-correction coefficient distribution $K(n)$ used here is $K(n)=1/L_0(n)$ when defining as $L_0(n)$ the emitted fluorescence-intensity distribution with $\Delta Z=0$ µm in FIG. 9($a$). As already mentioned, this $L_0(n)$ is different from the emitted fluorescence-intensity distribution when $\Delta Z=0$ µm in FIG. 10($a$), which is one of the important features in the technology of the present disclosure. Therefore, unlike the result of FIG. 13($a$), the output fluorescence-intensity distribution in FIG. 16($a$) does not satisfy $H(n)=1$ and has a slightly downward convex shape.

Similarly, all the output fluorescence-intensity distributions in FIGS. 16($a$) to 16($f$) also have downward convex shapes. But, all are flattened as compared with the emitted fluorescence-intensity distributions in FIGS. 10($a$) to 10($f$). As a result, when $\Delta Z=0$ µm, 3 µm, 6 µm, 9 µm, and 12 µm, the coefficients of variation of the relative fluorescence intensity in FIG. 10 are CV=12%, 12%, 14%, 16%, and 28%, whereas the coefficients of variation of the digitally corrected relative fluorescence intensity in FIG. 16 are significantly reduced to CV=1%, 1%, 4%, 7%, and 19%.

Therefore, CV≤10% of practical performance is satisfied for any capillary array when $\Delta Z\leq 9$ µm by this digital correction. However, as compared with the digital correction based on the emitted fluorescence-intensity distribution when $\Delta Z=0$ µm in the case of $n_3=1.33$ in FIG. 13, the coefficient of variation increases as a whole. From the above viewpoint of reducing the coefficient of variation of the relative fluorescence intensity, the case of using emitted fluorescence-intensity distribution with the same $n_3$ as a reference is superior comprehensively. But, it is also effective to use average emitted fluorescence-intensity distribution with different $n_3$ as a reference.

(E) Fourth Embodiment

In the present embodiment, an examination of the third embodiment will be further deepened, and a relationship between a reference of digital correction and a result of digital correction for various $n_3$ will be examined in detail. Similarly to the second embodiment, a configuration in which the 24-capillary arrays illustrated in the upper part of FIG. 6 and FIG. 8 are irradiated on the both sides with laser beams will be examined. But, other configurations may be used.

Figure 17:
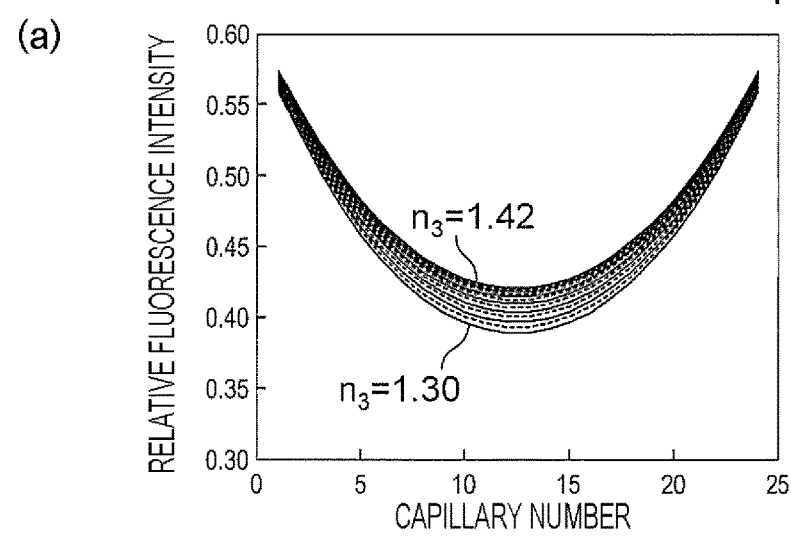
FIG. 17 is a diagram illustrating a relationship among the emitted fluorescence-intensity distributions, the output fluorescence-intensity distributions, and the second-order coefficient of the output fluorescence-intensity distributions in the capillary array for various capillary internal refractive indexes $n_3$.
Figure 17:
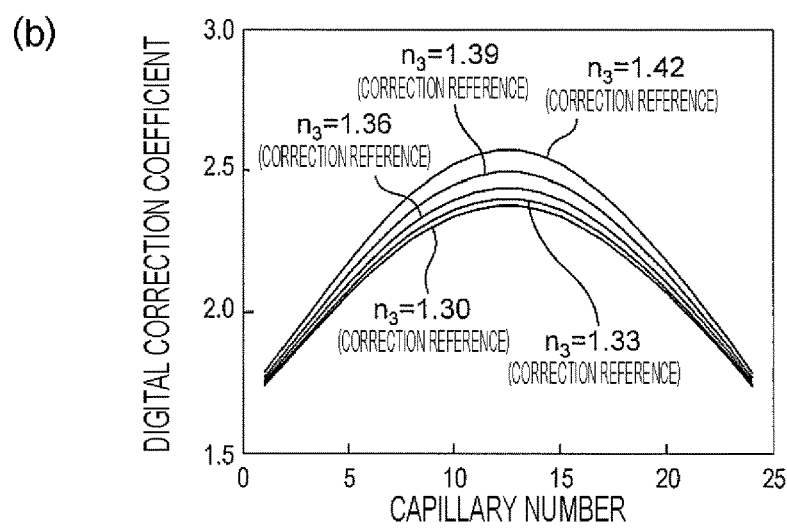
Figure 17:
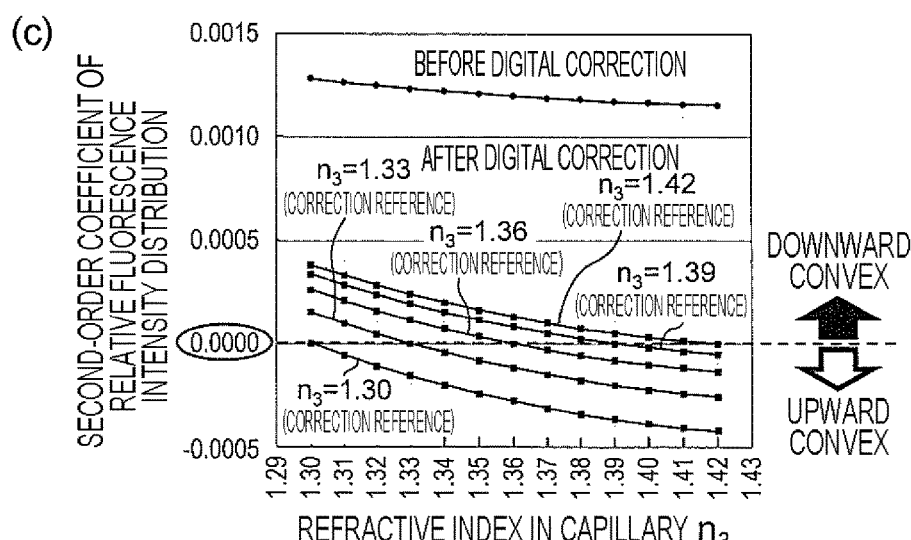

Example of Digital-Correction Coefficient of
Relative Fluorescence Intensity for Each Refractive
Index when $\Delta Z=0$ µm FIG. 17($a$) is a diagram illustrating 13 kinds of changes in relative fluorescence intensity with respect to capillary number for refractive index $n_3$ of the capillary-inside medium from 1.30 to 1.42 in increments of 0.01, in a case where the array-plane error of the capillary array is regarded as $\Delta Z=0$ µm. That is, FIG. 17($a$) illustrates the emitted fluorescence-intensity distributions $I(n)=L(n)$ when $C(n)=1$ in FIG. 11. In FIG. 17($a$), each emitted fluorescence-intensity distribution $I(n)=L(n)$ is indicated by a solid line when the numerical value of the second decimal place of $n_3$ is an even number, and is indicated by a dotted line when the numerical value of the second decimal place of $n_3$ is an odd number. The emitted fluorescence-intensity distributions when $n_3=1.41$ and $n_3=1.33$ therein are the same as the emitted fluorescence-intensity distributions illustrated in FIGS. 9($a$) and 10($a$), respectively. However, in FIG. 17($a$), the scale on the vertical axis is enlarged. It can be seen that, as $n_3$ decreases, the degree of downward convexity of the emitted fluorescence-intensity distributions $L(n)$ increases, that is, the curvature of the downward convex curves monotonously increases. FIG. 17($b$) is a diagram illustrating five kinds of digital-correction coefficients with respect to capillary number based on $L(n)$ when $n_3=1.30$, 1.33, 1.36, 1.39, and 1.42 in FIG. 17($a$). That is, FIG. 17($b$) illustrates the digital-correction coefficient distributions $K(n)$ in FIG. 11. Also in the present embodiment, it is assumed that the optical correction coefficient distribution in FIG. 11 is $J(n)=1$. Each $K(n)$ is the inverse of the corresponding $L(n)$, that is, $K(n)=1/L(n)$.

Each emitted fluorescence-intensity distribution $I(n)=L(n)$ in FIG. 17($a$) can also be simply obtained using the above-described Expressions (4) and (6). Here, $n_1=1.00$, $n_2=1.46$, $n_3=1.30$ to 1.42, and N=24 may be set. The digital-correction coefficient distribution $K(n)=1/L(n)$ is the first one achieved by the present disclosure.

Figure 18:
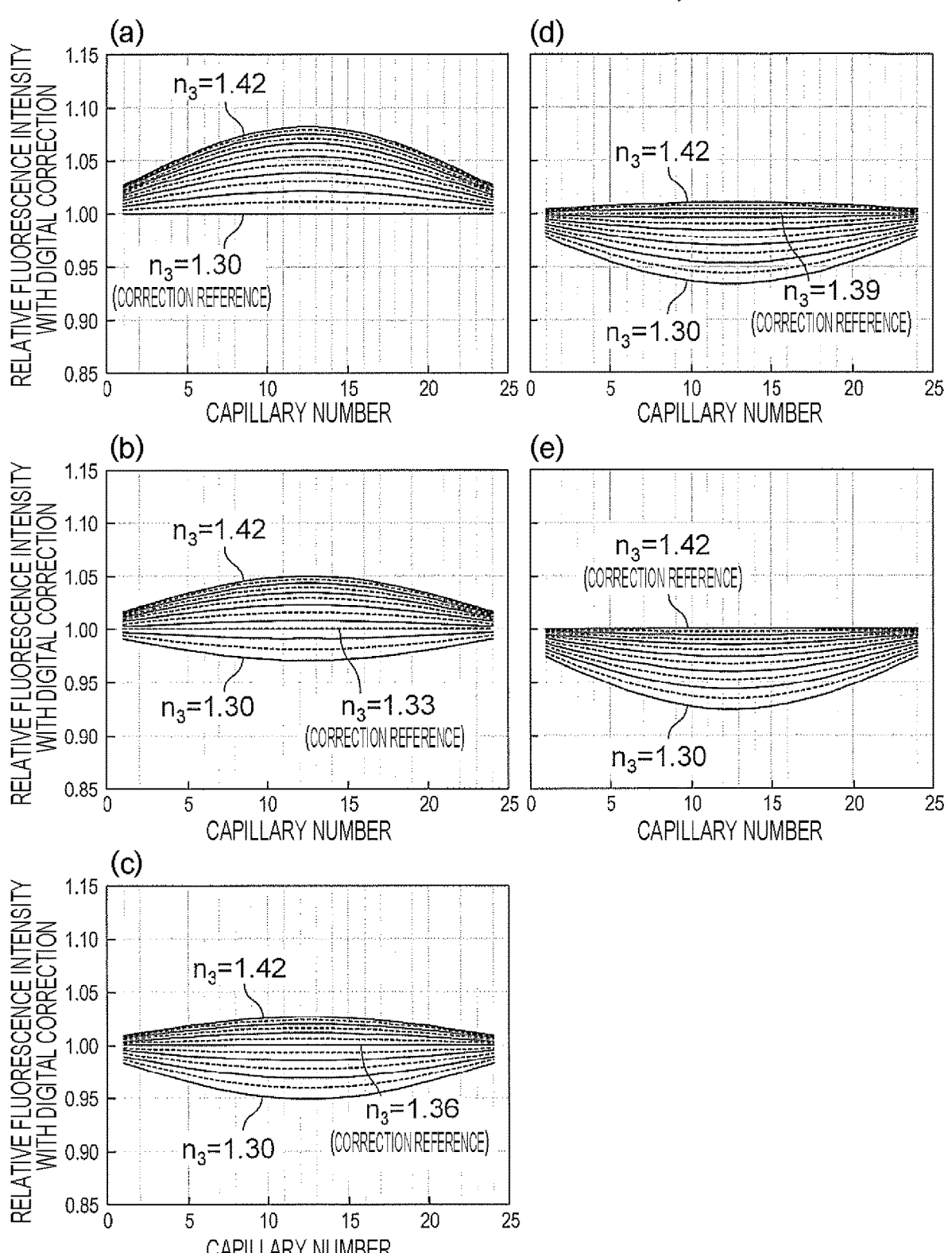
FIG. 18 is a diagram illustrating the output fluorescence-intensity distributions in the capillary array for various correction references and the capillary internal refractive indexes $n_3$.

Example of Output Fluorescence-Intensity
Distribution H(n) with Digital Correction FIG. 18($a$) is a diagram illustrating an output fluorescence-intensity distribution $H(n)=K(n)\times L(n)$ obtained by applying digital correction with the digital-correction coefficient distribution $K(n)$ when $n_3=1.30$ illustrated in FIG. 17($b$) to the 13 kinds of emitted fluorescence-intensity distributions $I(n)=L(n)$ illustrated in FIG. 17($a$). Similarly, FIG. 18($b$), FIG. 18($c$), FIG. 18($d$) and FIG. 18($e$) are diagrams illustrating output fluorescence-intensity distributions $H(n)=K(n)\times L(n)$ obtained by applying digital correction with the digital-correction coefficient distributions $K(n)$ when $n_3=1.33$, 1.36, 1.39, and 1.42 (correction references) illustrated in FIG. 17($b$) to the 13 kinds of emission fluorescence-intensity distributions $I(n)=L(n)$ (correction targets) illustrated in FIG. 17($a$). All the output fluorescence-intensity distributions $H(n)$ illustrated in FIG. 18 are flattened compared to the emitted fluorescence-intensity distributions $L(n)$ illustrated in FIG. 17($a$). When correction-reference refractive index $n_3$ matches refractive index $n_3$ in a correction-target emitted fluorescence-intensity distribution, the output fluorescence-intensity distribution $H(n)$ with the digital collection is most flattened. Assuming that $n_3$ in a digital-correction reference is denoted by $n_3$ (correction reference) and $n_3$ in a digital-correction target is denoted by $n_3$ (correction target), an output fluorescence-intensity distribution is $H(n)=1$ in the case of $n_3$ (correction reference)= $n_3$ (correction target), an output fluorescence-intensity distribution $H(n)$ is an upward convex curve in the case of $n_3$ (correction reference)<$n_3$ (correction target), and an output fluorescence-intensity distribution $H(n)$ is a downward convex curve in the case of $n_3$ (correction reference)>$n_3$ (correction target). In addition, the larger the difference between $n_3$ (correction reference) and $n_3$ (correction target) is, the larger the degree of upward or downward convexity is. For example, in FIG. 18(*a*), when executing the digital correction with the correction-reference refractive index $n_3$=1.30, the output fluorescence-intensity distributions H(n) with various correction-target refractive indexes are illustrated. When correction-target refractive index $n_3$=1.30, H(n) is flat (H(n)=1). But, in the case of other correction-target refractive indexes, the correction is not appropriately performed as the difference from 1.30 increases. As can be seen from FIG. 18(*a*), in the case of correction-target refractive index $n_3$=1.42, the correction is most excessive.

<Change in Second-Order Coefficient when Each Output Fluorescence-Intensity Distribution H(n) Before and After Digital Correction is Approximated by Quadratic Function>

The degree of upward convexity or the degree of downward convexity of each output fluorescence-intensity distribution H(n) can be expressed by a second-order coefficient when each output fluorescence-intensity distribution H(n) is approximated by a quadratic function. In the present embodiment, an output fluorescence-intensity distribution is approximated by a quadratic function, but the degree of upward convexity or the degree of downward convexity of H(n) may be expressed by other functions or other methods.

FIG. 17(*c*) is a diagram illustrating relationships between correction-target refractive index $n_3$ of the medium of the capillary inside and secondary coefficient of fluorescence-intensity distributions before and after digital correction with various correction-reference refractive indexes $n_3$ when those distributions are approximated by quadratic functions. When the second-order coefficient on the vertical axis is zero, the output fluorescence-intensity distribution becomes H(n)=1 and is completely flat. On the other hand, as the second-order coefficient is larger than zero, the degree of downward convexity of the output fluorescence-intensity distribution H(n) increases. Meanwhile, the degree of upward convexity of the output fluorescence-intensity distribution H(n) increases as the second-order coefficient becomes smaller than zero. The second-order coefficient before digital correction gradually decreases with correction-target refractive index $n_3$. This corresponds to the fact that the degree of downward convexity of the emitted fluorescence-intensity distribution L(n) decreases as $n_3$ increases in FIG. 17(*a*). Each of the second-order coefficients after digital correction is smaller than the corresponding second-order coefficient before digital correction. In addition, each of the absolute values of the second-order coefficients after digital correction is smaller than the absolute value of the corresponding second-order coefficient before digital correction. These results indicate that each digital correction exhibits the effect of flattening the corresponding emitted fluorescence-intensity distribution.

In FIG. 17(*c*), five kinds of curves after digital correction indicated by $n_3$=1.30 (correction reference), $n_3$=1.33 (correction reference), $n_3$=1.36 (correction reference), $n_3$=1.39 (correction reference), and $n_3$=1.42 (correction reference) correspond to FIGS. 18(*a*), 18(*b*), 18(*c*), 18(*d*), and 18(*e*), respectively. In any of the five kinds of curves, the second-order coefficient of the output fluorescence-intensity distribution with the five kinds of correction references, the second-order coefficient is zero when $n_3$ (correction reference)=$n_3$ (correction target), negative when $n_3$ (correction reference)<$n_3$ (correction target), and positive when $n_3$ (correction reference)>$n_3$ (correction target). Here, the horizontal axis in FIG. 17(*c*) indicates $n_3$ (correction target). The absolute value of the second-order coefficient increases as the difference between $n_3$ (correction reference) and $n_3$ (correction target) increases. The above corresponds to the increase in the degree of upward convexity or downward convexity illustrated in FIG. 18.

In conclusion, when digital correction is performed, it is most effective when $n_3$ (correction reference)=$n_3$ (correction target). In other words, it is most effective to minimize the difference between $n_3$ (correction reference) and $n_3$ (correction target). When $n_3$ (correction reference)<$n_3$ (correction target), the digital correction is excessive so that the output fluorescence-intensity distribution becomes an upward convex curve. When $n_3$ (correction reference)>$n_3$ (correction target), the digital correction is insufficient so that the output fluorescence-intensity distribution becomes a downward convex curve. However, these cases are also effective because the output fluorescence-intensity distributions are flattened as compared with the emitted fluorescence-intensity distributions before digital correction. When using separation media having a plurality of different kinds of $n_3$ at different timings, it is effective to perform digital correction depending on $n_3$ to be used at each timing. That is, the correction reference and the digital-correction coefficient distribution are changed depending on $n_3$ to be used. The features of the digital correction according to the present embodiment have been described above.

Although having studied above the case where the array-plane error of the capillary array is $\Delta Z$=0 μm, it is possible to obtain the same effect by the same means also in the case when $\Delta Z \neq 0$ μm. For example, when $\Delta Z$=6 μm as a common condition, results similar to those in FIG. 17(*c*) are obtained. Here, each correction reference may be acquired under the condition of $\Delta Z$=6 μm, and the emitted fluorescence-intensity distribution to be corrected may be acquired under the condition of $\Delta Z$=6 μm. On the other hand, when $\Delta Z$ in each correction reference is different from $\Delta Z$ in the emitted fluorescence-intensity distribution to be corrected, some deformation occurs. In FIG. 17(*c*), when $n_3$=1.33 (correction reference) at $\Delta Z$=0 μm is replaced with $n_3$=1.33 (correction reference) at $\Delta Z$=6 μm, the corresponding curve shifts in the lower left direction. That is, when $n_3$ (correction target) on the horizontal axis is 1.33, the second-order coefficient on the vertical axis becomes 0 when performing digital correction with $n_3$=1.33 (correction reference) at $\Delta Z$=0 μm, but the second-order coefficient on the vertical axis becomes negative when performing digital correction with $n_3$=1.33 (correction reference) at $\Delta Z$=6 μm. Although such a curve shift occurs, the overall trend is similar. Even when digital correction is performed with any digital reference, when $n_3$ (correction target) on the horizontal axis is set to a large value, for example, when $n_3$=1.42, the second-order coefficient on the vertical axis becomes negative. On the other hand, when $n_3$ (correction target) on the horizontal axis is set to a small value, for example, when $n_3$=1.30, the second-order coefficient on the vertical axis becomes positive.

(F) Fifth Embodiment

In a fifth embodiment, the effect of the digital correction is evaluated for various $\Delta Z$ in capillary arrays, and $\Delta Z$ satisfying MIN≥0.2 and CV≤15% or CV≤10%, which are practical performances, is also clarified. The present embodiment will consider a configuration in which the 24-capillary arrays illustrated in the upper part of FIG. 6 and FIG. 8 are irradiated on the both sides with laser beams. But, a configuration other than this may be used.

<Results of Optical Correction and Digital Correction>

(i) Case of Refractive Index $n_3$=1.41

Figure 19:
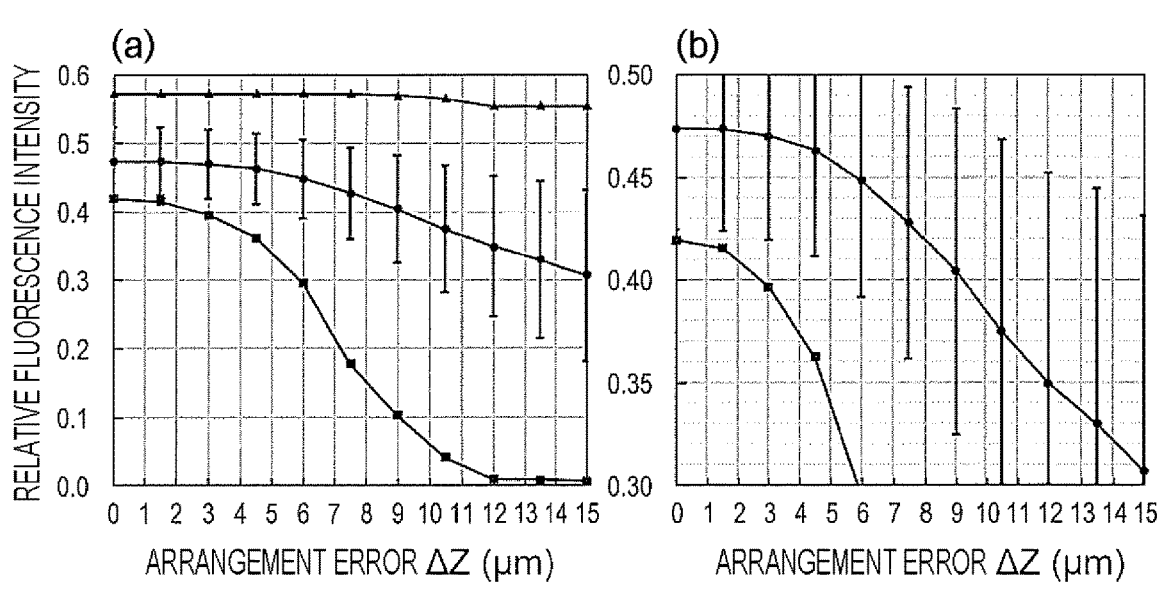
FIG. 19 is a diagram illustrating relationships between the array-plane error $\Delta Z$ of the capillary array and the relative fluorescence intensity, and the coefficient of variation ($n_3$=1.41).
Figure 19:
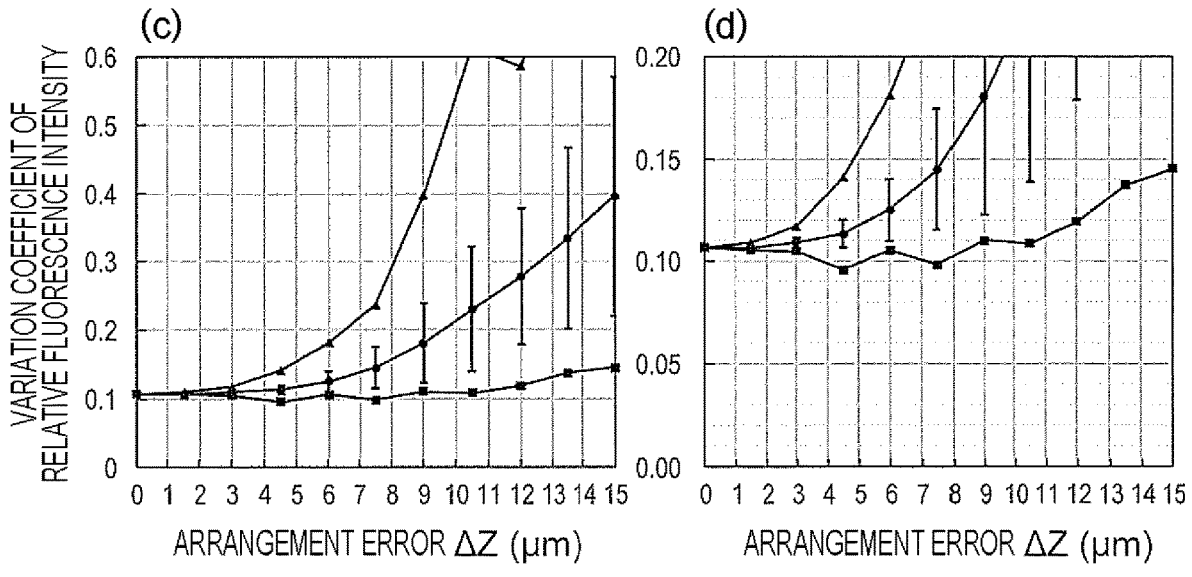

FIG. 19 is a diagram illustrating a relationship between $\Delta Z$ and emitted fluorescence intensity of each capillary on the upper side, and a relationship between $\Delta Z$ and the coefficient of variation thereof on the lower side, when the both-side irradiation is applied. Here, $\Delta Z$ is changed to 0.0, 1.5, 3.0, 4.5, 6.0, 7.5, 9.0, 10.5, 12.0, 1.41, and 15.0 μm in the case of $n_3$=1.41. In FIG. 19, the upper and lower parts on the right side are enlarged views of the upper and lower parts on the left side. For $\Delta Z$=0.0 μm, one capillary array is used. For each $\Delta Z$ when $\Delta Z$≠0.0 μm, 100 random capillary arrays are used. That is, in the graphs in the upper part of FIG. 19, 24 pieces of relative fluorescence-intensity data are used for $\Delta Z$=0.0 μm, and 24 pieces×100 sets=2400 pieces of relative fluorescence-intensity data are used for each $\Delta Z$ when $\Delta Z$≠0.0 μm. Then, in the graphs, each black circle plot indicates an average value, each error bar indicates ±standard deviation, each black triangle plot indicates a maximum value, and each black square plot indicates a minimum value. As can be seen from FIG. 19(*a*), as $\Delta Z$ increases, all of the average value, the maximum value, and the minimum value decrease, and the standard deviation increases.

In the graphs in the lower part of FIG. 19, one coefficient of variation of the relative fluorescence intensity data is used for $\Delta Z$=0.0 μm, and 100 coefficients of variation of the relative fluorescence intensity data are used for each $\Delta Z$ when $\Delta Z$≠0.0 μm. Then, in the graphs, each black circle plot indicates an average value, each error bar indicates ±standard deviation, each black triangle plot indicates a maximum value, and each black square plot indicates a minimum value. As can be seen from FIG. 19(*c*), as $\Delta Z$ increases, all of the average value, the maximum value, and the minimum value increase, and the standard deviation increases.

When defining the minimum value of the relative fluorescence intensity in the upper part of FIG. 19 as MIN, it can be seen that $\Delta Z$≤7.2 μm is sufficient to satisfy MIN≥0.2 which is practical performance. On the other hand, when defining the average value+standard deviation of the relative fluorescence intensity in the lower part of FIG. 19 as CV, it can be seen that $\Delta Z$≤6.4 μm is sufficient to satisfy CV≤15% which is practical performance. However, CV≤10% cannot be satisfied.

Figure 20:
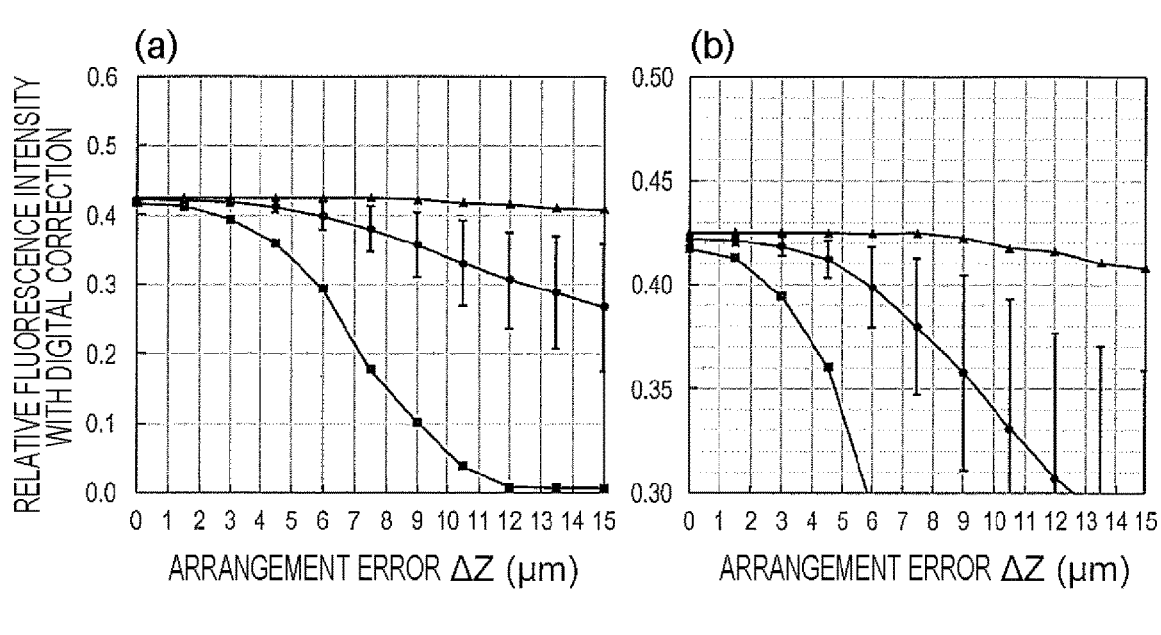
FIG. 20 is a diagram illustrating relationships between the array-plane error $\Delta Z$ of the capillary array and the digitally corrected relative fluorescence intensity, and the coefficient of variation ($n_3$=1.41).
Figure 20:
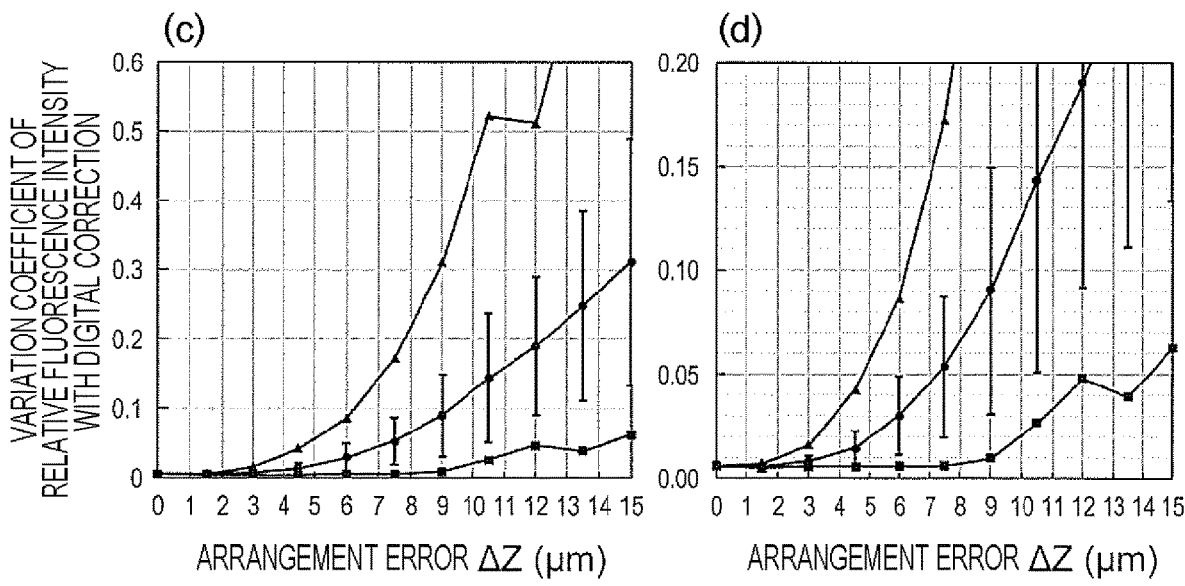

FIG. 20 is a diagram illustrating results of performing optical-system correction and digital correction on all of the emitted fluorescence-intensity distributions I(n)=L(n) of the 1001 kinds of capillary arrays illustrated in FIG. 19. The optical-system-correction coefficient distribution J(n) is obtained by actually measuring the optical-system-correction coefficient distribution of the 3500 series genetic analyzer. J(n) has a maximum value of 1 at the center of the capillary array, that is, in the middle of the capillaries with n=12 and n=13, and decreases with distance from the center. Therefore, it is possible to mutually compare the absolute values of the emitted fluorescence-intensity distribution I(n) and the measured fluorescence-intensity distribution M(n).

The reference of the digital correction is the measured fluorescence-intensity distribution M(n)=J(n)×L(n) when $\Delta Z$=0 μm and $n_3$=1.41 in the lower part of FIG. 7 obtained by performing the optical-system correction on the emitted fluorescence-intensity distribution I(n)=L(n) when $\Delta Z$=0 μm and $n_3$=1.41 in the upper part of FIG. 7. As in the second and third embodiments, the digital-correction coefficient distribution may be K(n)=1/M(n). However, in the present embodiment, the digital-correction coefficient distribution is $K(n)=\alpha \times [\{n-(N+1)/2\} \times p]^2+1$, where $\alpha$ denotes a coefficient and $\alpha$=−0.074, N denotes the total number of capillaries and N=24, and p denotes the arrangement interval of the capillaries and p=0.155 mm. K(n) has a maximum value of 1 at the center of the capillary array, that is, in the middle of the capillaries with n=12 and n=13, and decreases with distance from the center. Therefore, it is possible to mutually compare the absolute values of the measured fluorescence-intensity distribution M(n) and the output fluorescence-intensity distribution H(n). When the digital correction with the above digital-correction coefficient distribution K(n) is applied to the measured fluorescence-intensity distribution M(n) when $n_3$=1.41 in the lower part of FIG. 7, the output fluorescence-intensity distribution H(n)=K(n)×M(n) is most flattened. The coefficient of variation of the emitted fluorescence-intensity distribution in the upper part of FIG. 7 is CV=11%. Then, the coefficient of variation of the measured fluorescence-intensity distribution in the lower part of FIG. 7 is CV=9%. Further, the coefficient of variation of the output fluorescence-intensity distribution by the digital correction is reduced to CV=0.6%.

FIG. 20 illustrates results of applying the above optical-system correction and digital correction to the emitted fluorescence-intensity distributions not only when $\Delta Z$=0 μm but also when $\Delta Z$ is arbitrary with $\Delta Z$≠0 μm. When the upper part of FIG. 20 is compared with the upper part of FIG. 19, it can be seen that the minimum value of the relative fluorescence-intensity distribution does not change, but the maximum value and the average value decrease, and the difference between the maximum value and the minimum value and the standard deviation decrease. On the other hand, when comparing the lower part of FIG. 20 with the lower part of FIG. 19, it can be seen that the coefficient of variation is greatly reduced not only for $\Delta Z$=0 μm but also for all $\Delta Z$. When defining the minimum value of the relative fluorescence intensity in the upper part of FIG. 20 as MIN, the condition satisfying MIN≥0.2, which is the practical performance, is $\Delta Z$≤7.2 μm, which is the same as the result in the upper part of FIG. 19. On the other hand, when defining the average value+standard deviation of the relative fluorescence intensity in the lower part of FIG. 20 as CV, it can be seen that $\Delta Z$≤9.0 μm is sufficient to satisfy CV≤15% which is practical performance. In addition, it can be seen that $\Delta Z$≤7.8 μm is sufficient to satisfy CV≤10%.

The above-described acceptable range of $\Delta Z$ is greatly enlarged as compared with FIG. 19. That is, it can be seen that the acceptable range of $\Delta Z$ satisfying the practical performance is greatly expanded by the digital correction according to the present disclosure.

(ii) Case of Refractive Index $n_3$=1.33

Figure 21:
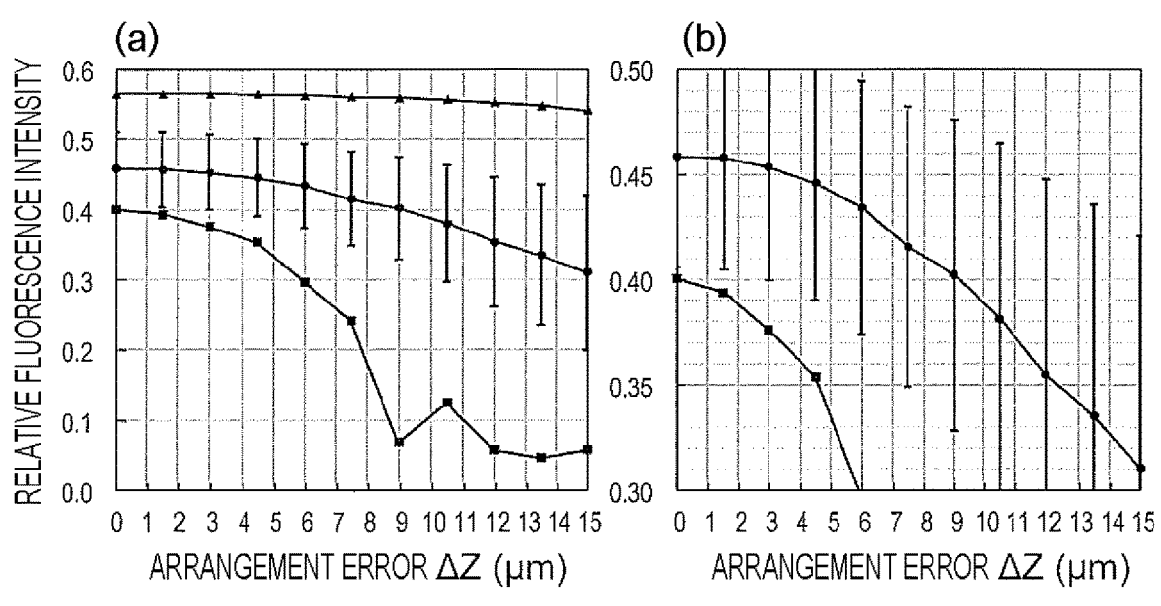
FIG. 21 is a diagram illustrating relationships between the array-plane error $\Delta Z$ of the capillary array and the relative fluorescence intensity, and the coefficient of variation ($n_3$=1.33).
Figure 21:
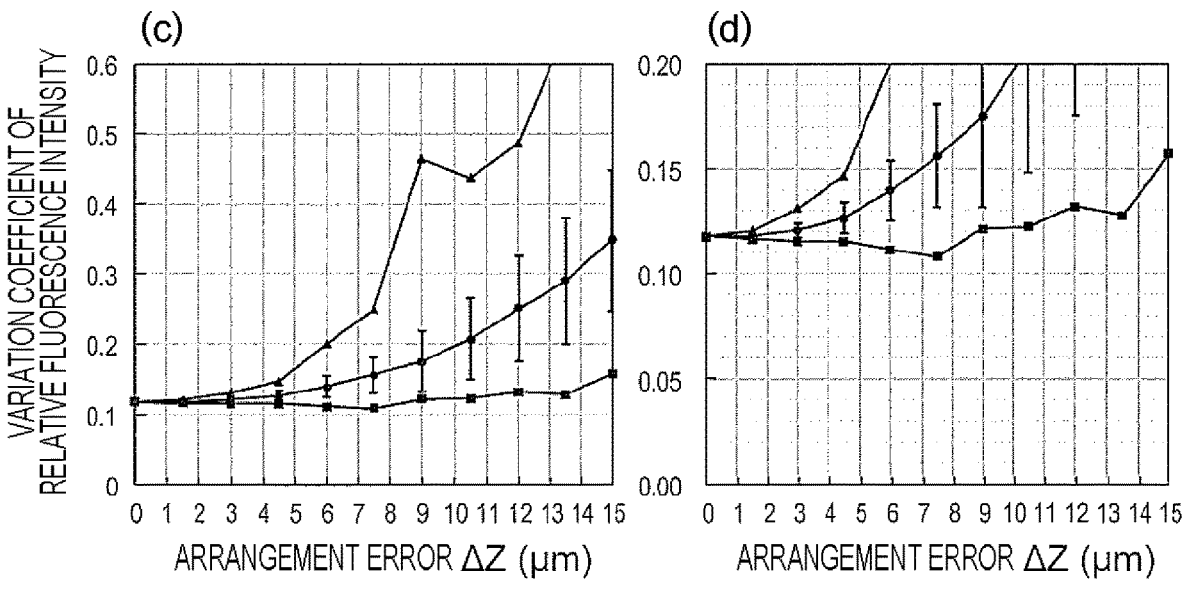

FIG. 21 illustrates a relationship between $\Delta Z$ and emitted fluorescence intensity of each capillary on the upper part, and a relationship between $\Delta Z$ and the coefficient of variation thereof on the lower part, when the both-side irradiation is applied. Here, $\Delta Z$ is changed to 0.0, 1.5, 3.0, 4.5, 6.0, 7.5, 9.0, 10.5, 12.0, 13.5, and 15.0 μm in the case of $n_3$=1.33. In FIG. 21, the upper and lower parts on the right side are enlarged views of the upper and lower parts on the left side. For $\Delta Z$=0.0 μm, one capillary array is used, and for each $\Delta Z$ when $\Delta Z$≠0.0 μm, 100 random capillary arrays are used. That is, in the graphs in the upper part of FIG. 21, 24 pieces of relative fluorescence-intensity data are used for $\Delta Z$=0.0 μm, and 24×100 sets=2400 pieces of relative fluorescence-intensity data are used for each $\Delta Z$ when $\Delta Z$≠0.0 μm. In the graphs, each black circle plot indicates an average value, each error bar indicates ±standard deviation, each black triangle plot indicates a maximum value, and each black square plot indicates a minimum value. As can be seen from FIG. 21(*a*), as $\Delta Z$ increases, all of the average value, the maximum value, and the minimum value decrease, and the standard deviation increases.

In the graphs in the lower part of FIG. 21, one coefficient of variation of the relative fluorescence intensity data is used for $\Delta Z$=0.0 μm, and 100 coefficients of variation of the relative fluorescence intensity data are used for each $\Delta Z$ when $\Delta Z$≠0.0 μm. Then, in the graphs, each black circle plot indicates an average value, each error bar indicates ±standard deviation, each black triangle plot indicates a maximum value, and each black square plot indicates a minimum value. As can be seen from FIG. 21(*c*), as $\Delta Z$ increases, all of the average value, the maximum value, and the minimum value increase, and the standard deviation increases. When defining the minimum value of the relative fluorescence intensity in the upper part of FIG. 21 as MIN, it can be seen that $\Delta Z$≤7.9 μm is sufficient to satisfy MIN≥0.2 which is practical performance.

On the other hand, when defining the average value+ standard deviation of the relative fluorescence intensity in the lower part of FIG. 21 as CV, it can be seen that $\Delta Z$≤5.7 μm is sufficient to satisfy CV≤15% which is practical performance. However, CV≤10% cannot be satisfied.

Figure 22:
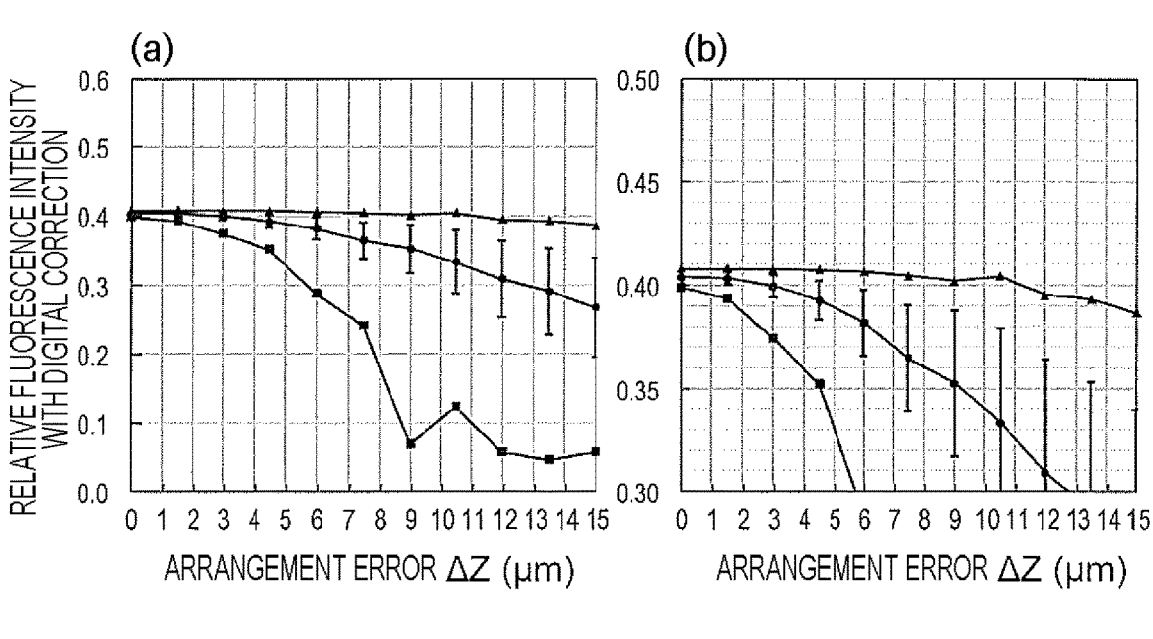
FIG. 22 is a diagram illustrating relationships between the array-plane error $\Delta Z$ of the capillary array and the digitally corrected relative fluorescence intensity, and the coefficient of variation ($n_3$=1.33).
Figure 22:
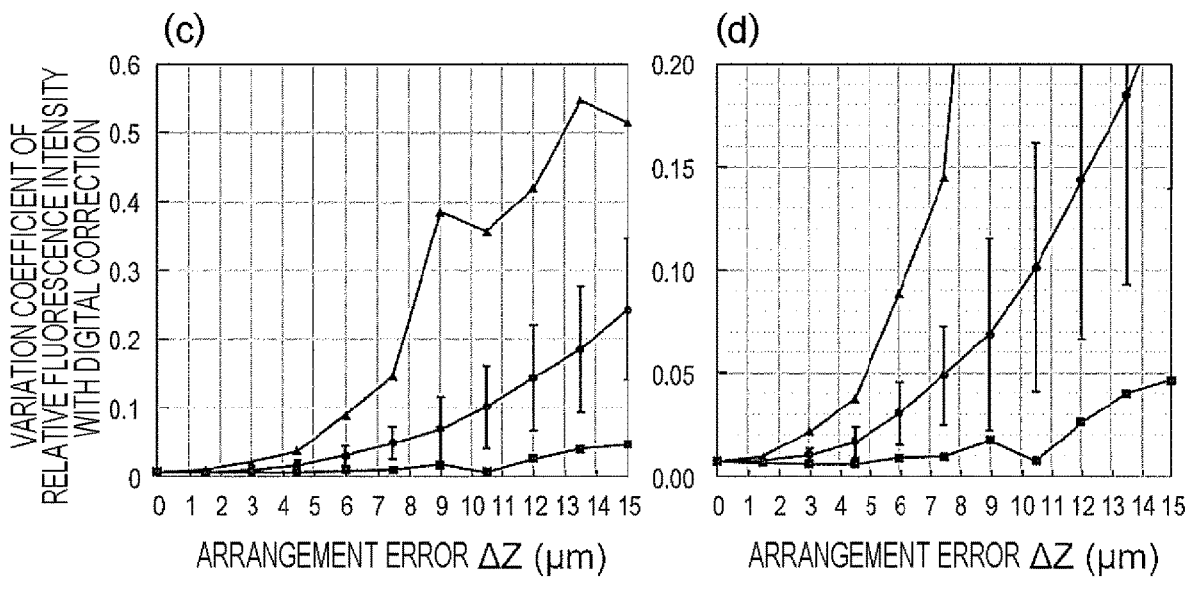

FIG. 22 is a diagram illustrating results of performing optical-system correction and digital correction on all of the emitted fluorescence-intensity distributions I(n)=L(n) of the 1001 kinds of capillary arrays illustrated in FIG. 21. The optical-system-correction coefficient distribution J(n) is obtained by actually measuring the optical-system-correction coefficient distribution of the 3500 series genetic analyzer, and is the same as that used in FIG. 20. J(n) has a maximum value of 1 at the center of the capillary array, that is, in the middle of the capillaries with n=12 and n=13, and decreases with distance from the center. Therefore, it is possible to mutually compare the absolute values of the emitted fluorescence-intensity distribution I(n) and the measured fluorescence-intensity distribution M(n).

The reference of the digital correction is the measured fluorescence-intensity distribution M(n)=J(n)×L(n) when $\Delta Z$=0 μm and $n_3$=1.33 in the lower part of FIG. 7 obtained by performing the optical-system correction on the emitted fluorescence-intensity distribution I(n)=L(n) when $\Delta Z$=0 μm and $n_3$=1.33 in the upper part of FIG. 7. The digital-correction coefficient distribution may be K(n)=1/M(n) similarly to the second and third embodiments. However, in the present embodiment, the digital-correction coefficient distribution is K(n)=α×[{n−(N+1)/2}×p]^2+1, where α is a coefficient and α=−0.081, N is the total number of capillaries and N=24, and p is the arrangement interval of the capillaries and p=0.155 mm. That is, the only difference from the digital correction applied in FIG. 20 is that a changes from −0.074 to −0.081. This difference corresponds to $n_3$ changing from 1.41 to 1.33. K(n) has a maximum value of 1 at the center of the capillary array, that is, in the middle of the capillaries with n=12 and n=13, and decreases with distance from the center. Therefore, it is possible to mutually compare the absolute values of the measured fluorescence-intensity distribution M(n) and the output fluorescence-intensity distribution H(n). When the digital correction with the above digital-correction coefficient distribution K(n) is applied to the measured fluorescence-intensity distribution M(n) when $n_3$=1.33 in the lower part of FIG. 7, the output fluorescence-intensity distribution H(n)=K(n)×M(n) is most flattened. The coefficient of variation of the emitted fluorescence-intensity distribution in the upper part of FIG. 7 is CV=12%, whereas the coefficient of variation of the measured fluorescence-intensity distribution in the lower part of FIG. 7 is CV=10%. Further, the coefficient of variation of the output fluorescence-intensity distribution, to which the digital correction is applied, is reduced to CV=0.8%.

FIG. 22 illustrates results of applying the above optical-system correction and digital correction to the emitted fluorescence-intensity distributions not only when not only when $\Delta Z$=0 μm but also when $\Delta Z$ is arbitrary with $\Delta Z$≠0 μm. When comparing the upper part of FIG. 22 with the upper part of FIG. 21, the minimum value of the relative fluorescence-intensity distribution does not change, but the maximum value and the average value decrease, and the difference between the maximum value and the minimum value and the standard deviation decrease. On the other hand, when comparing the lower part of FIG. 22 with the lower part of FIG. 21, the coefficient of variation is greatly reduced not only for $\Delta Z$=0 μm but also for all $\Delta Z$. When defining the minimum value of the relative fluorescence intensity in the upper part of FIG. 22 as MIN, the condition satisfying MIN≥0.2, which is the practical performance, is $\Delta Z$≤7.9 μm, which is the same as the result in the upper part of FIG. 21. On the other hand, when defining the average value+standard deviation of the relative fluorescence intensity in the lower part of FIG. 22 as CV, it can be seen that $\Delta Z$≤10.1 μm is sufficient to satisfy CV≤15% which is practical performance. In addition, it can be seen that $\Delta Z$≤8.5 μm is sufficient to satisfy CV≤10%. The above-described acceptable range of $\Delta Z$ is greatly enlarged as compared with FIG. 21. That is, it can be seen that the acceptable range of $\Delta Z$ satisfying the practical performance is greatly expanded by the digital correction according to the present disclosure.

(G) Sixth Embodiment

In NPL 1 described above, the refractive index of the medium (separation medium) inside the analysis capillary is $n_3$=1.41, and the refractive index of the medium inside the lens capillary is $n_4$=1.53. The capillary is made of quartz glass and has $n_2$=1.46. Then, from the above Expression (1), the refractive angle of one analysis capillary is $\Delta\theta_A$=+2.4°, while the refractive angle of one lens capillary is $\Delta\theta_B$=−3.0°. Since $\Delta\theta_A+\Delta\theta_B$=−0.61° is obtained, one set of one analysis capillary and one lens capillary exhibits a convex lens action, and multiple laser-beam focusing functions. As described above, a method for evaluating the presence or absence of the multiple laser-beam-focusing function by $\Delta\theta_A+\Delta\theta_B$ has been found for the first time in the technology of the present disclosure.

Figure 23:
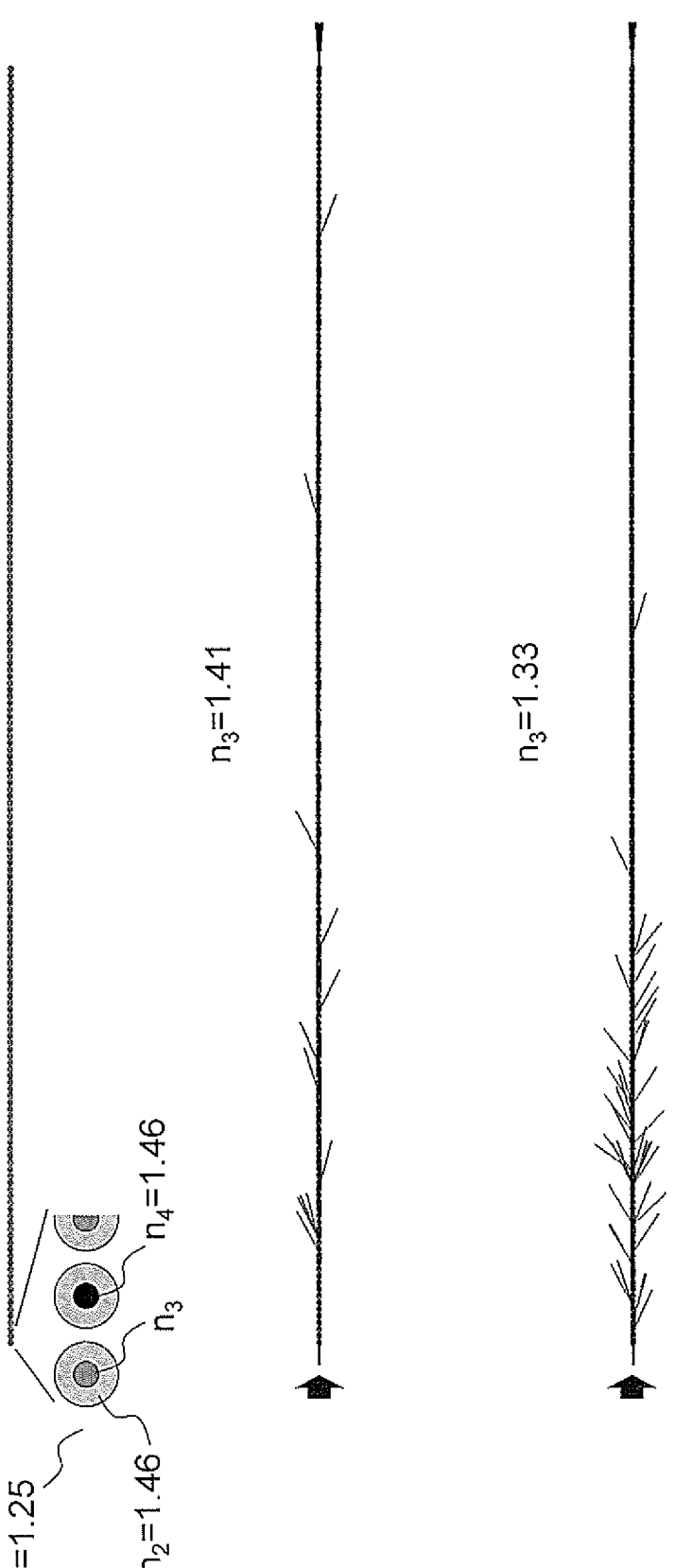
FIG. 23 is a diagram illustrating a configuration of a capillary array (part 2) of the present disclosure and laser-beam ray-tracking results.

Configuration Example of Capillary Array in which Analysis Capillaries and Lens Capillaries are Alternately Arranged The upper part of FIG. 23 illustrates a configuration example of the capillary array of the present disclosure that enables simultaneous irradiation of a larger number of capillaries. The laser-irradiation portions of 192 capillaries having an outer diameter 2R=126 μm and an inner diameter 2r=50 μm are arranged on the same plane at an interval of 155 μm. The array-plane error is zero ($\Delta Z$=0 μm). The capillary outside is a low refractive index solution with $n_1$=1.25, and the capillary material is quartz glass with $n_2$=1.46. As the low refractive index solution, for example, Fluorinert of 3M can be used. 96 odd-numbered capillaries from the left side of the capillary array are analysis capillaries with the refractive index of the internal medium of $n_3$. The 96 analysis capillaries are given capillary numbers from 1 to 96 in order from the left side. Meanwhile, 96 even-numbered capillaries from the left side of the capillary array are lens capillaries with the refractive index of the internal medium of $n_4$=1.46. No capillary number is given to each lens capillary.

The middle part of FIG. 23 illustrates a laser-beam tracing result when the laser beam having a diameter of φ50 μm is incident on the left side of the capillary array in the case of $n_3$=1.41 under the above conditions. As shown in the figure, multiple laser-beam focusing functions, and the insides of all the 192 capillaries can be efficiently irradiated. From the above Expression (1), the refractive angle of one analysis capillary is $\Delta\theta_A$=−1.4°, and the refractive angle of one lens capillary is $\Delta\theta_B$=−3.3°. Since $\Delta\theta_A$+$\Delta\theta_B$=−4.7° is obtained, one set of one analysis capillary and one lens capillary exhibits a convex lens action, and then multiple laser-beam focusing functions.

The lower part of FIG. 23 illustrates the laser-beam tracing result when the laser beam having a diameter of φ50 μm is incident on the left side of the capillary array in the case of $n_3$=1.33 under the above conditions. As shown in the figure, multiple laser-beam focusing functions, and the insides of all the 192 capillaries can be efficiently irradiated. From the above Expression (1), the refractive angle of one analysis capillary is $\Delta\theta_A$=+2.0°, and the refractive angle of one lens capillary is $\Delta\theta_B$=3.3°. Since $\Delta\theta_A$+$\Delta\theta_B$=−1.3° is obtained, one set of one analysis capillary and one lens capillary exhibits a convex lens action, and then multiple laser-beam focusing functions.

Examples of Relative Fluorescence Intensity,
Optical-System-Corrected Relative Fluorescence
Intensity, and Digitally-Corrected &
Optical-System-Corrected Relative Fluorescence
Intensity when $n_3$=1.41

Figure 24:
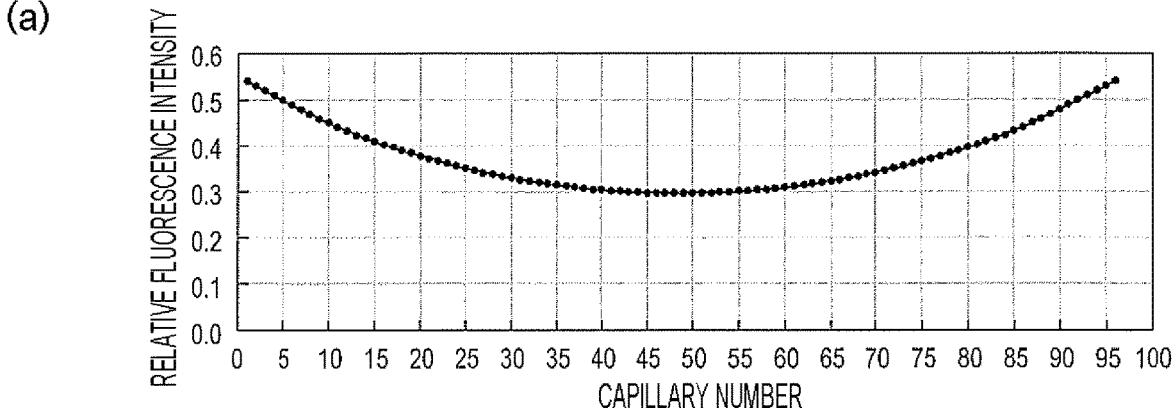
FIG. 24 is a diagram illustrating an emitted fluorescence-intensity distribution, a measured fluorescence-intensity distribution, and an output fluorescence-intensity distribution of the capillary array (part 2) ($n_3$=1.41).
Figure 24:
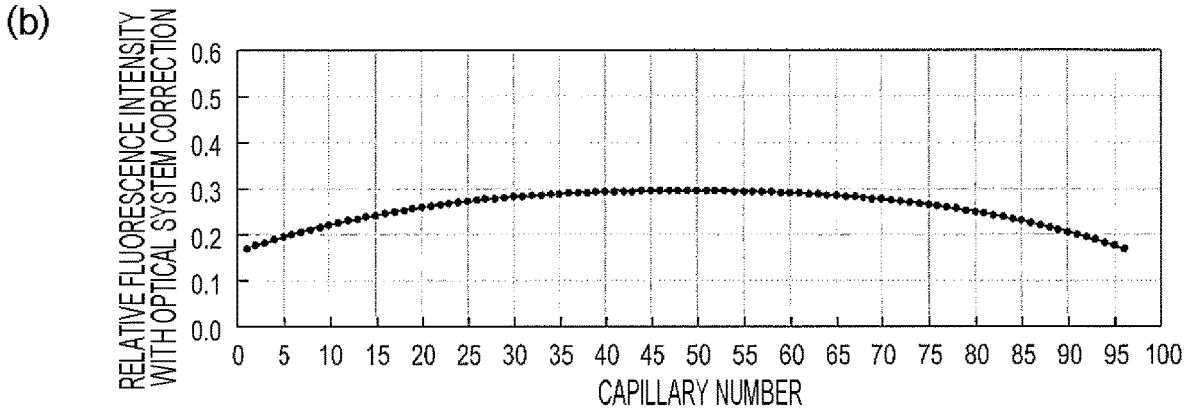
Figure 24:
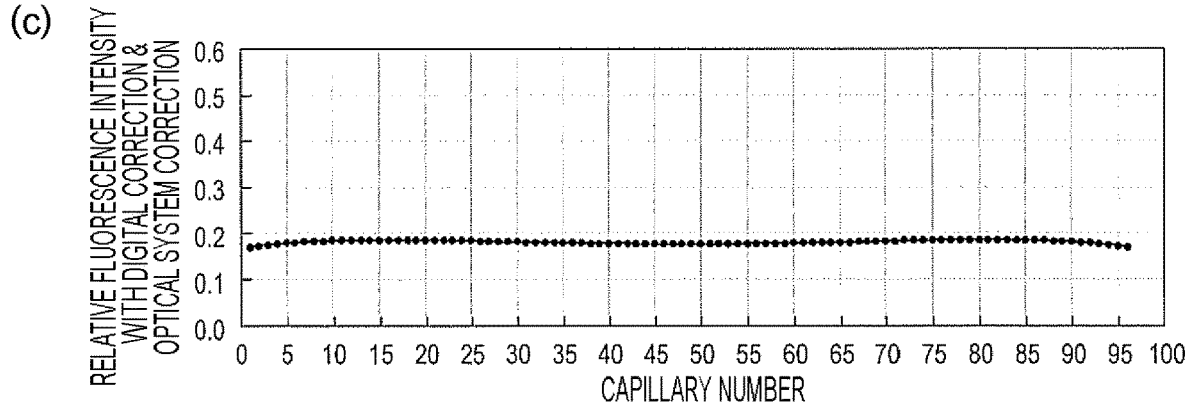

FIG. 24(*a*) illustrates an emitted fluorescence-intensity distribution I(n)=L(n), which is the relative fluorescence intensity of the analysis capillaries with capillary numbers 1 to 96 when $n_3$=1.41 under the both-side irradiation obtained by transforming that obtained under the one-side irradiation illustrated in the middle part of FIG. 23. The relative fluorescence intensity of the lens capillary is not illustrated. The minimum value of the relative fluorescence intensity of MIN=0.30 and the coefficient of variation of CV=20% are obtained for the 96 analysis capillaries. It is found that MIN≥0.2, which is practical performance, is satisfied, but CV≤15% and CV≤10% are not satisfied.

Figure 25:
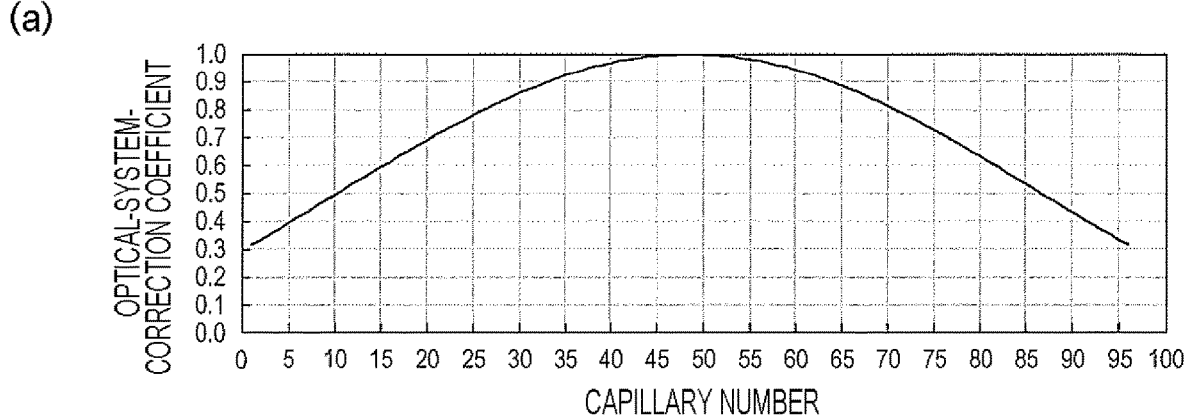
FIG. 25 is a diagram illustrating an optical-system-correction coefficient distribution and a digital-correction coefficient distribution of the capillary array (part 2) ($n_3$=1.41).
Figure 25:
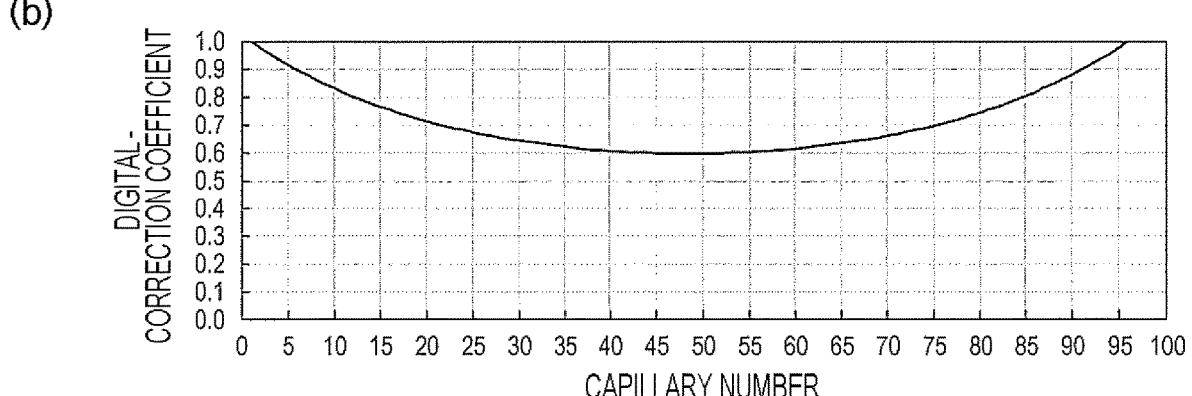

FIG. 25(*a*) illustrates an optical-system-correction coefficient distribution J(n) of the optical system of the 3730 series genetic analyzer used in the present embodiment based on the vignetting effect. Note that the optical system of the 3730 series genetic analyzer is different from the optical system of the 3500 series genetic analyzer in that the respective vignetting effects are different. The optical-system-correction coefficient distribution in FIG. 25(*a*) is represented by J(x)=a+(b−a)×exp{−1×x^2/(2×c^2)}, where a=−0.25635, b=1, and c=11.736815. Here, the capillary number n and the spatial coordinate x are associated with each other by x={n−(N+1)/2}×p, where N is the total number of analysis capillaries and N=96, and p is the arrangement interval of the analysis capillaries and p=0.155 mm×2=0.310 mm. x is a spatial coordinate along the X axis illustrated in FIG. 8. But unlike FIG. 8, the origin of the X axis is arranged at the center of the capillary array, that is, between the capillaries with n=48 and n=49. As illustrated in FIG. 25(*a*), J(n) has a maximum value of 1 at the center of the capillary array and decreases with distance from the center. Therefore, it is possible to mutually compare the absolute values of the emitted fluorescence-intensity distribution L(n) and the measured fluorescence-intensity distribution M(n).

FIG. 24(*b*) illustrates a measured fluorescence-intensity distribution M(n)=J(n)×L(n) obtained by multiplying L(n) in FIG. 24(*a*) by J(n) in FIG. 25(*a*). The measured fluorescence-intensity distribution in FIG. 24(*b*) represents an upward convex curve unlike the measured fluorescence-intensity distribution in the lower part of FIG. 7. This is because the optical-system correction is large since the overall width of the capillary array is wide. The minimum value of the relative fluorescence intensity in the measured fluorescence-intensity distribution in FIG. 24(*b*) is MIN=0.17, and the coefficient of variation is CV=14%. Therefore, while MIN≥0.2 is not satisfied, CV≤15% is satisfied, but CV≤10% is not satisfied.

FIG. 25(*b*) illustrates a digital-correction coefficient distribution K(n) for reducing the coefficient of variation of the measured fluorescence-intensity distribution in FIG. 24(*b*). This digital-correction coefficient distribution represents a downward convex curve unlike the digital-correction coefficient distributions in FIG. 17(*b*). This is to flatten the measured fluorescence-intensity distribution with the upward convex curve in FIG. 24(*b*). The digital-correction coefficient distribution in FIG. 25(*b*) is represented by K(x)=1/[a+(b−a)×exp{−1×x^2/(2×c^2)}], where a=−0.25635, b=1, and c=16.8. Here, the capillary number n and the spatial coordinate x are associated with each other by x={n−(N+1)/2}×p, where N is the total number of analysis capillaries and N=96, and p is the arrangement interval of the analysis capillaries and p=0.155 mm×2=0.310 mm. x is a spatial coordinate along the X axis illustrated in FIG. 8. But unlike FIG. 8, the origin of the X axis is arranged at the center of the capillary array, that is, between the capillaries with n=48 and n=49. As illustrated in FIG. 25(*b*), K(n) has a maximum value of 1 at both ends of the capillary array, that is, at the the capillaries with n=1 and n=96, and decreases with decreasing distance from the center. Therefore, it is possible to mutually compare the absolute values of the measured fluorescence-intensity distribution M(n) and the output fluorescence-intensity distribution H(n)

FIG. 24(*c*) illustrates an output fluorescence-intensity distribution H(n)=K(n)×M(n) obtained by multiplying the measured fluorescence-intensity distribution M(n) in FIG. 24(*b*) by the digital-correction coefficient distribution K(n) in FIG. 25(*b*). As can be seen from the comparison with the measured fluorescence-intensity distribution M(n) in FIG. 24(*b*), the output fluorescence-intensity distribution H(n) in FIG. 24(*c*) is flattened. The minimum value of the relative fluorescence intensity in the output fluorescence-intensity distribution in FIG. 24(*c*) is MIN=0.17, and the coefficient of variation is CV=2%. Therefore, while MIN≥0.2 is not satisfied, both CV≤15% and CV≤10% are satisfied. In the present embodiment, by enhancing the laser-output intensity by 50%, MIN=0.26 is effectively satisfied, and MIN≥0.2 is satisfied. From the above, all the practical performances are satisfied.

Figure 26:
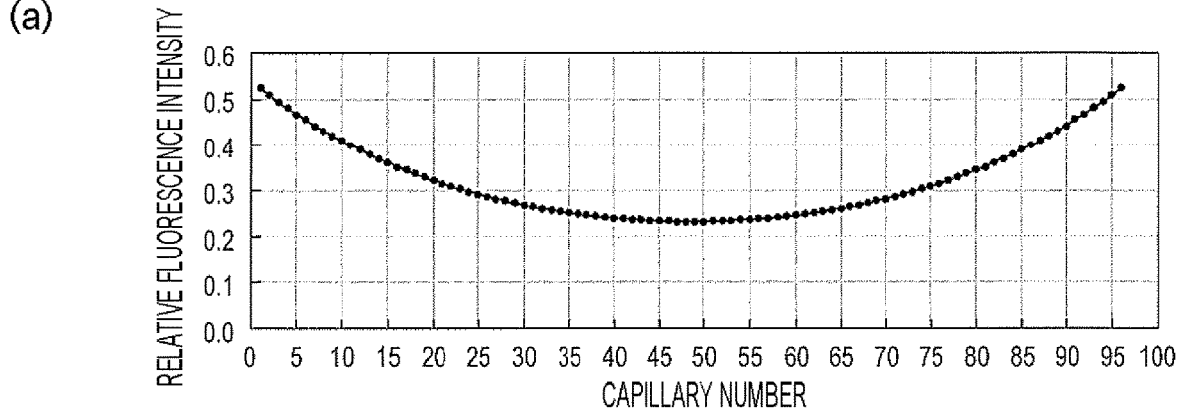
FIG. 26 is a diagram illustrating an emitted fluorescence-intensity distribution, a measured fluorescence-intensity distribution, and an output fluorescence-intensity distribution of the capillary array (part 2) ($n_3$=1.33).
Figure 26:
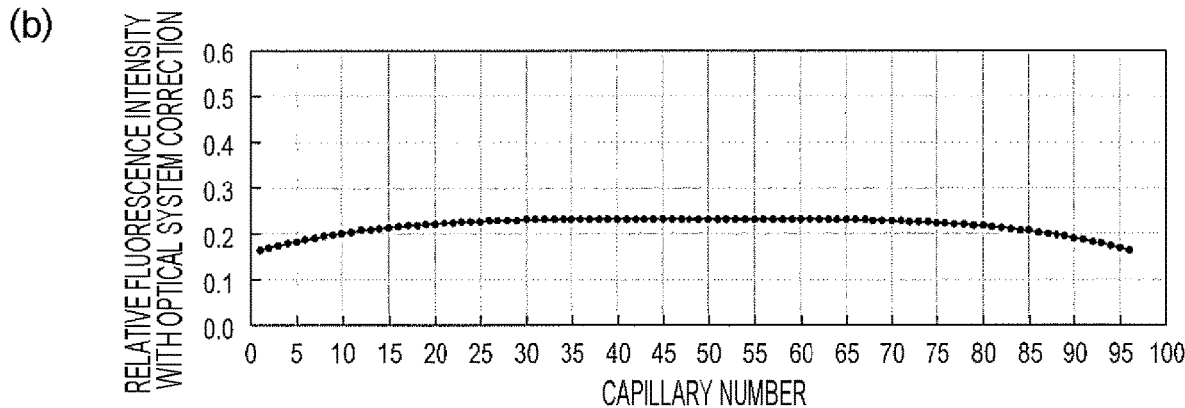
Figure 26:
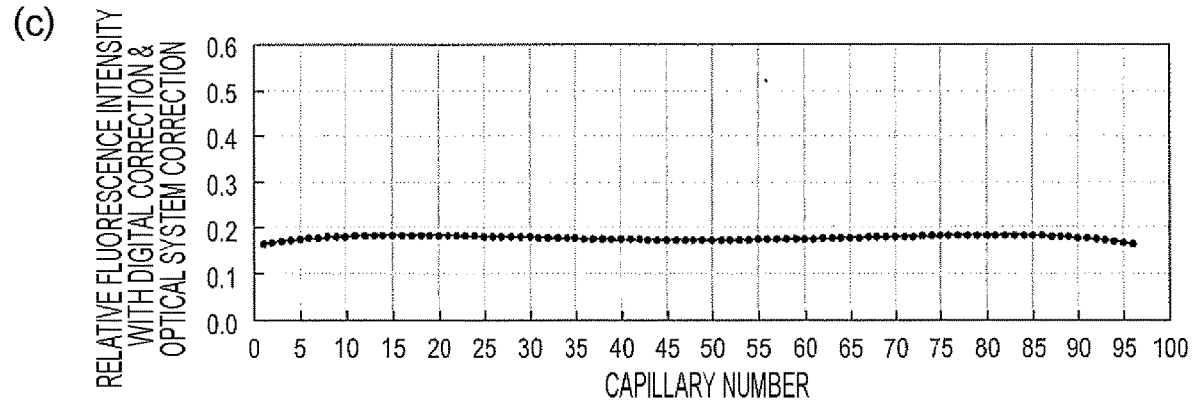

FIG. 26(*a*) illustrates an emitted fluorescence-intensity distribution I(n)=L(n), which is the relative fluorescence intensity of the analysis capillaries with capillary numbers 1 to 96 when $n_3$=1.33 under the both-side irradiation obtained by transforming that obtained under the one-side irradiation illustrated in the lower part of FIG. 23. The relative fluorescence intensity of the lens capillary is not illustrated. The minimum value of the relative fluorescence intensity of MIN=0.23 and the coefficient of variation of CV=27% are obtained for the 96 analysis capillaries, and it is found that MIN≥0.2, which is practical performance, is satisfied, but CV≤15% and CV≤10% are not satisfied.

Figure 27:
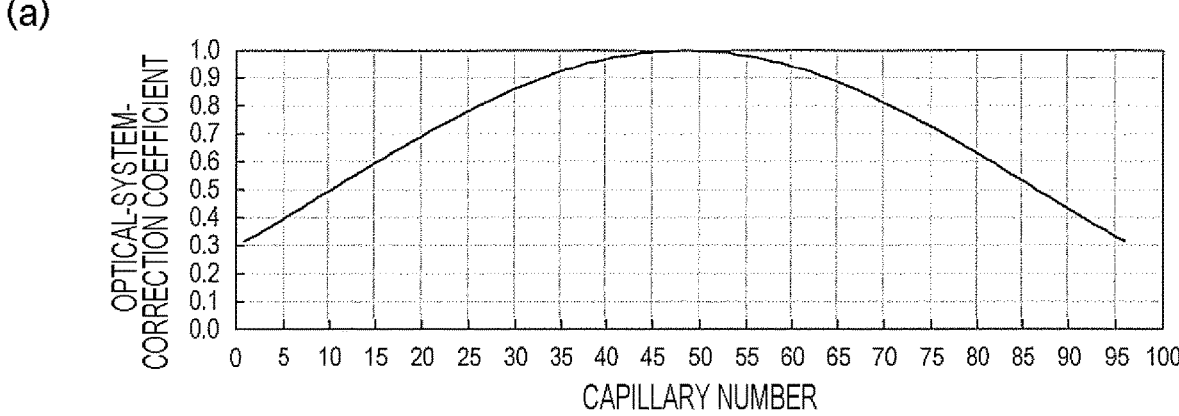
FIG. 27 is a diagram illustrating an optical-system-correction coefficient distribution and a digital-correction coefficient distribution of the capillary array (part 2) ($n_3$=1.33).
Figure 27:
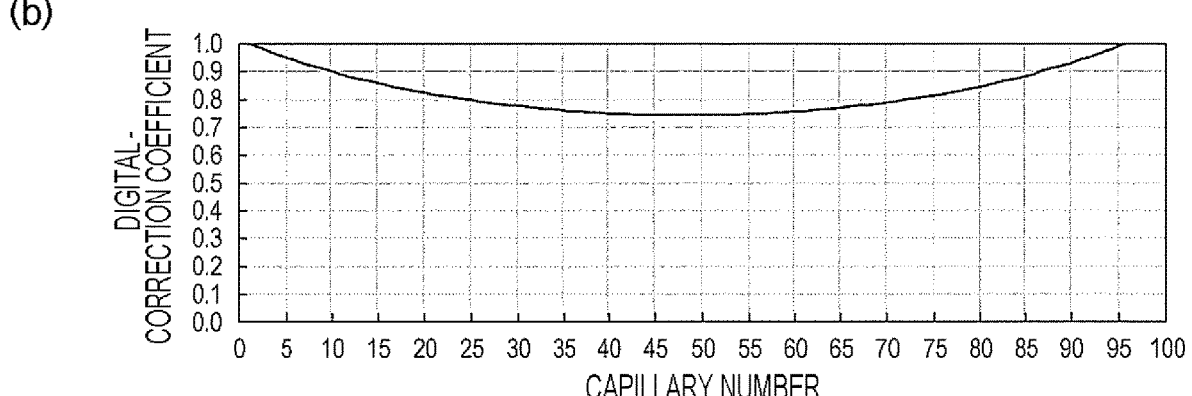

Examples of Relative Fluorescence Intensity, Optical-System-Corrected Relative Fluorescence Intensity, and Digitally-Corrected & Optical-System-Corrected Relative Fluorescence Intensity when $n_3 = 1.33$ FIG. 27(a) illustrates an optical-system-correction coefficient distribution J(n) of the optical system of the 3730 series genetic analyzer used in the present embodiment based on the vignetting effect, which is the same as J(n) illustrated in FIG. 25(a). FIG. 26(b) illustrates a measured fluorescence-intensity distribution M(n)=J(n)×L(n) obtained by multiplying L(n) in FIG. 26(a) by J(n) in FIG. 27(a). The measured fluorescence-intensity distribution in FIG. 26(b) has an upward convex curve as in FIG. 24(b), but is flattened as compared with FIG. 24(b). The minimum value of the relative fluorescence intensity in the measured fluorescence-intensity distribution in FIG. 26(b) is MIN=0.17, and the coefficient of variation is CV=9%. Therefore, while MIN≥0.2 is not satisfied, both CV≤15% and CV≤10% are satisfied.

FIG. 27(b) illustrates a digital-correction coefficient distribution K(n) for further reducing the coefficient of variation of the measured fluorescence-intensity distribution of FIG. 26(b). Similarly to FIG. 25(b), this digital-correction coefficient distribution represents a downward convex curve when setting to a=−0.25635, b=1, and c=21.8 in K(x)=1/[a+(b−a)×exp{−1×x^2/(2×c^2)}]. Here, the capillary number n and the spatial coordinate x are associated with each other by x={n−(N+1)/2}×p. The difference from K(n) in FIG. 25(b) is only the value of c.

FIG. 26(c) illustrates an output fluorescence-intensity distribution H(n)=K(n)×M(n) obtained by multiplying the measured fluorescence-intensity distribution M(n) in FIG. 26(b) by the digital-correction coefficient distribution K(n) in FIG. 27(b). As can be seen from the comparison with the measured fluorescence-intensity distribution M(n) in FIG. 26(b), the output fluorescence-intensity distribution H(n) in FIG. 26(c) is further flattened. The minimum value of the relative fluorescence intensity in the output fluorescence-intensity distribution in FIG. 26(c) is MIN=0.17, and the coefficient of variation is CV=3%. Therefore, while MIN≥0.2 is not satisfied, both CV≤15% and CV≤10% are satisfied. In the present embodiment, by enhancing the laser-output intensity by 50%, MIN=0.26 is effectively satisfied, and MIN≥0.2 is satisfied. From the above, all the practical performances are satisfied.

(H) Seventh Embodiment

A seventh embodiment discloses a configuration example of an improved capillary-array-electrophoresis device.

Configuration Example of Capillary-Array-Electrophoresis Device

Figure 28:
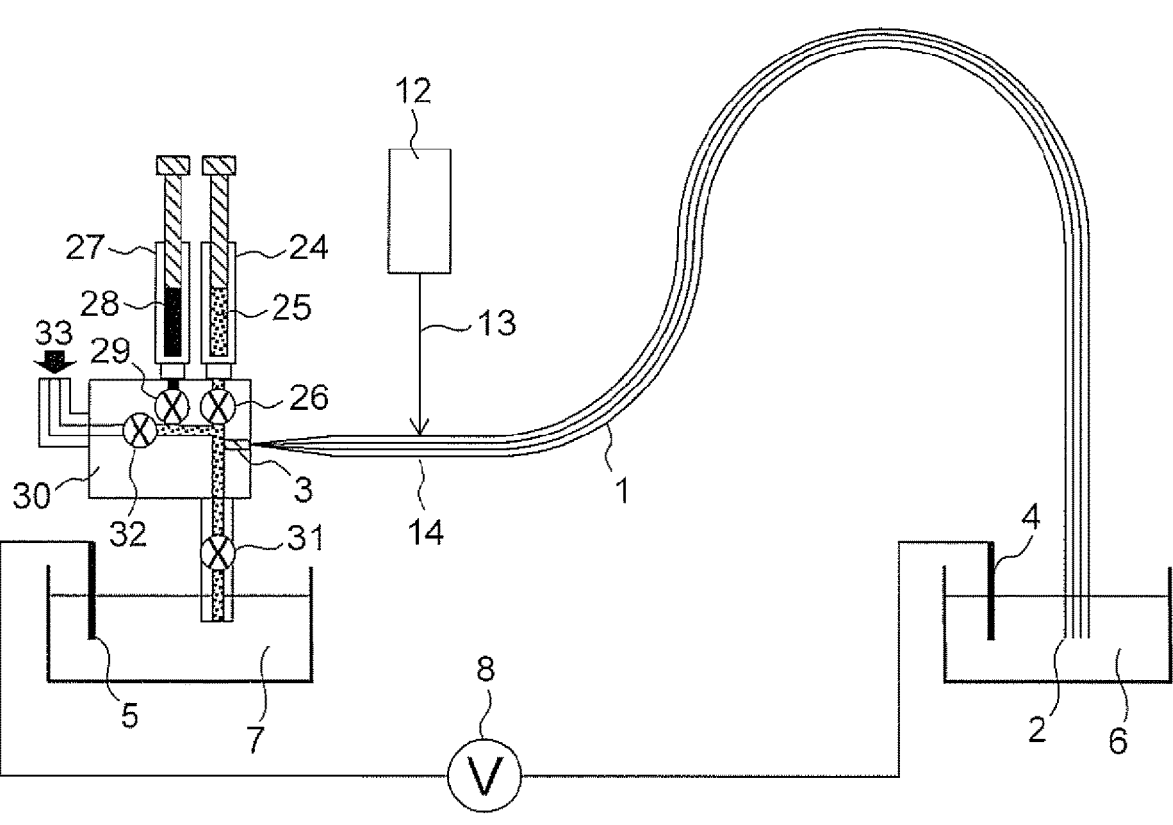
FIG. 28 is a diagram illustrating a capillary-array-electrophoresis device with a dual polymer block implementing a mode of filling a polymer A.
Figure 29:
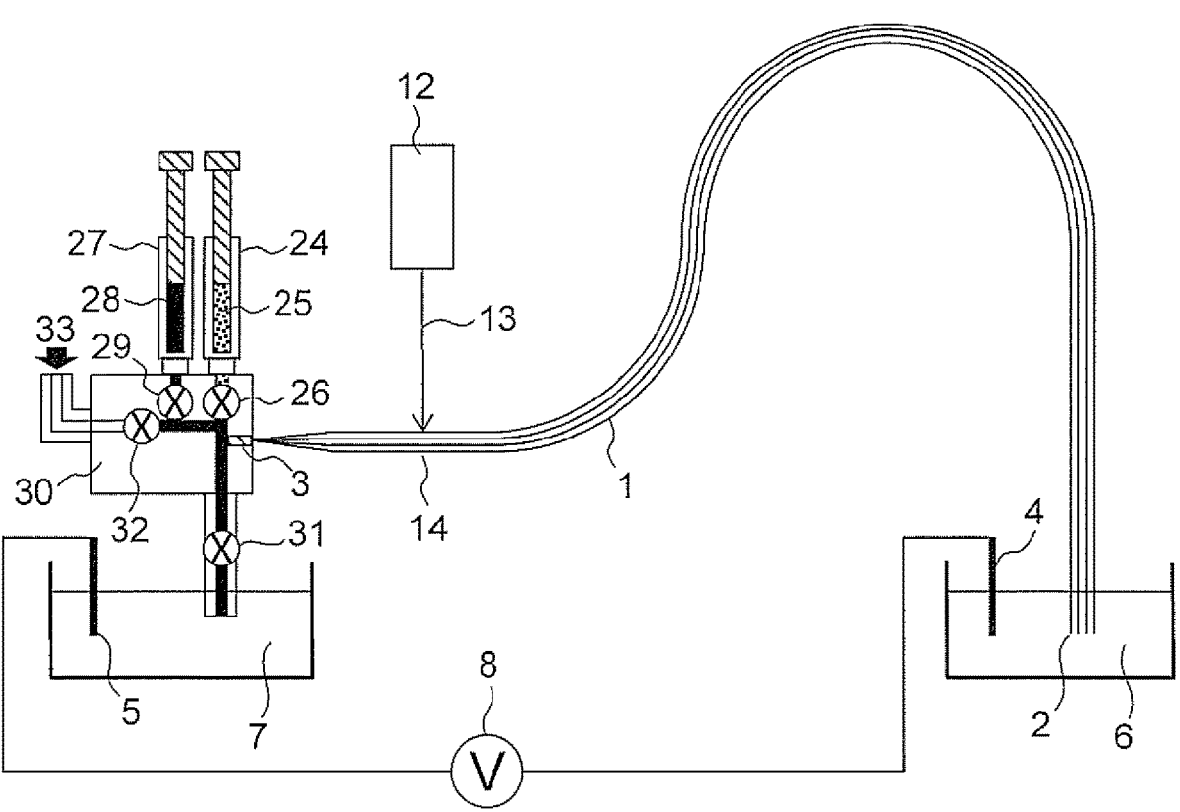
FIG. 29 is a diagram illustrating a capillary-array-electrophoresis device with a dual polymer block implementing a mode of filling a polymer B.

FIGS. 28 and 29 are diagrams illustrating a configuration example of a capillary-array-electrophoresis device that allows capillaries to be selectively filled with one of two kinds of separation media, that is, a polymer solution A 25 and a polymer solution B 28. By adopting the configuration of the capillary-array-electrophoresis device of the present embodiment, it is possible to perform electrophoresis analysis using a plurality of kinds of polymer solutions without attaching and detaching the capillary array to and from the device while using the same capillary array.

FIG. 28 illustrates mode A in which each capillary 1 is filled with the polymer solution A 25 and capillary electrophoresis is performed using the polymer solution A 25. FIG. 29 illustrates mode B in which each capillary 1 is filled with the polymer solution B 28 and capillary electrophoresis is performed using the polymer solution B 28. When analysis sessions including steps (1) to (6) illustrated in the first embodiment are repeated, an arbitrary mode of mode A and mode B can be selected in each analysis session. For example, after analysis sessions of mode A are repeated a plurality of times, analysis sessions of mode B may be repeated a plurality of times, or analysis sessions of mode A and analysis sessions of mode B may be alternately repeated. These settings can be performed by the input unit of the computer illustrated in FIG. 3, and can be confirmed by the display unit. A separation medium having a refractive index of 1.33≤$n_3$<1.36 is defined as a low-refractive-index separation medium, and a separation medium having a refractive index of 1.36≤$n_3$≤1.42 is defined as a high-refractive-index separation medium. The polymer solution A 25 and the polymer solution B 28 may be either a high-refractive-index separation medium or a low-refractive-index separation medium. In the present embodiment, the polymer solution A 25 is a high-refractive-index separation medium and the polymer solution B 28 is a low-refractive-index separation medium. Most parts of FIGS. 28 and 29 are common to FIG. 1, and objects denoted by common reference numerals in each drawing have the same functions by the same configuration. Hereinafter, portions different from those in FIG. 1 will be mainly described. The number of capillaries is not limited to 24 in the first embodiment, and is arbitrary. In the laser-irradiation portion 14, the analysis capillaries and the lens capillaries may be alternately arranged (arrangement similar to that in FIG. 23). In this case, it is assumed that an object simply expressed as a capillary hereinafter represents an analysis capillary.

In the present disclosure, in a single analysis mode, it is assumed that insides of all capillaries constituting a single capillary array are filled with the same separation medium having the same refractive index. However, in a single analysis mode, insides of different capillaries constituting a single capillary array may be filled with different separation media having different refractive indices. Even in such a case, the configuration of the present disclosure enables efficient simultaneous irradiation of all capillaries constituting a single capillary array with a laser beam.

In the capillary-electrophoresis device illustrated in FIGS. 28 and 29, a dual polymer block 30 is used instead of the polymer block 9 in FIG. 1. When the analysis capillary and the lens capillary are alternately arranged in the laser-irradiation portion 14, the lens capillary is not connected to the dual polymer block 30, but only the sample-elution ends 3 of the analysis capillaries are bundled and connected to the dual polymer block 30. A syringe A 24 containing the polymer solution A 25 and a syringe B 27 containing the polymer solution B 28 are connected to the dual polymer block 30. The polymer solution A 25 inside the syringe A 24 is connected to the anode-side-buffer solution 7 by a flow path inside the dual polymer block 30 when a valve A 26 is opened and an anode-tank valve 31 is opened. Similarly, the polymer solution B 28 inside the syringe B 27 is connected to the anode-side-buffer solution 7 by the flow path inside the dual polymer block 30 when a valve B 29 is opened and the anode-tank valve 31 is opened. A cleaning flow 33 used when cleaning the flow path is connected to the anode-sidebuffer solution 7 by the flow path inside the dual polymer block 30 when a cleaning valve 32 is opened and the anode-tank valve 31 is opened. The sample-elution ends 3 are connected to the flow path between the valve A 26 and the anode-tank valve 31, the flow path between the valve B 29 and the anode-tank valve 31, and the flow path between the cleaning valve 32 and the anode-tank valve 31.

<Operation of Mode A and Mode B in Analysis Sessions, and Switching Operation Thereof>

[1] Mode A

First, mode A will be described. As illustrated in FIG. 28, it is assumed that the flow path between the valve A 26 and the anode-tank valve 31 is filled with the polymer solution A 25, that is, the sample-elution ends 3 are in contact with the polymer solution A 25. At this time, the valve A 26 is opened, the valve B 29 is closed, the anode-tank valve 31 is closed, the cleaning valve 32 is closed, and the piston of the syringe A 24 is pushed down, thereby pressurizing the polymer solution A 25 inside the dual polymer block 30 and filling the inside of each capillary 1 with the polymer solution A 25 from the sample-elution end 3 toward the sample-injection end 2. After filling the polymer solution A 25, the anode-tank valve 31 is opened, a different sample is injected into each capillary 1 from the sample-injection end 2, and then a high voltage is applied between the cathode 4 and the anode 5 by the power supply 8, thereby performing capillary electrophoresis. At this time, the valve A 26 may be closed.

[2.1] Switching from Mode A to Mode B

Next, a method for switching from mode A to mode B will be described. In order to perform a desired electrophoresis analysis, it is necessary that a polymer solution, with which the sample-elution ends 3 are in contact, is not a mixture of the polymer solution A 25 and the polymer solution B 28, a diluted polymer solution of the polymer solution A 25 or the polymer solution B 28, or a polymer solution containing bubbles, inside the dual polymer block 30. Therefore, switching from mode A to mode B is performed in the next step. The valve A 26 is closed, the valve B 29 is opened, the anode-tank valve 31 is opened, the cleaning valve 32 is closed, and the piston of the syringe B 27 is pushed down, thereby replacing the flow path between the valve B 29 and the anode-side-buffer solution 7 with the polymer solution B 28 while discharging the polymer solution A 25 in the flow path between the valve B 29 and the anode-side-buffer solution 7 into the anode-side-buffer solution 7 as illustrated in FIG. 29. When the replacement is completed, the piston of the syringe B 27 is stopped from being pushed down. In this step, the amount (volume) by which the syringe B 27 pushes out the polymer solution B 28 is made larger than the internal volume of the flow path between the valve B 29 and the anode-side-buffer solution 7, so that a polymer solution, with which the sample-elution ends 3 are in contact, is the pure polymer solution B 28. In addition, since the amount of the polymer solution A 25 discharged into the anode-side-buffer solution 7 is smaller than the amount of the anode-side-buffer solution 7, the polymer solution A 25 discharged into the anode-side-buffer solution 7 does not adversely affect electrophoresis. Of course, the polymer solution A 25 may be discharged not into the anode-side-buffer solution 7 but into a waste-liquid tank (not shown in FIGS. 28 and 29).

[2.2] More Efficient Switching from Mode A to Mode B

Next, a method for more efficient switching from mode A to mode B will be described. (1) The valve A 26 is closed, the valve B 29 is closed, the anode-tank valve 31 is opened, the cleaning valve 32 is opened, and pure water is injected into the dual polymer block 30 by the cleaning flow 33, thereby replacing the flow path between the cleaning valve 32 and the anode-side-buffer solution 7 with pure water while discharging the polymer solution A 25 in the flow path between the cleaning valve 32 and the anode-side-buffer solution 7 to the waste-liquid tank. In this step, the anode-side-buffer tank is replaced with the waste-liquid tank in advance. By making the amount (volume) of pure water injected in the cleaning flow 33 larger than the internal volume of the flow path between the cleaning valve 32 and the anode-side-buffer solution 7, the polymer solution A 25 remaining in the same flow path is almost 0. (2) Subsequently, air is injected into the dual polymer block 30 by the cleaning flow 33 while keeping the valve A 26 closed, the valve B 29 closed, the anode-tank valve 31 open, and the cleaning valve 32 open, thereby replacing the flow path between the cleaning valve 32 and the anode-side-buffer solution 7 with air while discharging pure water in the flow path between the cleaning valve 32 and the anode-side-buffer solution 7 to the waste-liquid tank. Therefore, it is possible to avoid that the polymer solution B 28 in the flow path is finally diluted. (3) Thereafter, the valve A 26 is closed, the valve B 29 is opened, the anode-tank valve 31 is opened, the cleaning valve 32 is closed, and the piston of the syringe B 27 is pushed down, thereby replacing the flow path between the valve B 29 and the anode-side-buffer solution 7 with the polymer solution B 28 while discharging the air in the flow path between the valve B 29 and the anode-side-buffer solution 7 to the waste-liquid tank. Finally, as illustrated in FIG. 29, when the waste-liquid tank is replaced with the anode-side-buffer tank, the switching to mode B is completed. According to the above method, it is also possible to obtain an effect of reducing the amount of the polymer solution B 28 consumed in switching from mode A to mode B. It is allowed to omit one of the injection of pure water and the injection of air by the cleaning flow 33.

[3] Mode B

Next, mode B will be described. As illustrated in FIG. 29, the flow path between the valve B 29 and the anode-tank valve 31 is filled with the polymer solution B 28, that is, the sample-elution ends 3 are in contact with the polymer solution B 28. At this time, the valve A 26 is closed, the valve B 29 is opened, the anode-tank valve 31 is closed, the cleaning valve 32 is closed, and the piston of the syringe B 27 is pushed down, thereby pressurizing the polymer solution B 28 inside the dual polymer block 30 and filling the inside of each capillary 1 with the polymer solution B 28 from the sample-elution end 3 toward the sample-injection end 2. After filling the polymer solution B 28, the anode-tank valve 31 is opened, a different sample is injected into each capillary 1 from the sample-injection end 2, and then a high voltage is applied between the cathode 4 and the anode 5 by the power supply 8, thereby performing capillary electrophoresis. At this time, the valve B 29 may be closed.

[4] Switching from Mode B to Mode A

Finally, a method for switching from mode B to mode A will be described.

(1) The valve A 26 is closed, the valve B 29 is closed, the anode-tank valve 31 is opened, the cleaning valve 32 is opened, and pure water is injected into the dual polymer block 30 by the cleaning flow 33, thereby replacing the flow path between the cleaning valve 32 and the anode-side-buffer solution 7 with pure water while discharging the polymer solution B 28 in the flow path between the cleaning valve 32 and the anode-side-buffer solution 7 to the waste-liquid tank. In this step, the anode-side-buffer tank is replaced with the waste-liquid tank in advance. By making the amount (volume) of pure water injected in the cleaning flow 33 larger than the internal volume of the flow path between the cleaning valve 32 and the anode-side-buffer solution 7, the polymer solution B 28 remaining in the same flow path is almost 0. (2) Subsequently, air is injected into the dual polymer block 30 by the cleaning flow 33 while keeping the valve A 26 closed, the valve B 29 closed, the anode-tank valve 31 open, and the cleaning valve 32 open, thereby replacing the flow path between the cleaning valve 32 and the anode-side-buffer solution 7 with air while discharging pure water in the flow path between the cleaning valve 32 and the anode-side-buffer solution 7 to the waste-liquid tank. Therefore, it is possible to avoid that the polymer solution A 25 in the flow path is finally diluted. (3) Thereafter, the valve A 26 is opened, the valve B 29 is closed, the anode-tank valve 31 is closed, the cleaning valve 32 is opened, and the piston of the syringe A 24 is pushed down, replacing the flow path between the valve A 26 and the cleaning valve 32 with the polymer solution A 25 while discharging the air in the flow path between the valve A 26 and the cleaning valve 32 to the outside. (4) Subsequently, the valve A 26 is opened, the valve B 29 is closed, the anode-tank valve 31 is opened, the cleaning valve 32 is closed, and the piston of the syringe A 24 is pushed down, thereby replacing the flow path between the valve A 26 and the anode-side-buffer solution 7 with the polymer solution A 25 while discharging the air in the flow path between the valve A 26 and the anode-side-buffer solution 7 to the waste-liquid tank. Finally, as illustrated in FIG. 28, when the waste-liquid tank is replaced with the anode-side-buffer tank, the switching to mode A is completed. According to the above method, it is also possible to obtain an effect of reducing the amount of the polymer solution A 25 consumed in switching from mode B to mode A. It is allowed to omit one of the injection of pure water and the injection of air by the cleaning flow 33.

<Structure of Dual Polymer Block 30>

In order to efficiently or reliably perform the switching between mode A and mode B described above, it is effective that the dual polymer block 30 has the following characteristic configurations.

The characteristic configuration 1 is that the sample-elution end 3 of each capillary 1 is connected to the flow path between the valve A 26 and the anode-tank valve 31. Here, the valve A 26 has an opening/closing mechanism closest to the syringe A 24 with a pressurizing mechanism for the polymer solution A 25. And the anode-tank valve 31 has an opening/closing mechanism closest to the anode-side-buffer solution 7.

The characteristic configuration 2 is that the sample-elution end 3 of each capillary 1 is connected to the flow path between the valve B 29 and the anode-tank valve 31. Here, the valve B 29 has an opening/closing mechanism closest to the syringe B 27 with a pressurizing mechanism for the polymer solution B 28. And the anode-tank valve 31 has an opening/closing mechanism closest to the anode-side-buffer solution 7.

The characteristic configuration 3 is that the sample-elution end 3 of each capillary 1 is connected to the flow path between the cleaning valve 32 and the anode-tank valve 31. Here, the cleaning valve 32 has an opening/closing mechanism closest to the injection port of the cleaning flow 33. And the anode-tank valve 31 has the opening/closing mechanism closest to the anode-side-buffer solution 7.

The characteristic configuration 4 is that the valve A 26 and the valve B 29 are connected to the flow path between the cleaning valve 32 and the anode-tank valve 31. Here, the valve A 26 has an opening/closing mechanism closest to the syringe A 24 with a pressurizing mechanism for the polymer solution A 25. And the valve B 29 has an opening/closing mechanism closest to the syringe B 27 with a pressurizing mechanism for the polymer solution B 28. The cleaning valve 32 has an opening/closing mechanism closest to the injection port of the cleaning flow 33. The anode-tank valve 31 has an opening/closing mechanism closest to the anode-side-buffer solution 7.

(I) Eighth Embodiment

An eighth embodiment discloses another configuration example of an improved capillary-array-electrophoresis device.

Configuration Example of Capillary-Array-Electrophoresis Device

Figure 30:
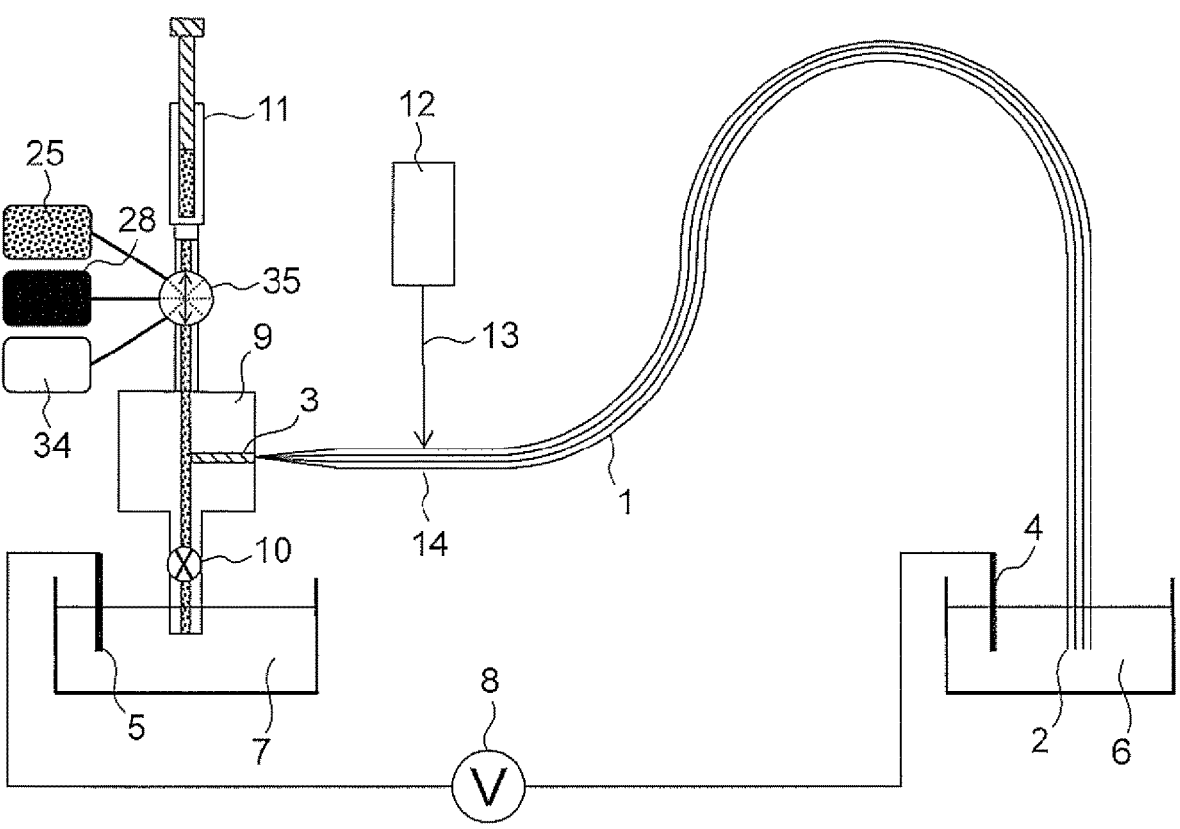
FIG. 30 is a diagram illustrating a modification of the dual polymer block in the capillary-array-electrophoresis device.

FIG. 30 is a diagram illustrating another configuration example (modification) of a capillary-array-electrophoresis device in which either the polymer solution A 25 or the polymer solution B 28, which are two kinds of separation media illustrated in FIGS. 28 and 29, can be used selectively on the device. By adopting this configuration, it is possible to perform electrophoresis analysis using a plurality kinds of polymer solutions without attaching and detaching the capillary array to and from the device while using the same capillary array.

In the capillary-array-electrophoresis device illustrated in FIG. 30, a piping with a rotary valve 35 connected is inserted between the syringe 11 and the polymer block 9. The rotary valve 35 is also connected to a container containing the polymer solution A 25, a container containing the polymer solution B 28, and a container containing pure water 34. The rotary valve 35 can connect any two of the inside of the syringe 11, the polymer solution A 25, the polymer solution B 28, the pure water 34, the air, and the inside of the polymer block 9.

<Operation of Mode A and Mode B in Analysis Sessions, and Switching Operation Thereof>

[1] Mode A

First, mode A will be described. As illustrated in FIG. 30, it is assumed that the flow path between the rotary valve 35 and the valve 10 is filled with the polymer solution A 25, that is, the sample-elution ends 3 are in contact with the polymer solution A 25. At this time, the rotary valve 35 connects the polymer solution A 25 inside the syringe 11 and the polymer solution A 25 inside the polymer block 9. The valve 10 is closes, and the piston of the syringe 11 is pushed down to pressurize the polymer solution A 25 inside the polymer block 9, and fills the inside of each capillary 1 with the polymer solution A 25 from the sample-elution end 3 toward the sample-injection end 2. After filling the polymer solution A 25, the valve 10 is opened, a different sample is injected into each capillary 1 from the sample-injection end 2, and then a high voltage is applied between the cathode 4 and the anode 5 by the power supply 8, thereby performing capillary electrophoresis.

[2] Switching from Mode A to Mode B

Next, a method for switching from mode A to mode B will be described. In order to perform a desired electrophoresis analysis, it is necessary that a polymer solution, with which the sample-elution ends 3 are in contact, is not a mixture of the polymer solution A 25 and the polymer solution B 28, a diluted polymer solution of the polymer solution A 25 or the polymer solution B 28, or a polymer solution containing bubbles, inside the polymer block 9. Therefore, switching from mode A to mode B is performed in the next step. (1) The rotary valve 35 connects the polymer solution A 25 inside the syringe 11 and the polymer solution A 25 inside the polymer block 9, opens the valve 10. Then, the piston of the syringe 11 is pushed down to the bottom, thereby discharging the entire amount of the polymer solution A 25 inside of the syringe 11. The same amount of the polymer solution A 25 discharged from the syringe 11 is discharged from the polymer block 9 to the waste-liquid tank. At this time, the flow path from the tip portion of the syringe 11 to the boundary with the anode-side-buffer solution 7 in the polymer block 9 is filled with the polymer solution A 25. (2) Subsequently, the rotary valve 35 connects the inside of the syringe 11 and the pure water 34. Then, the valve 10 is closed, and the piston of the syringe 11 is pulled up to the top, thereby filling the inside of the syringe 11 with the pure water 34. (3) Then, the rotary valve 35 connects the pure water 34 inside the syringe 11 and the polymer solution A 25 inside the polymer block 9, the valve 10 is opened, and the piston of the syringe 11 is pushed down to the bottom, thereby discharging the entire amount of the pure water 34 inside of the syringe 11. The same amount of the polymer solution A 25 and the pure water 34 discharged from the syringe 11 is discharged from the polymer block 9 to the waste-liquid tank. At this time, the flow path from the tip portion of the syringe 11 to the boundary with the anode-side-buffer solution 7 in the polymer block 9 is filled with the pure water 34. The steps (2) and (3) are repeated as necessary to prevent the polymer solution A 25 from remaining in the flow path. (4) Subsequently, the rotary valve 35 connects the inside of the syringe 11 and the outside air, the valve 10 is closed, and the piston of the syringe 11 is pulled up to the top, thereby filling the inside of the syringe 11 with air. (5) Then, the rotary valve 35 connects the air inside the syringe 11 and the pure water 34 inside the polymer block 9, the valve 10 is opened, and the piston of the syringe 11 is pushed down to the bottom, thereby discharging the entire amount of the air inside the syringe 11. The same amount of the pure water 34 and the air discharged from the syringe 11 is discharged from the polymer block 9 to the waste-liquid tank. At this time, the flow path from the tip portion of the syringe 11 to the boundary with the anode-side-buffer solution 7 in the polymer block 9 is filled with the air. The steps (4) and (5) are repeated as necessary to prevent liquid from remaining in the flow path. (6) Next, the rotary valve 35 connects the inside of the syringe 11 and the polymer solution B 28, the valve 10 is closed, and the piston of the syringe 11 is pulled up to the top, thereby filling the inside of the syringe 11 with the polymer solution B 28. (7) Finally, the rotary valve 35 connects the polymer solution B 28 inside the syringe 11 and the air inside the polymer block 9, the valve 10 is opened, and the piston of the syringe 11 is pushed down, thereby discharging the entire amount of the air inside the polymer block from the polymer block 9 to the waste-liquid tank. When the flow path from the tip portion of the syringe 11 to the boundary with the anode-side-buffer solution 7 in the polymer block 9 is filled with the polymer solution B 28, lowering of the piston of the syringe 11 is stopped, and the switching to B mode is completed.

[3] Mode B

Next, mode B will be described. It is assumed that the flow path between the rotary valve 35 and the valve 10 is filled with the polymer solution B 28, that is, the sample-elution ends 3 are in contact with the polymer solution B 28. At this time, the rotary valve 35 connects the polymer solution B 28 inside the syringe 11 and the polymer solution B 28 inside the polymer block 9, the valve 10 is closed, and the piston of the syringe 11 is pushed down, thereby pressurizing the polymer solution B 28 inside the polymer block 9, and thereby filling the inside of each capillary 1 with the polymer solution B 28 from the sample-elution end 3 toward the sample-injection end 2. After filling the polymer solution B 28, the valve 10 is opened, a different sample is injected into each capillary 1 from the sample-injection end 2, and then a high voltage is applied between the cathode 4 and the anode 5 by the power supply 8, thereby performing capillary electrophoresis.

[4] Switching from Mode B to Mode A

Finally, a method for switching from mode B to mode A will be described. (1) The rotary valve 35 connects the polymer solution B 28 inside the syringe 11 and the polymer solution B 28 inside the polymer block 9, the valve 10 is opened, and the piston of the syringe 11 is pushed down to the bottom, thereby discharging the entire amount of the polymer solution B 28 inside of the syringe 11. The same amount of the polymer solution B 28 discharged from the syringe 11 is discharged from the polymer block 9 to the waste-liquid tank. At this time, the flow path from the tip portion of the syringe 11 to the boundary with the anode-side-buffer solution 7 in the polymer block 9 is filled with the polymer solution B 28. (2) Subsequently, the rotary valve 35 connects the inside of the syringe 11 and the pure water 34, the valve 10 is closed, and the piston of the syringe 11 is pulled up to the top, thereby filling the inside of the syringe 11 with the pure water 34. (3) Then, the rotary valve 35 connects the pure water 34 inside the syringe 11 and the polymer solution B 28 inside the polymer block 9, the valve 10 is opened, and the piston of the syringe 11 is pushed down to the bottom, thereby discharging the entire amount of the pure water 34 inside of the syringe 11. The same amount of the polymer solution B 28 and the pure water 34 discharged from the syringe 11 is discharged from the polymer block 9 to the waste-liquid tank. At this time, the flow path from the tip portion of the syringe 11 to the boundary with the anode-side-buffer solution 7 in the polymer block 9 is filled with the pure water 34. The steps (2) and (3) are repeated as necessary to prevent the polymer solution B 28 from remaining in the flow path. (4) Subsequently, the rotary valve 35 connects the inside of the syringe 11 and the outside air, the valve 10 is closed, and the piston of the syringe 11 is pulled up to the top, thereby filling the inside of the syringe 11 with air. (5) Then, the rotary valve 35 connects the air inside the syringe 11 and the pure water 34 inside the polymer block 9, the valve 10 is opened, and the piston of the syringe 11 is pushed down to the bottom, thereby discharging the entire amount of the air inside the syringe 11. The same amount of the pure water 34 and the air discharged from the syringe 11 is discharged from the polymer block 9 to the waste-liquid tank. At this time, the flow path from the tip portion of the syringe 11 to the boundary with the anode-side-buffer solution 7 in the polymer block 9 is filled with the air. The steps (4) and (5) are repeated as necessary to prevent liquid from remaining in the flow path. (6) Next, the rotary valve 35 connects the inside of the syringe 11 and the polymer solution A 25, the valve 10 is closed, and the piston of the syringe 11 is pulled up to the top, thereby filling the inside of the syringe 11 with the polymer solution A 25. (7) Finally, the rotary valve 35 connects the polymer solution A 25 inside the syringe 11 and the air inside the polymer block 9, the valve 10 is opened, and the piston of the syringe 11 is pushed down, thereby discharging the entire amount of the air inside the polymer block from the polymer block 9 to the waste-liquid tank. When the flow path from the tip portion of the syringe 11 to the boundary with the anode-side-buffer solution 7 in the polymer block 9 is filled with the polymer solution A 25, lowering of the piston of the syringe 11 is stopped, and the switching to mode A is completed.

As described above, in order to efficiently or reliably switch between mode A and mode B, it is effective that the device has the following characteristic configuration. The rotary valve 35 in the eighth embodiment also serves as the valve A 26, the valve B 29, and the cleaning valve 32 in the seventh embodiment. The syringe 11 according to the eighth embodiment also serves as the syringe A 24, the syringe B 27, and the cleaning flow according to the seventh embodiment. Further, the valve 10 in the eighth embodiment has the same role as the anode-tank valve 31 in the seventh embodiment. In view of this, it can be said that the characteristic structures 1 to 4 described in the seventh embodiment are also established in the eighth embodiment. Alternatively, an expression specific to the eighth embodiment as follows is also possible. A characteristic configuration is that the sample-elution end 3 of each capillary 1 is connected to the flow path between the rotary valve 35 and the anode-tank valve 10. Here, the rotary valve 35 has an opening/closing mechanism closest to the syringe 11 with a pressurizing mechanism for any of the polymer solution A 25, the polymer solution B 28, the pure water 34, or air. And the anode-tank valve 10 has an opening/closing mechanism closest to the anode-side-buffer solution 7.

(J) Conclusion (i) The optimum correction coefficient for the emitted fluorescence-intensity distribution varies depending on the refractive index $n_3$ of the separation medium. On the premise of this fact, when the refractive index $n_3$ is not defined (or, in an unknown case), it is unclear what correction coefficient should be used. When an optimum correction coefficient is not used, the correction coefficient itself can be a factor of an error. In the first place, the refractive index $n_3$ of the separation medium also changes depending on environmental conditions such as temperature. It is not necessarily clear what correction should be made under such conditions. Therefore, in the technology of the present disclosure, the relationship (FIG. 17(c)) between the refractive index $n_3$ of the separation medium in the capillary array and the second-order coefficient when the relative fluorescence-intensity distribution is approximated by a quadratic function is introduced. All the relative fluorescence-intensity distributions before correction have downward convex shapes as illustrated in FIG. 17(a), and the second-order coefficients before correction are positive as illustrated in FIG. 17(c). On the contrary, whether or not the correction is appropriate depends on which refractive index $n_3$ is used as a reference for correction. For example, when the refractive index $n_3=1.36$ is used as a reference for digital correction, the digitally-corrected relative fluorescence-intensity distribution with a separation medium having a refractive index $n_3=1.36$ becomes flat, and the second-order coefficient becomes 0. On the other hand, the digitally-corrected relative fluorescence-intensity distribution with a separation medium having a refractive index larger than 1.36 has an upward convex shape, and the second-order coefficient is negative. This indicates that the correction is excessive. In addition, the digitally-corrected relative fluorescence-intensity distribution with a separation medium having a refractive index smaller than 1.36 has a downward convex shape, and the second-order coefficient is positive. This indicates that the correction is insufficient. However, even when the correction is excessive or insufficient, it is considered that the effect of correction can be expected (correction is effective) since the relative fluorescence-intensity distribution after correction is flattened as compared with the relative fluorescence-intensity distribution before correction. That is, one of the features of the technology of the present disclosure is to change the correction reference and the digital-correction coefficient distribution in accordance with the refractive index $n_3$ of the separation medium to be used.

In the present disclosure, the N capillaries in the laser-irradiation portions 14 are numbered from 1 to N in order from the capillary at the end of the capillary array. The laser-irradiation light intensity of the capillary with capillary number n is defined as L(n). An average value of a second derivative of L(n) in the range of $1 \le n \le N$ is defined as A, indicating a degree of convexity of a curve representing a relationship between n and L(n). A is a value uniquely determined under a predetermined condition. Meanwhile, when the light emitting substance having the equal concentration exists inside the N capillaries in the laser-irradiation portions 14, the output fluorescence intensity of the capillary with capillary number n is defined as H(n). An average value of a second derivative of H(n) in the range of $1 \le n \le N$ is defined as B, indicating a degree of convexity of a curve representing a relationship between n and H(n). The capillary-electrophoresis device is configured to have an analysis mode of the capillary electrophoresis using a separation medium having the refractive index $n_3 < 1.36$, and to satisfy $|A| > |B|$. If $|A| > |B|$ is satisfied, in the case of using a separation medium having a refractive index satisfying $n_3 < 1.36$, the relative fluorescence-intensity distribution having a downward convex shape is flattened by a correction. That is, an effective correction can be realized.

(ii) More specifically, $|A| > |B|$ can be realized by executing at least one of optical correction by an optical system and digital correction by computer calculation. $|A| > |B|$ can be realized by digital correction without particularly devising the configuration of the optical system. Alternatively, the configuration of the optical system may be changed and digital correction by computer calculation may be executed. In addition, $|A| > |B|$ may be realized only by changing the configuration of the optical system.

For example, when the number of capillaries is 24 and a separation medium having a relatively high refractive index is used, the relative fluorescence-intensity distribution is flat only by adopting the correction coefficient J(n) of the actual optical system as illustrated in FIG. 5. In such a case (a case where the refractive index of the separation medium is high), it can be seen that digital correction is not necessary. On the other hand, when a relatively thin capillary (see FIG. 6) is used, such a correction effect cannot be expected even if correction is performed by the optical system regardless of whether the refractive index is high or low. This is because, since a thin capillary is used, each capillary is close to the central axis of the optical system, and optical correction is not effective. For example, there is a case where the relative fluorescence-intensity distribution becomes slightly flat but not perfect due to slight correction by the optical system. In such a case, flatness is further improved by adding digital correction (see FIG. 11). In other words, the relative fluorescence-intensity distribution is flattened as a whole by compensating for insufficient correction by optical correction with digital correction, that is, by combining the optical correction and the digital correction. As a simple method, for example, it is possible to optimize the digital-correction coefficients so that the relative fluorescence-intensity distribution becomes flat depending on the refractive index. On the other hand, in some cases, the relative fluorescence-intensity distribution can be flattened by artificially changing the optical system (changing the configuration of at least a part of the optical system) to optimize the optical system without performing digital correction.

As described above, in the technology of the present disclosure, a flat relative fluorescence-intensity distribution may be realized by changing at least a part of the configuration of the optical system, or may be realized only by digital correction. Further, it may be realized by using both of them.

Note that a specific method for controlling the correction coefficient distribution of the optical system is disclosed in, for example, U.S. Pat. No. 7,477,381 B and PTL 3 (Japanese Patent No. 6113549). In the former, it is disclosed that light emitted from each capillary is received with equal efficiency by inserting a cat's-eye type light blocking aperture 112 as illustrated in FIG. 24 into the optical system. In addition, the latter discloses that light emitted from each capillary is uniformly received by inserting a variable density filter (a filter in which transmittance of light is changed depending on a position) into the optical system. Both documents show that the light receiving efficiency is made uniform, but this is an example, and it is not always necessary to make the light receiving efficiency uniform. What is desired to show here is that the correction coefficient distribution of the optical system can be controlled by changing the design of each device.

(iii) In the present disclosure, predetermined digital-correction coefficients, corresponding to the value(s) of the refractive indexes $n_3$ of the separation medium used for analysis, are stored in a memory. The computer reads the digital-correction coefficients from the memory (switching tables), and can appropriately correct the measured fluorescence-intensity distribution M(n) by applying the digital-correction coefficients. Normally, correction is performed by performing calibration, but since there are cases where correction can be performed and where correction cannot be performed, it is effective to read and use correction coefficients.

(iv) One of the features of the technology of the present disclosure is that the value of B (an average value of the second derivative of H(n) in the range of $1 \leq n \leq N$ showing the degree of convexity of H(n)) changes when introducing a separation medium having a refractive index larger or smaller than the assumed refractive index $n_3$ into the capillary. For example, when the refractive index $n_3=1.36$ is used as a reference, $B \approx 0$ is obtained for the refractive index $n_3=1.36$ from FIG. 17(*c*) (see the value of the vertical axis). In this case, when intentionally introducing a separation medium having a refractive index higher or lower than the refractive index $n_3=1.36$ into the capillary, the degree of upward convexity or downward convexity in the relative fluorescence-intensity distribution changes. Such a viewpoint has been found for the first time by the technology of the present disclosure.

(v) One of the features of the technology of the present disclosure is that the average value B of the second derivative of the output fluorescence-intensity distribution H(n), in which the output light intensity of the capillary with capillary number n is represented by a function of n, always changes from positive to negative when the refractive index $n_3$ of the separation medium is sequentially increased. This point is also a feature that cannot be found in the prior art. When introducing a separation medium having a very high refractive index $n_3$ (for example, the refractive index $n_3=1.42$) into the capillary, the value of B becomes negative (the relative fluorescence-intensity distribution is convex upward), and when introducing a separation medium having a very low refractive index $n_3$ (for example, the refractive index $n_3=1.30$) into the capillary, the value of B becomes positive (the relative fluorescence-intensity distribution is convex downward).

(vi) Further, one of the features of the technology of the present disclosure is that a plurality of separation media having predetermined refractive indexes $n_3$ are used. The current products can use a plurality of kinds of separation media, but the refractive index $n_3$ is 1.41 for any separation media. On the other hand, for analysis in the technology of the present disclosure, it is possible to use separation media having a plurality of refractive indexes, for example, separation media having not only $n_3=1.41$ but also separation media such as $n_3=1.33$ and $n_3=1.36$. Such a viewpoint has been found for the first time by the technology of the present disclosure.

REFERENCE SIGNS LIST 1 capillary
2 sample-injection end
3 sample-elution end
4 cathode
5 anode
6 cathode-side-buffer solution
7 anode-side-buffer solution
8 power supply
9 polymer block
10 valve
11 syringe
12 laser-light source
13 laser beam
14 laser-irradiation portion
15 condensing lens
16 laser-cut filter
17 transmission-diffraction grating
18 imaging lens
19 sensor
20 light-emission point
21 fluorescence
22 image point
23 optical axis
24 syringe A
25 polymer solution A
26 valve A
27 syringe B
28 polymer solution B
29 valve B
30 dual polymer block
31 anode-tank valve
32 cleaning valve
33 cleaning flow
34 pure water
35 rotary valve

The invention claimed is:

1. A capillary-array-electrophoresis device comprising:
a laser-light source configured to emit a laser beam;
a capillary array configured such that laser-irradiation portions of N capillaries collectively irradiated with the laser beam are substantially arranged on a same array plane, where N is an integer of 2 or more;
an optical system configured to collectively measure light emission from the N capillaries; and a computer configured to perform predetermined processing on light intensities measured by the optical system and to output the processed light intensities, wherein at least an analysis mode of capillary electrophoresis using a separation medium having a refractive index $n_3 < 1.36$ is provided, $|A| > |B|$ is satisfied, wherein an outer radius, an inner radius, a refractive index of an external medium, a refractive index of a material, and a refractive index of an internal medium of the N capillaries in the laser-irradiation portions are respectively defined as R, r, $n_1$, $n_2$, and $n_3$, wherein the N capillaries are numbered $n=1, 2, \ldots$, and N in order from the capillary at the end of the capillary array, wherein an average value of a second derivative of L(n) in the range of $1 \leq n \leq N$ is defined as A, wherein L(n) represents a laser-irradiation light intensity of the capillary with capillary number n as a function of n, and A indicates a degree of convexity of L(n) and wherein an average value of a second derivative of H(n) in the range of $1 \leq n \leq N$ is defined as B, wherein H(n) represents an output light intensity of the capillary with capillary number n by the computer as a function of n when a light emitting substance of equal concentration exists inside the N capillaries in the laser-irradiation portions, and B indicates a degree of convexity of H(n).

2. The capillary-array-electrophoresis device according to claim 1, wherein the $|A| > |B|$ is realized by at least one of optical-system correction by a vignetting effect of the optical system and digital correction by the processing of the computer.

3. The capillary-array-electrophoresis device according to claim 2, wherein the computer is configured to read a correction coefficients for the digital correction from a memory that stores the correction coefficients in advance, and to execute the digital correction.

4. The capillary-array-electrophoresis device according to claim 1, wherein the average value B of the second derivative of H(n) decreases as a refractive index $n_{3\_actual}$ of a separation medium filled in each of the N capillaries becomes larger than a refractive index $n_{3\_assume}$ of a separation medium assumed when the computer executes the predetermined processing, and wherein the average value B increases as the refractive index $n_{3\_actual}$ becomes smaller than the refractive index $n_{3\_assume}$.

5. The capillary-array-electrophoresis device according to claim 2, wherein at least a part of a configuration of the optical system is changed according to the refractive index $n_3$ of a separation medium filled in each of the N capillaries and therefore correction coefficients of the optical-system correction are changed so as to reduce $|B|$, an absolute value of the average value of the second derivative of H(n).

6. The capillary-array-electrophoresis device according to claim 2, wherein a correction coefficients of the digital correction by the computer are changed according to the refractive index $n_3$ of a separation medium filled in each of the N capillaries so as to reduce $|B|$, an absolute value of the average value of the second derivative of H(n).

7. A capillary-array-electrophoresis device comprising:
a laser-light source configured to emit a laser beam;
a capillary array configured such that laser-irradiation portions of N capillaries collectively irradiated with the laser beam are substantially arranged on a same array plane, where N is an integer of 2 or more;
an optical system configured to collectively measure light emission from the N capillaries; and a computer configured to execute predetermined processing on light intensity data measured by the optical system, wherein the computer is configured to change by the predetermined processing, a sign of an average value of a second derivative of H(n) in the range of $1 \leq n \leq N$ from positive to negative with an increase of a refractive index $n_3$, wherein an outer radius, an inner radius, a refractive index of an external medium, a refractive index of a material, and a refractive index of an internal medium of the N capillaries in the laser-irradiation portions are respectively defined as R, r, $n_1$, $n_2$ and $n_3$, wherein the N capillaries are numbers $n=1, 2, \ldots$, and N in order from the capillary at the end of the capillary array, wherein H(n) represents an output light intensity of the capillary number n by the computer as a function of n when a light emitting substance of equal concentration exists inside the N capillaries in the laser-irradiation portions.

8. The capillary-array-electrophoresis device according to claim 7, wherein the computer is configured to change the sign of the average value of the second derivative of H(n) within a range of $1.30 \leq n_3 \leq 1.42$.

9. The capillary-array-electrophoresis device according to claim 7, wherein the computer is configured to set to negative the sign of the average value of the second derivative of H(n) when the refractive index $n_3 = 1.42$.

10. The capillary-array-electrophoresis device according to claim 7, wherein the computer is configured to set to positive the sign of the average value of the second derivative of H(n) when the refractive index $n_{3=1.30}$.

11. A capillary-array-electrophoresis device comprising:
a laser-light source configured to emit a laser beam;
a capillary array configured such that laser-irradiation portions of N capillaries collectively irradiated with the laser beam are substantially arranged on a same array plane, where N is an integer of 2 or more;
an optical system configured to collectively measure light emission from the N capillaries; and
a computer configured to output light intensities measured by the optical system,
wherein a separation medium injected into the capillary array is selected from a plurality kinds of separation media having different refractive indexes in a range of $1.33 \leq n_3 \leq 1.41$,
wherein an outer radius, an inner radius, a refractive index of an external medium, a refractive index of a material, and a refractive index of an internal medium of the N capillaries in the laser-irradiation portions are respectively defined as R, r, $n_1$, $n_2$, and $n_3$, and
wherein the N capillaries are numbers $n=1, 2, \ldots$, and N in order from the capillary at the end of the capillary array, and
wherein the computer is configured to display a user interface screen for selecting a separation medium to be used from the plurality kinds of separation media on a display screen.

12. The capillary-array-electrophoresis device according to claim 11, wherein the plurality kinds of separation media include a separation medium having a refractive index of $n_3 < 1.36$.

13. The capillary-array-electrophoresis device according to claim 11, wherein, when an output light intensity of the capillary with capillary number n by the computer is defined as H(n), H(n) changes depending on the kind of the separation medium selected by the computer in a state where the refractive index $n_3$ of the separation medium filled in each of the N capillaries is fixed.

14. The capillary-array-electrophoresis device according to claim 11, wherein, when an output light intensity of the capillary with capillary number n by the computer is defined as H(n), and when a second-order coefficient when H(n) is approximated by a second-order function of n is defined as $\alpha$, wherein the second-order coefficient $\alpha$ is positive when the refractive index $n_3$ of the separation medium selected by the computer is larger than the refractive index $n_3$ of the separation medium filled in each of the N capillaries, and wherein the second-order coefficient $\alpha$ is negative when the refractive index $n_3$ of the separation medium selected by the computer is smaller than the refractive index $n_3$ of the separation medium filled in each of the N capillaries.

* * * * *